United States Patent
Ishizaki et al.

(10) Patent No.: US 10,698,512 B2
(45) Date of Patent: Jun. 30, 2020

(54) ELECTRODE SUBSTRATE, DISPLAY DEVICE, INPUT DEVICE AND METHOD OF MANUFACTURING ELECTRODE SUBSTRATE

(71) Applicant: Japan Display Inc., Tokyo (JP)

(72) Inventors: Koji Ishizaki, Tokyo (JP); Toshimasa Ishigaki, Tokyo (JP); Daisuke Sonoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 266 days.

(21) Appl. No.: 14/636,245

(22) Filed: Mar. 3, 2015

(65) Prior Publication Data

US 2015/0268776 A1    Sep. 24, 2015

(30) Foreign Application Priority Data

Mar. 18, 2014 (JP) ................. 2014-055024

(51) Int. Cl.
| | |
|---|---|
| *G06F 3/041* | (2006.01) |
| *G02F 1/1333* | (2006.01) |
| *G06F 3/044* | (2006.01) |
| *G06F 1/16* | (2006.01) |

(52) U.S. Cl.
CPC ........ *G06F 3/0412* (2013.01); *G02F 1/13338* (2013.01); *G06F 1/16* (2013.01); *G06F 3/044* (2013.01); *G06F 2203/04103* (2013.01); *G06F 2203/04107* (2013.01)

(58) Field of Classification Search
CPC ...................... G06F 3/044; G06F 3/045; G06F 2203/04103; G06F 3/0412; G06F 2203/04107; G06F 1/16; G06F 3/046; G06F 3/0418; G06F 3/043; G02F 1/13338
USPC .................................................. 345/173–174
See application file for complete search history.

(56) References Cited

U.S. PATENT DOCUMENTS

| | | | |
|---|---|---|---|
| 8,514,356 B2 | 8/2013 | Shiromoto et al. | |
| 2004/0088669 A1* | 5/2004 | Loh ..................... | G06F 17/5068 257/773 |
| 2009/0014812 A1* | 1/2009 | Wang .............. | H01L 21/823425 257/392 |
| 2009/0228854 A1* | 9/2009 | Sakamoto ........... | G06F 17/5068 716/122 |
| 2010/0214233 A1* | 8/2010 | Lee ......................... | G06F 3/044 345/173 |

(Continued)

FOREIGN PATENT DOCUMENTS

| | | |
|---|---|---|
| EP | 0 718 644 A2 | 6/1996 |
| JP | 08-227012 A | 9/1996 |

(Continued)

*Primary Examiner* — Kent W Chang
*Assistant Examiner* — Sujit Shah
(74) *Attorney, Agent, or Firm* — Michael Best & Friedrich LLP

(57) ABSTRACT

An electrode substrate includes a sensing electrode formed on a glass substrate, a concave/convex pattern formed on the glass substrate, and a protective film formed so as to cover the sensing electrode. The concave/convex pattern is disposed closer to an outer periphery of the glass substrate than the sensing electrode is when seen in a plan view. The protective film is formed so as to cover a part of the glass substrate positioned between the sensing electrode and the concave/convex pattern when seen in a plan view.

7 Claims, 31 Drawing Sheets

(56) References Cited

U.S. PATENT DOCUMENTS

| | | | |
|---|---|---|---|
| 2011/0062595 A1* | 3/2011 | Sim | H01L 21/0337 257/775 |
| 2011/0090170 A1* | 4/2011 | Lin | G06F 3/044 345/174 |
| 2011/0163456 A1* | 7/2011 | Miyasaka | H01L 21/6835 257/773 |
| 2011/0176097 A1 | 7/2011 | Shiromoto et al. | |
| 2011/0227858 A1* | 9/2011 | An | G06F 3/044 345/174 |
| 2011/0242020 A1* | 10/2011 | Kang | G06F 3/044 345/173 |
| 2011/0267293 A1* | 11/2011 | Noguchi | G06F 3/0416 345/173 |
| 2011/0304572 A1* | 12/2011 | Wang | G06F 3/044 345/173 |
| 2012/0062486 A1* | 3/2012 | Rho | G06F 3/041 345/173 |
| 2012/0075239 A1* | 3/2012 | Azumi | G06F 3/044 345/174 |
| 2012/0086655 A1* | 4/2012 | Wang | G06F 3/044 345/173 |
| 2012/0249453 A1* | 10/2012 | Tsukamoto | G06F 3/041 345/173 |
| 2012/0319980 A1* | 12/2012 | Nagaoka | H05K 1/0269 345/173 |
| 2013/0057497 A1* | 3/2013 | Cho | G06F 3/044 345/173 |
| 2013/0314625 A1* | 11/2013 | Tsai | G06F 3/044 349/12 |
| 2013/0330858 A1 | 12/2013 | Shiromoto et al. | |
| 2014/0049485 A1* | 2/2014 | Oh | G06F 3/041 345/173 |
| 2014/0062909 A1* | 3/2014 | Choi | G09G 3/32 345/173 |
| 2014/0092036 A1* | 4/2014 | Lin | G06F 3/0412 345/173 |

FOREIGN PATENT DOCUMENTS

| | | |
|---|---|---|
| JP | 09-203803 A | 8/1997 |
| JP | 2008-183489 A | 8/2008 |
| JP | 2011-145535 A | 7/2011 |
| JP | 2014-109904 A | 6/2014 |

* cited by examiner

ELECTRODE SUBSTRATE, DISPLAY DEVICE, INPUT DEVICE AND METHOD OF MANUFACTURING ELECTRODE SUBSTRATE

CROSS-REFERENCE TO RELATED APPLICATIONS

The present application claims priority from Japanese Patent Application No. 2014-055024 filed on Mar. 18, 2014, the content of which is hereby incorporated by reference to this application.

TECHNICAL FIELD OF THE INVENTION

The present invention relates to an electrode substrate, a display device, an input device, and a method of manufacturing an electrode substrate.

BACKGROUND OF THE INVENTION

In recent years, a technique of attaching an input device referred to as a touch panel or a touch sensor to a display surface side of a display device and detecting and outputting an input position when input operations are performed by contacting the touch panel with a finger or an input tool such as a touch pen has been known. Such display devices having a touch panel are widely used in portable information terminals such as mobile phones in addition to computers.

One detecting method for detecting contact positions at which a finger or the like has contacted the touch panel is the electrostatic capacitance method. In an electrostatic capacitive touch panel, a plurality of capacitive elements each made up of a pair of electrodes disposed to be opposed to each other with a dielectric layer interposed therebetween, that is, a driving electrode and a sensing electrode are provided in a plane of the touch panel. Then, the input positions are detected by utilizing the characteristics that the electrostatic capacitance of capacitive elements changes when performing input operations by contacting the capacitive elements with a finger or an input tool such as a touch pen.

In the display device to which an input device such as a touch panel is attached, it is desirable to reduce electric resistance of the sensing electrodes for improving the detection performance, and thus a conductive film such as a metal film is sometimes used as a material of the sensing electrode. Thus, in an electrode substrate included in the display device and formed of a base and the sensing electrode formed on the base, a protective film is formed so as to cover the sensing electrode for preventing corrosion of the sensing electrode. At this time, for example, a protective film is formed by applying coating liquid by the use of an ink jet method so as to cover the sensing electrode formed on the substrate and then curing a coating film formed of the applied coating liquid.

As the method of applying the coating liquid by the use of the ink jet method, for example, Japanese Patent Application Laid-Open Publication No. 8-227012 (Patent Document 1) and Japanese Patent Application Laid-Open Publication No. 9-203803 (Patent Document 2) each describe a method of forming a color filter of a liquid crystal display device by an ink jet method. In addition, Japanese Patent Application Laid-Open Publication No. 2008-183489 (Patent Document 3) describes a method of forming a desired pattern by forming a lyophilic region and a repellant region on a surface of a substrate and then discharging liquid drops to the surface of the substrate by the use of an ink jet method. Further, Japanese Patent Application Laid-Open Publication No. 2011-145535 (Patent Document 4) describes a method of forming an alignment film of a liquid crystal display device by an ink jet method.

SUMMARY

In the manufacture of the electrode substrate described above, after forming sensing electrodes on a substrate serving as a multi-chip substrate having a plurality of electrode-substrate forming regions, a protective film is formed so as to cover the sensing electrodes, thereby forming an electrode-substrate assembly. Thereafter, electrode substrates are manufactured by dividing the formed electrode-substrate assembly into each of the plurality of electrode-substrate forming regions.

However, when the coating liquid is applied onto a substrate by the ink jet method, it is difficult to highly accurately adjust the position of the end portion of the coating liquid spreading on the substrate. Thus, it is difficult to highly accurately adjust the position of the end portion of a protective film that is formed by curing the applied coating film. Consequently, the end portion of the protective film formed in each electrode-substrate forming region is likely to go beyond the outer periphery of each electrode-substrate forming region and thus the manufacturing yield of the electrode substrate is likely to be lowered when dividing the electrode-substrate assembly into the respective electrode-substrate forming regions.

The present invention has been made to solve the problem in existing techniques described above, and an object of the present invention is to provide an electrode substrate capable of highly accurately adjusting the position of an end portion of a protective film when forming the protective film so as to cover electrodes in an electrode substrate.

The typical ones of the inventions disclosed in the present application will be briefly described as follows.

An electrode substrate in one aspect of the present invention includes: a first substrate; a first electrode formed on the first substrate; a first concave/convex pattern formed on the first substrate; and a first protective film formed so as to cover the first electrode. The first concave/convex pattern is disposed closer to an outer periphery of the first substrate than the first electrode is when seen in a plan view, and the first protective film is formed so as to cover a part of the first substrate positioned between the first electrode and the first concave/convex pattern when seen in a plan view.

In another aspect, the first concave/convex pattern includes a first convex portion, and the first convex portion may be formed of a first film that is formed on the first substrate. At this time, the first electrode is formed of a first conductive film that is formed on the first substrate, and the first film may be a second conductive film formed in the same layer as the first conductive film on the first substrate.

In another aspect, the first substrate has a first side, a second side intersecting the first side, a third side opposed to the first side, and a fourth side opposed to the second side when seen in a plan view, and the first convex portion may be disposed closer to the first side than the first electrode is when seen in a plan view. At this time, the first convex portion may extend in a first direction along the first side when seen in a plan view. Also, the first concave/convex pattern includes a plurality of the first convex portions, and each of the plurality of first convex portions may extend in the first direction and may be arrayed in a second direction that intersects the first direction when seen in a plan view.

Also, the first concave/convex pattern includes a plurality of the first convex portions, and the plurality of first convex portions may be arranged in a staggered pattern in a first direction along the first side when seen in a plan view. Also, the first convex portion includes a first side surface portion positioned on a first side in a second direction that orthogonally intersects the first direction when seen in a plan view, and an upper end portion of the first side surface portion may be positioned closer to the first side than a lower end portion of the first side surface portion is in the second direction.

In another aspect, an end portion of the first protective film may be positioned on the first concave/convex pattern. At this time, the electrode substrate may include a second protective film formed so as to cover a part of the first concave/convex pattern exposed from the first protective film. Also, the first concave/convex pattern may be a position adjustment pattern for adjusting a position of the end portion of the first protective film.

In another aspect, the electrode substrate may include a plurality of the first electrodes. Then, the plurality of first electrodes form a first electrode group, the first protective film is formed so as to cover the first electrode group, the first concave/convex pattern is disposed so as to surround the first electrode group when seen in a plan view, and the first protective film may be formed so as to cover a part of the first substrate positioned between the first electrode group and the first concave/convex pattern when seen in a plan view.

Also, a display device in another aspect of the present invention includes: the electrode substrate described above; and a display unit for displaying an image. The first electrode, the first concave/convex pattern, and the first protective film are formed on a first main surface side of the first substrate. The display unit includes: a plurality of pixels arrayed with a gap between each other when seen in a plan view; a plurality of second electrodes provided inside each of the plurality of pixels; and a third electrode provided so as to be overlapped with the plurality of second electrodes when seen in a plan view. Also, the electrode substrate includes a plurality of the first electrodes provided with a gap between each other so as to be respectively overlapped with the third electrode when seen in a plan view, and the plurality of pixels and the plurality of second electrodes are provided on a second main surface side on an opposite side of the first main surface of the first substrate. Then, an image is displayed by applying a voltage between each of the plurality of second electrodes and the third electrode, and an input position is sensed based on electrostatic capacitance between the third electrode and each of the plurality of first electrodes.

Also, an input device in another aspect of the present invention includes: the electrode substrate described above; and a second electrode provided so as to be overlapped with the first electrode when seen in a plan view. The first electrode, the first concave/convex pattern, and the first protective film are formed on a first main surface side of the first substrate. Also, the electrode substrate includes a plurality of the first electrodes provided with a gap between each other when seen in a plan view, and the second electrode is provided so as to be overlapped with each of the plurality of first electrodes when seen in a plan view. Then, an input position is sensed based on electrostatic capacitance between the second electrode and each of the plurality of first electrodes.

Also, a method of manufacturing an electrode substrate in another aspect of the present invention includes the steps of: (a) preparing a first substrate; (b) forming a first electrode on the first substrate; (c) forming a first concave/convex pattern on the first substrate; and (d) after the step (c), forming a first protective film so as to cover the first electrode. Also, in the step (c), the first concave/convex pattern disposed closer to an outer periphery of the first substrate than the first electrode is when seen in a plan view is formed, and in the step (d), the first protective film is formed so as to cover a part of the first substrate positioned between the first electrode and the first concave/convex pattern when seen in a plan view.

In another aspect, in the step (d), the first protective film may be formed by applying a coating liquid so as to cover the first electrode by an ink jet method or an electric field jet method. At this time, the step (d) includes the steps of: (d1) applying the coating liquid by an ink jet method or an electric field jet method; and (d2) forming the first protective film by curing the applied coating liquid, and in the step (d1), the coating liquid may be applied so that an end portion of the applied coating liquid is positioned on the first concave/convex pattern.

In another aspect, in the step (b), the first electrode formed of a first conductive film that is formed on the first substrate is formed, in the step (c), the first concave/convex pattern including a first convex portion is formed, and the first convex portion may be formed of a second conductive film formed in the same layer as the first conductive film on the first substrate.

In another aspect, in the step (a), the first substrate having a plurality of electrode-substrate forming regions when seen in a plan view is prepared, in the step (b), the first electrode is formed in each of the electrode-substrate forming regions, in the step (c), the first concave/convex pattern disposed closer to the outer periphery of each of the electrode-substrate forming regions than the first electrode is when seen in a plan view may be formed in each of the electrode-substrate forming regions. Also, the method of manufacturing an electrode substrate may further include the step of: (e) after the step (d), dividing the first substrate into each of the plurality of electrode-substrate forming regions. At this time, in the step (a), the first substrate having a frame region that surrounds the plurality of electrode-substrate forming regions when seen in a plan view is prepared, and an alignment mark may be formed on the first substrate in the frame region. Then, the method of manufacturing an electrode substrate further includes the step of: (f) before the step (d), forming a second concave/convex pattern disposed so as to surround the alignment mark when seen in a plan view on the first substrate in the frame region.

DETAILED DESCRIPTION

Figure 1:
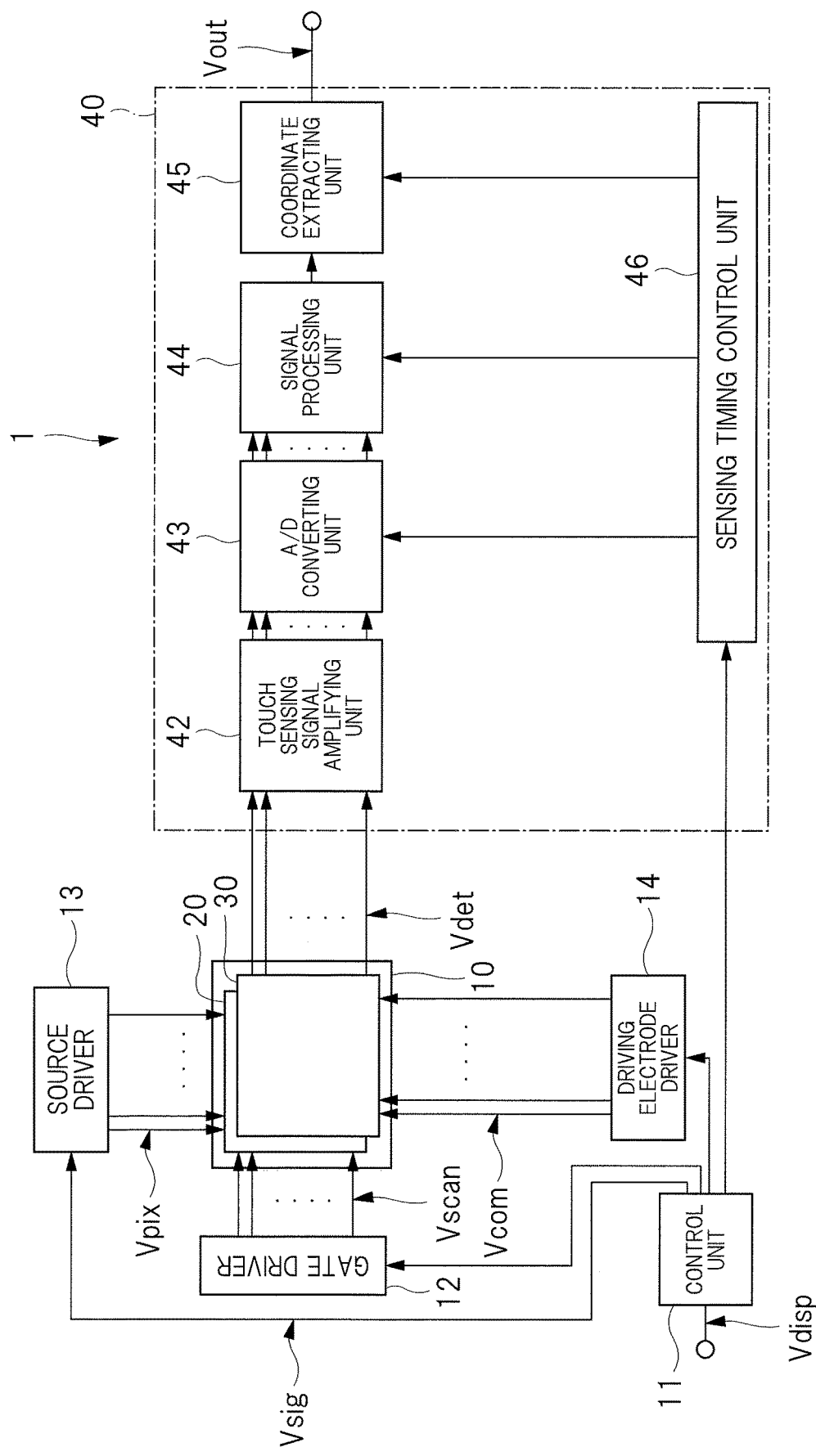
FIG. 1 is a block diagram illustrating a configuration example of a display device according to the first embodiment.

Hereinafter, embodiments of the present invention will be described with reference the accompanied drawings.

Note that the disclosure is merely an example and suitable changes which may be easily derived by a person skilled in the art while the gist of invention is maintained are included in the scope of the present invention as a matter of course. In addition, while the width, thickness, shape, etc. of respective parts may be schematically illustrated in the drawings as compared with the embodiments for clarity in the description, they are merely examples and do not limit the interpretation of the present invention.

In the specification and the drawings, the same components as those having been already mentioned in already-mentioned drawings are denoted by the same reference numerals or symbols and detailed descriptions thereof may be appropriately omitted.

In addition, in some drawings used in the embodiments, hatching is omitted even in a cross-sectional view so as to make the drawings easy to see. Also, hatching is used even in a plan view so as to make the drawings easy to see.

Moreover, in the embodiments described below, when a range is shown as A to B, that range means A or more and B or less unless specifically mentioned.

First Embodiment

First, an example in which a display device provided with a touch panel as an input device is applied to an in-cell liquid crystal display device with a touch sensing function will be described as the first embodiment. Note that an in-cell liquid crystal display device with a touch sensing function indicates a liquid crystal display device with a touch sensing function in which at least one of the driving electrodes and the sensing electrodes included in the touch panel are incorporated in the liquid crystal display device as the driving electrodes for driving liquid crystal of the liquid crystal display device.

<Overall Configuration>

First, the overall configuration of the display device according to the present first embodiment will be described with reference to FIG. 1. FIG. 1 is a block diagram illustrating one configuration example of a display device according to the first embodiment.

A display device 1 includes a display device 10 with a touch sensing function, a control unit 11, a gate driver 12, a source driver 13, a driving electrode driver 14, and a touch sensing unit 40.

The display device 10 with a touch sensing function includes a liquid crystal display device 20 and a touch sensing device 30. The liquid crystal display device 20 is a display device using liquid crystal display elements as display elements. The touch sensing device 30 is a touch sensing device of electrostatic capacitance type, that is, an electrostatic capacitive touch sensing device. Therefore, the display device 1 is a display device including an input device with a touch sensing function. Further, the display device 10 with a touch sensing function is a display device in which the liquid crystal display device 20 and the touch sensing device 30 are integrated, and is a display device incorporating a touch sensing function, namely, an in-cell display device with a touch sensing function.

Further, the display device 10 with a touch sensing function may be a display device in which the touch sensing device 30 is attached on the liquid crystal display device 20. Further, it is also possible to use an organic EL (Electroluminescence) display device instead of the liquid crystal display device 20.

The liquid crystal display device 20 performs display by sequentially scanning each horizontal line in the display region in accordance with scanning signals Vscan supplied from the gate driver 12. The touch sensing device 30 operates in accordance with a principle of electrostatic capacitive touch sensing and outputs sensing signals Vdet as will be described later.

The control unit 11 is a circuit which respectively supplies control signals to the gate driver 12, the source driver 13, the driving electrode driver 14 and the touch sensing unit 40 based on video signals Vdisp supplied from outside for controlling them so that they are operated in synchronization with each other.

The gate driver 12 has a function of sequentially selecting one horizontal line, which is an object of display driving of the display device 10 with a touch sensing function, based on control signals supplied from the control unit 11.

The source driver 13 is a circuit which supplies pixel signals Vpix to sub-pixels SPix included in the display device 10 with a touch sensing function (see FIG. 10 to be described later) based on control signals of image signals Vsig supplied from the control unit 11.

The driving electrode driver 14 is a circuit which supplies driving signals Vcom to common electrodes COML included in the display device 10 with a touch sensing function (see FIG. 7 or FIG. 8 to be described later) based on control signals supplied from the control unit 11.

The touch sensing unit 40 is a circuit which senses presence/absence of touches of a finger or an input tool such as a touch pen to the touch sensing device 30, namely, a state of contact or approach to be described later based on control signals supplied from the control unit 11 and sensing signals Vdet supplied from the touch sensing device 30 of the display device 10 with a touch sensing function. Also, the touch sensing unit 40 is a circuit which obtains coordinates of touches, namely, input positions in the touch sensing region in the case where the touches are present. The touch sensing unit 40 includes a touch sensing signal amplifying unit 42, an A/D (Analog/Digital) converting unit 43, a signal processing unit 44, a coordinate extracting unit 45 and a sensing timing control unit 46.

The touch sensing signal amplifying unit 42 amplifies sensing signals Vdet supplied from the touch sensing device 30. The touch sensing signal amplifying unit 42 may be provided with a low pass analog filter which removes high frequency components, namely, noise components included in the sensing signals Vdet and extracts and respectively outputs touch components.

<Principle of Electrostatic Capacitive Touch Sensing>

Figure 2:
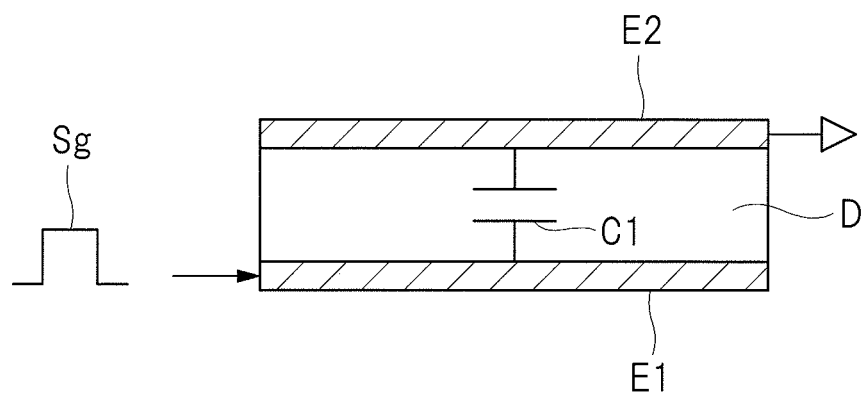
FIG. 2 is an explanatory diagram illustrating a state in which no finger contacts or approaches a touch sensing device.
Figure 3:
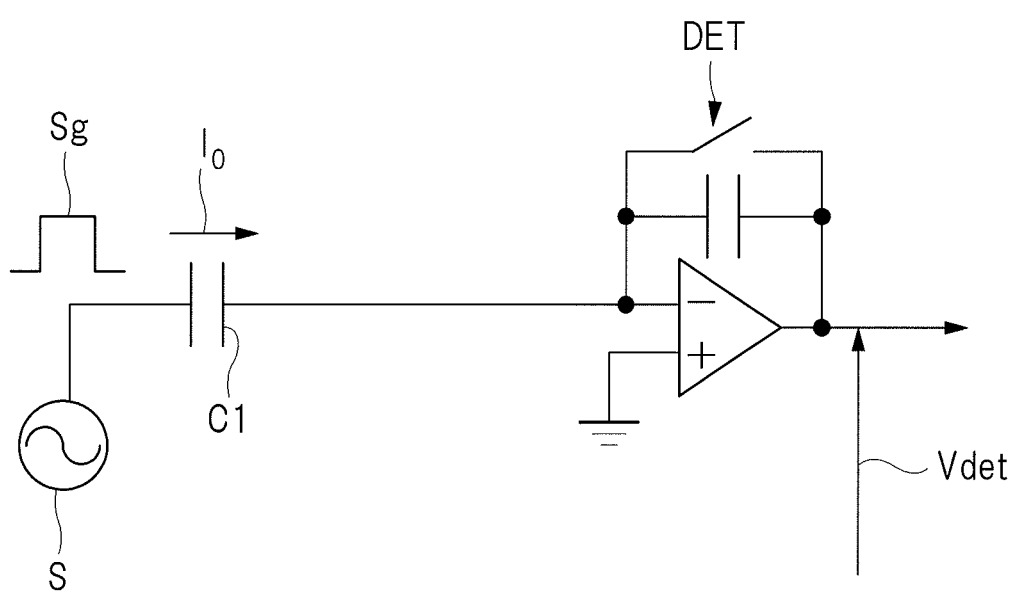
FIG. 3 is an explanatory diagram illustrating an example of an equivalent circuit in a state in which no finger contacts or approaches a touch sensing device.
Figure 4:
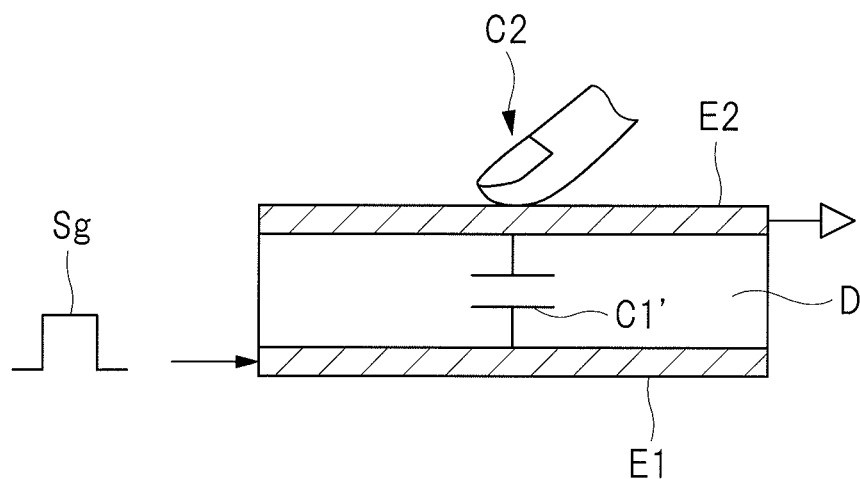
FIG. 4 is an explanatory diagram illustrating a state in which a finger has contacted or approached the touch sensing device.
Figure 5:
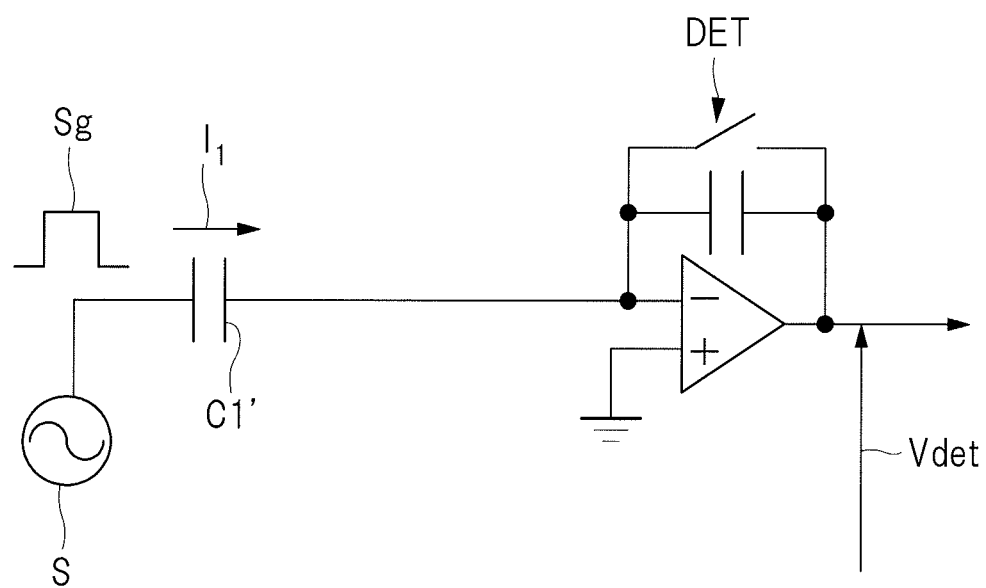
FIG. 5 is an explanatory diagram illustrating an example of an equivalent circuit in a state in which a finger has contacted or approached the touch sensing device.
Figure 6:
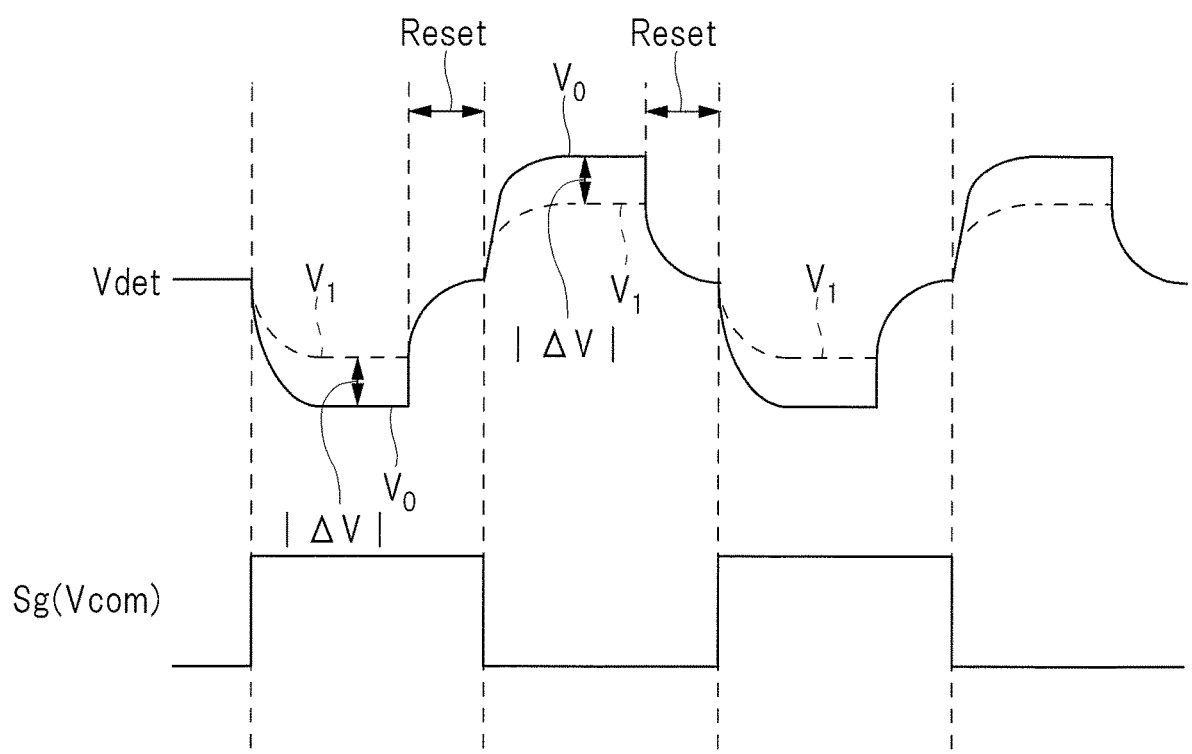
FIG. 6 is a diagram illustrating one example of waveforms of a driving signal and a sensing signal.

Next, the principle of touch sensing in the display device 1 according to the present first embodiment will be described with reference to FIG. 1 to FIG. 6. FIG. 2 is an explanatory diagram illustrating a state in which no finger contacts or approaches a touch sensing device. FIG. 3 is an explanatory diagram illustrating an example of an equivalent circuit in a state in which no finger contacts or approaches the touch sensing device. FIG. 4 is an explanatory diagram illustrating a state in which a finger has contacted or approached the touch sensing device. FIG. 5 is an explanatory diagram illustrating an example of an equivalent circuit in a state in which a finger has contacted or approached the touch sensing device. FIG. 6 is a diagram illustrating one example of waveforms of a driving signal and a sensing signal.

As illustrated in FIG. 2, in the electrostatic capacitive touch sensing, an input device referred to as a touch panel or a touch sensor includes a driving electrode E1 and a sensing electrode E2 which are disposed to be opposed to each other with a dielectric body D interposed therebetween. A capacitive element C1 is formed by the driving electrode E1 and the sensing electrode E2. As illustrated in FIG. 3, one end of the capacitive element C1 is connected to an AC signal source S which is a driving signal source, and the other end of the capacitive elements C1 is connected to a voltage sensor DET which is the touch sensing unit. The voltage sensor DET is, for example, an integrating circuit included in the touch sensing signal amplifying unit 42 illustrated in FIG. 1.

When an AC rectangular wave Sg having a frequency in the range of, for example, several kHz to several hundreds kHz is applied from the AC signal source S to the one end of the capacitive element C1, namely, the driving electrode E1, a sensing signal Vdet which is an output waveform is generated via the voltage sensor DET connected to the other end of the capacitive element C1, namely, the sensing electrodes E2. Note that the AC rectangular wave Sg corresponds to, for example, the driving signal Vcom illustrated in FIG. 6.

In the state in which no finger contacts or approaches, namely, in the non-contact state illustrated in FIG. 2, current $I_0$ corresponding to the capacitance value of the capacitive element C1 flows in accordance with charge and discharge of the capacitive element C1 as illustrated in FIG. 3. The voltage sensor DET converts the fluctuation in the current $I_0$ in accordance with the AC rectangular wave Sg into the fluctuation in voltage. The voltage fluctuation is represented as the waveform $V_0$ indicated by a solid line in FIG. 6.

On the other hand, in a state in which a finger contacts or approaches, namely, in the contact state illustrated in FIG. 4, the capacitive element formed of the driving electrode E1 and the sensing electrode E2 is affected by the electrostatic capacitance C2 formed by the finger and acts as a capacitive element C1' having a capacitance value smaller than the capacitance value of the capacitive element C1. When viewed in the equivalent circuit illustrated in FIG. 5, current $I_1$ flows through the capacitive element C1'. The voltage sensor DET converts the fluctuation in the current $I_1$ in accordance with the AC rectangular wave Sg into the fluctuation in voltage. This voltage fluctuation is represented as the waveform $V_1$ indicated by a broken line in FIG. 6. In this case, the amplitude of the waveform $V_1$ is smaller than that of the above-described waveform $V_0$. Accordingly, the absolute value |ΔV| of the voltage difference between the waveform $V_0$ and waveform $V_1$ is varied in accordance with influences of an object such as a finger which approaches from outside. Note that, in order to accurately sense the absolute value |ΔV| of the voltage difference between the waveform $V_0$ and the waveform $V_1$, it is preferable that a period Reset during which charge and discharge of the capacitor are reset in accordance with a frequency of the AC rectangular wave Sg by the switching in the circuit is provided in the operation of the voltage sensor DET.

In the example illustrated in FIG. 1, the touch sensing device 30 performs touch sensing for each sensing block corresponding to one or a plurality of common electrodes COML in accordance with the driving signal Vcom supplied from the driving electrode driver 14. More specifically, the touch sensing device 30 outputs the sensing signal Vdet via the voltage sensor DET illustrated in FIG. 3 or FIG. 5 for each sensing block corresponding to each of the one or a plurality of common electrodes COML, and supplies the output sensing signal Vdet to the A/D converting unit 43 of the touch sensing unit 40.

The A/D converting unit 43 is a circuit which samples each analog signal output from the touch sensing signal amplifying unit 42 at a timing in synchronization with the driving signal Vcom, thereby converting it into a digital signal.

The signal processing unit 44 is provided with a digital filter which reduces frequency components other than the frequency at which the driving signal Vcom is sampled, namely, noise components included in the output signal of the A/D converting unit 43. The signal processing unit 44 is a logic circuit which senses presence/absence of touches to the touch sensing device 30 based on the output signal of the A/D converting unit 43. The signal processing unit 44 performs the process of extracting only differential voltage caused by the finger. The differential voltage caused by the finger is the absolute value |ΔV| of the difference between the waveform $V_0$ and waveform $V_1$ mentioned above. It is also possible that the signal processing unit 44 performs calculations of averaging absolute values |ΔV| per each sensing block to obtain the average value of the absolute values |ΔV|. By this means, the signal processing unit 44 can reduce the influences of noise. The signal processing unit 44 compares the sensed differential voltage caused by the finger with a predetermined threshold voltage, and when the voltage is equal to or higher than the threshold voltage, it is determined to be the contact state of an externally approaching object which approaches from outside, and when the voltage is lower than the threshold voltage, it is determined to be the non-contact state of an externally approaching object. In this manner, touch sensing is performed by the touch sensing unit 40.

The coordinate extracting unit 45 is a logic circuit which obtains the coordinates of the position at which the touch has been sensed by the signal processing unit 44, namely, the input position on the touch panel. The sensing timing control unit 46 controls the A/D converting unit 43, the signal processing unit 44 and the coordinate extracting unit 45 so that they are operated in synchronization with each other. The coordinate extracting unit 45 outputs the touch panel coordinates as a signal output Vout.

<Module>

Figure 7:
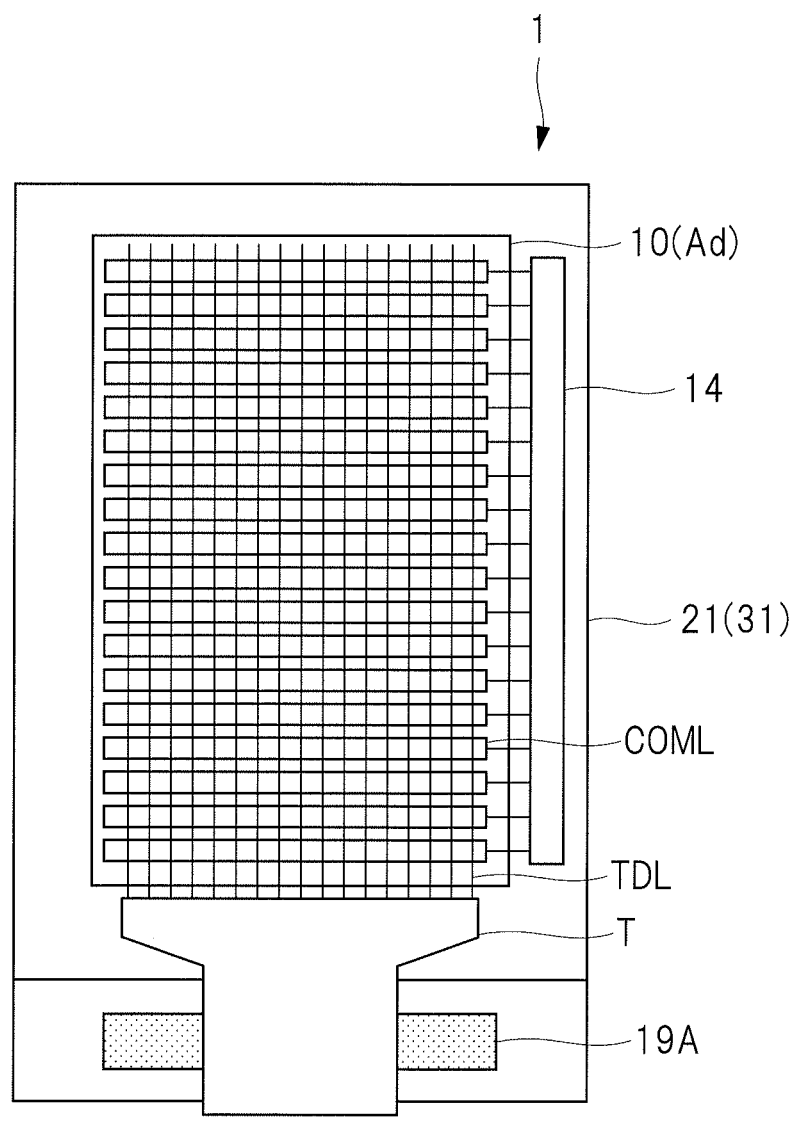
FIG. 7 is a plan view illustrating one example of a module having the display device according to the first embodiment mounted therein.
Figure 8:
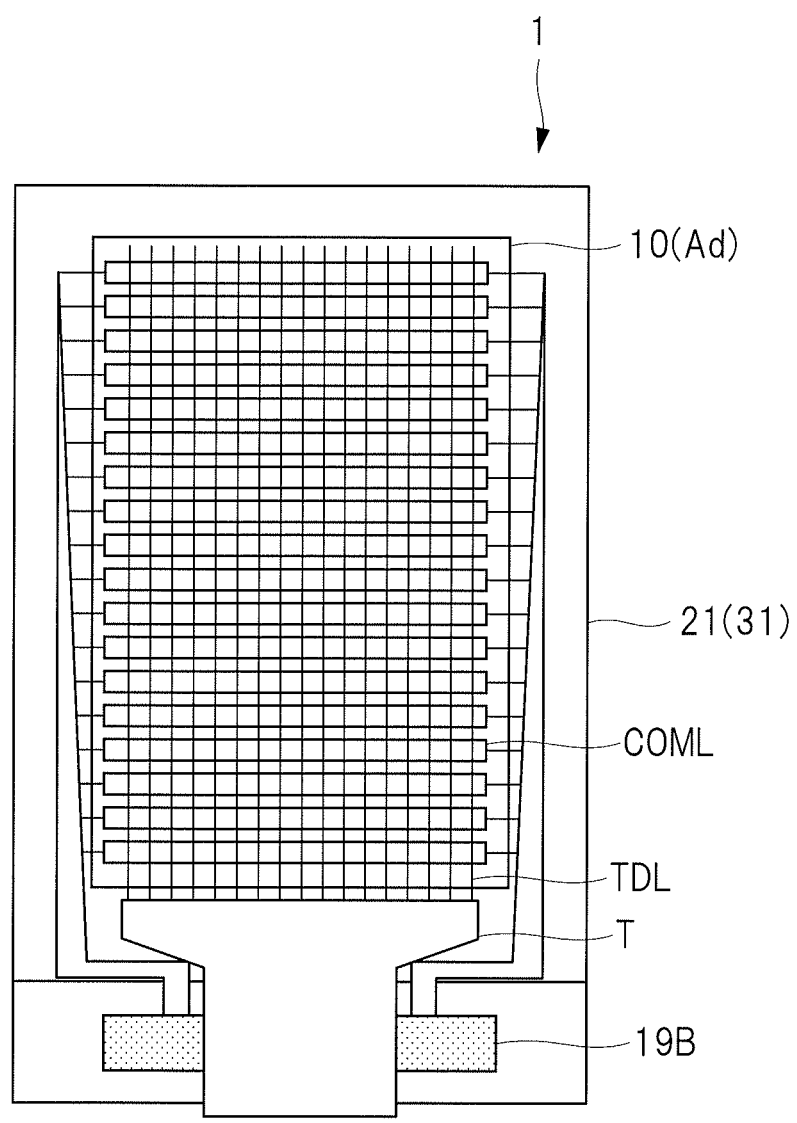
FIG. 8 is a plan view illustrating one example of a module having the display device according to the first embodiment mounted therein.

FIG. 7 and FIG. 8 are plan views illustrating one example of a module having the display device according to the first embodiment mounted therein. In the example illustrated in FIG. 7, the above-described driving electrode driver 14 is formed on a TFT substrate 21.

As illustrated in FIG. 7, the display device 1 includes the display device 10 with a touch sensing function, the driving electrode driver 14, a COG (chip on glass) 19A and the TFT substrate 21.

The display device 10 with a touch sensing function includes a plurality of common electrodes COML and a plurality of sensing electrodes TDL. Here, two directions which mutually intersect, preferably orthogonally, with each other within an upper surface serving as a main surface of the TFT substrate 21 are defined to be an X axis direction and a Y axis direction. At this time, the plurality of common electrodes COML respectively extend in the X axis direction and are arrayed in the Y axis direction when seen in a plan view. Further, the plurality of sensing electrodes TDL respectively extend in the Y axis direction and are arrayed in the X axis direction when see in a plan view. In other words, the plurality of sensing electrodes TDL intersect the plurality of common electrodes COML and are arrayed in the X axis direction when seen in a plan view. Therefore, each of the plurality of sensing electrodes TDL intersects the plurality of common electrodes COML when seen in a plan view. Note that the region in which the display device 10 with a touch sensing function is formed is the same region as the display region Ad in which images are displayed.

As will be described later with reference to FIG. 9 and FIG. 10, each of the plurality of common electrodes COML is provided so as to overlap the plurality of sub-pixels SPix arrayed in the X axis direction when seen in a plan view. More specifically, one common electrode COML is provided as a common electrode for the plurality of sub-pixels SPix.

Note that the expression "when seen in a plan view" in the present specification indicates the case in which components are seen from a direction perpendicular to the upper surface serving as the main surface of the TFT substrate 21 or a glass substrate 31 included in an opposing substrate 3 described later.

In the example illustrated in FIG. 7, the display device 10 with a touch sensing function has a rectangular shape with two sides which respectively extend in the X axis direction and are opposed to each other and two sides which respectively extend in the Y axis direction and are opposed to each other when seen in a plan view. A terminal unit T formed of a flexible substrate or the like is provided on one side of the display device 10 with a touch sensing function in the Y axis direction. The sensing electrode TDL is connected to the touch sensing unit 40 mounted to the outside of the module via the terminal unit T.

The driving electrode driver 14 is formed on the TFT substrate 21 made of, for example, a glass substrate. The COG 19A is a chip mounted on the TFT substrate 21 and incorporates respective circuits necessary for display operations such as the control unit 11, the gate driver 12 and the source driver 13 illustrated in FIG. 1.

On the other hand, the display device 1 may incorporate the driving electrode driver 14 in the COG. An example in which the driving electrode driver 14 is incorporated in the COG is illustrated in FIG. 8. In the example illustrated in FIG. 8, the display device 1 includes a COG 19B in its module. In the COG 19B illustrated in FIG. 8, the driving electrode driver 14 is incorporated in addition to the above-described respective circuits necessary for the display operations.

Note that, as illustrated in FIG. 7 and FIG. 8, a planar shape of the glass substrate 31 can be substantially the same as that of the TFT substrate 21.

<Display Device with Touch Sensing Function>

Next, a configuration example of the display device 10 with a touch sensing function will be described in details. FIG. 9 is a cross-sectional view illustrating the display device with a touch sensing function in the display device according to the first embodiment. FIG. 10 is a circuit diagram illustrating the display device with a touch sensing function in the display device according to the first embodiment.

The display device 10 with a touch sensing function includes a pixel substrate 2, an opposing substrate 3 and a liquid crystal layer 6. The opposing substrate 3 is disposed so that an upper surface serving as a main surface of the pixel substrate 2 and a lower surface serving as a main surface of the opposing substrate 3 oppose each other. The liquid crystal layer 6 is provided between the pixel substrate 2 and the opposing substrate 3.

The pixel substrate 2 includes the TFT substrate 21. As illustrated in FIG. 10, in the display region Ad, a plurality of scanning lines GCL, a plurality of signal lines SGL and a plurality of TFT elements Tr which are thin film transistors (TFT) are formed on the TFT substrate 21. Note that, in FIG. 9, the illustration of the scanning lines GCL, the signal lines SGL and the TFT elements Tr is omitted.

Figure 10:
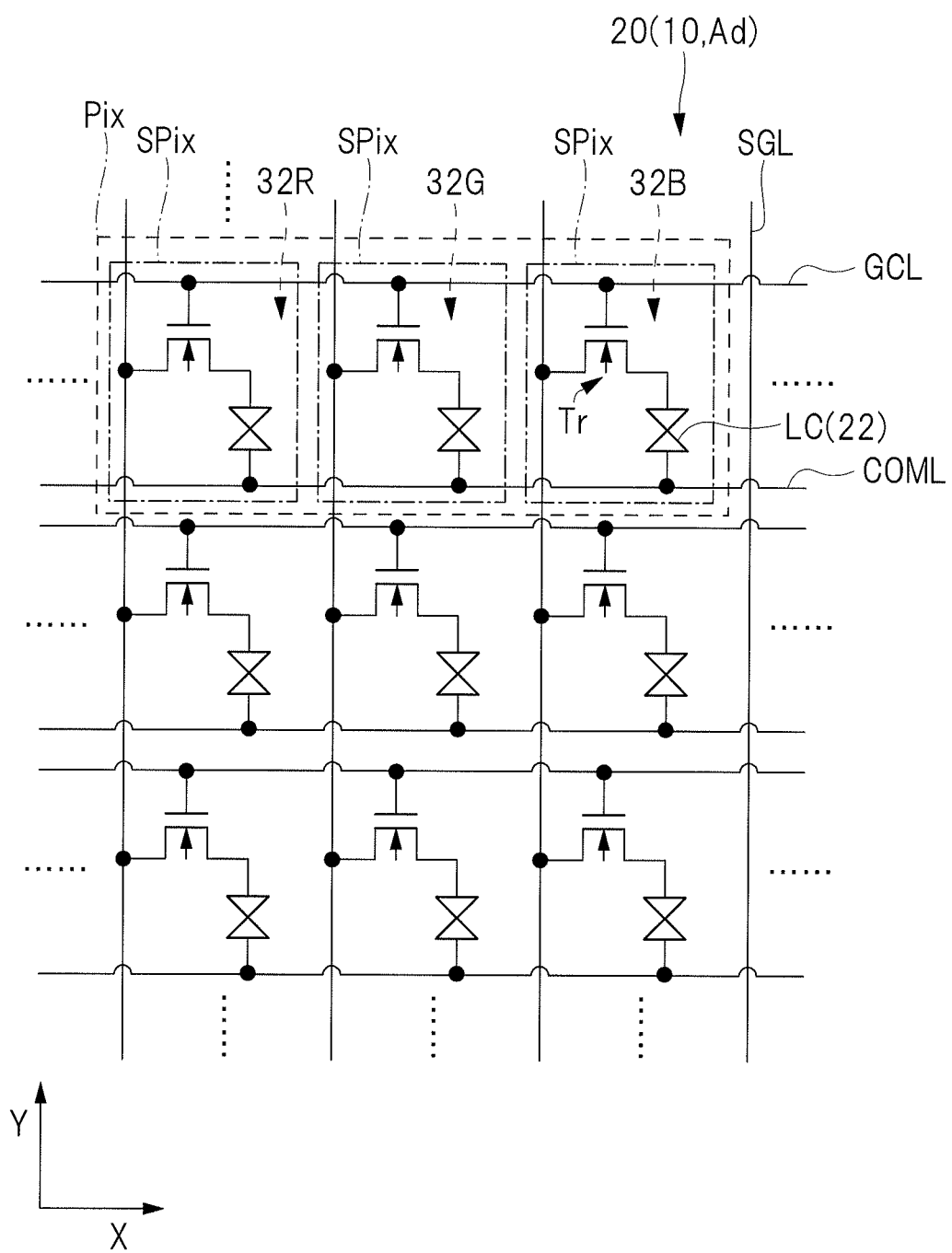
FIG. 10 is a circuit diagram illustrating a display device with a touch sensing function in the display device according to the first embodiment.

As illustrated in FIG. 10, the plurality of scanning lines GCL respectively extend in the X axis direction and are arrayed in the Y axis direction in the display region Ad. The plurality of signal lines SGL respectively extend in the Y axis direction and are arrayed in the X axis direction in the display region Ad. Accordingly, each of the plurality of signal lines SGL intersects the plurality of scanning lines GCL when seen in a plan view. In this manner, sub-pixels SPix are demarcated by the plurality of scanning lines GCL and the plurality of signal lines SGL which intersect each other when seen in a plan view, and a single pixel Pix is formed by a plurality of sub-pixels SPix having different colors. More specifically, on the TFT substrate 21, the sub-pixels SPix are arrayed in a matrix form in the X axis direction and the Y axis direction in the display region Ad. In other words, the sub-pixels SPix are arrayed in a matrix form in the X axis direction and the Y axis direction in the display region Ad on a front surface side of the TFT substrate 21.

The TFT element Tr is formed at an intersecting portion at which each of the plurality of scanning lines GCL and each of the plurality of signal lines SGL intersect each other when seen in a plan view. Accordingly, in the display region Ad, the plurality of TFT elements Tr are formed on the TFT substrate 21, and the plurality of TFT elements Tr are arrayed in a matrix form in the X axis direction and the Y axis direction. More specifically, each of the plurality of sub-pixels SPix is provided with the TFT element Tr. Also, each of the plurality of sub-pixels SPix is provided with a liquid crystal element LC in addition to the TFT element Tr.

The TFT element Tr is made up of, for example, a thin film transistor such as a n-channel MOS (metal oxide semiconductor). The gate electrode of the TFT element Tr is connected to the scanning lines GCL. One of the source electrode and the drain electrode of the TFT element Tr is connected to the signal line SGL. The other one of the source electrode and the drain electrode of the TFT element Tr is connected to one end of the liquid crystal element LC. One end of the liquid crystal element LC is connected to the source electrode or the drain electrode of the TFT element Tr, and the other end thereof is connected to the common electrode COML.

Figure 9:
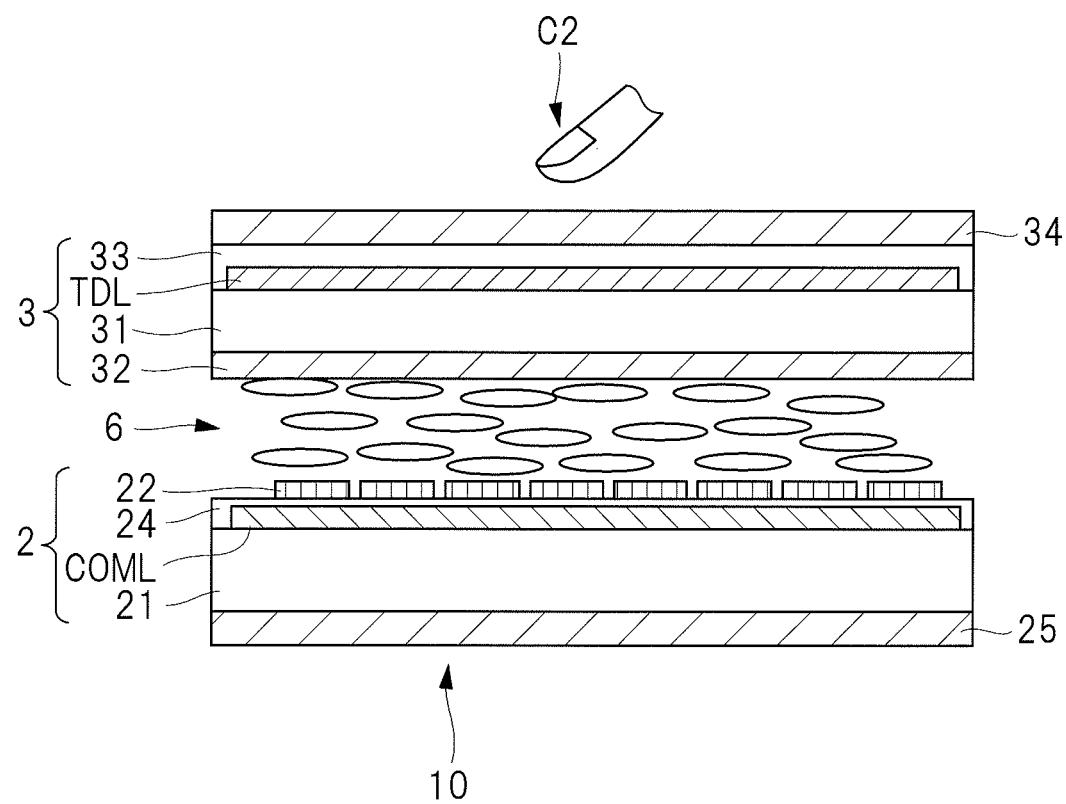
FIG. 9 is a cross-sectional view illustrating a display device with a touch sensing function in the display device according to the first embodiment.

As illustrated in FIG. 9, the pixel substrate 2 includes the plurality of common electrodes COML, an insulating film 24, and a plurality of pixel electrodes 22. The plurality of common electrodes COML are provided on the TFT substrate 21 in the display region Ad (see FIG. 7 or FIG. 8) on the front surface side of the TFT substrate 21. The insulating film 24 is formed on the TFT substrate 21 with the inclusion of the front surfaces of each of the plurality of common electrodes COML. In the display region Ad, a plurality of pixel electrodes 22 are formed on the insulating film 24. Accordingly, the insulating film 24 electrically insulates the common electrodes COML and the pixel electrodes 22.

As illustrated in FIG. 10, each of the plurality of pixel electrodes 22 is formed within each of the plurality of sub-pixels SPix arrayed in a matrix form in the X axis direction and the Y axis direction in the display region Ad on the front surface side of the TFT substrate 21. Accordingly, the plurality of pixel electrodes 22 are arrayed in a matrix form in the X axis direction and the Y axis direction.

In the example illustrated in FIG. 9, each of the plurality of common electrodes COML is formed between the TFT substrate and the pixel electrodes 22. Also, as schematically illustrated in FIG. 10, each of the plurality of common electrodes COML is provided so as to overlap the plurality of pixel electrodes 22 when seen in a plan view. Then, by applying voltage between each of the plurality of pixel electrodes 22 and each of the plurality of common electrodes COML so that voltage is applied to the liquid crystal element LC provided in each of the plurality of sub-pixels SPix, an image is displayed in the display region Ad. More specifically, a display portion for displaying an image is formed by the plurality of sub-pixels SPix, the plurality of pixel electrodes 22 and the common electrodes COML.

Note that each of the plurality of common electrodes COML may be formed on the opposite side of the TFT substrate 21 with the pixel electrodes 22 being interposed therebetween.

The liquid crystal layer 6 is provided to modulate light passing therethrough in accordance with the state of the electric field, and a liquid crystal layer adapted to a transverse electric field mode such as FFS (fringe field switching) mode or an IPS (in plane switching) mode is used. More specifically, a liquid crystal display device of transverse electric field mode such as the FFS mode or the IPS mode is used as the liquid crystal display device 20. Note that an alignment film may be provided between the liquid crystal layer 6 and the pixel substrate 2 and between the liquid crystal layer 6 and the opposing substrate 3 illustrated in FIG. 9, respectively.

As illustrated in FIG. 10, the plurality of sub-pixels SPix arrayed in the X axis direction, that is, the plurality of sub-pixels SPix which belong to the same row of the liquid crystal display device 20 are connected to each other by the scanning line GCL. The scanning lines GCL are connected to the gate driver 12 (see FIG. 1) and scanning signals Vscan (see FIG. 1) are supplied thereto from the gate driver 12. Also, the plurality of sub-pixels SPix arrayed in the Y axis direction, that is, the plurality of sub-pixels SPix which belong to the same column of the liquid crystal display device 20 are connected to each other by the signal line SGL. The signal lines SGL are connected to the source driver 13 (see FIG. 1) and pixel signals Vpix (see FIG. 1) are supplied thereto from the source driver 13. Further, the plurality of sub-pixels SPix arrayed in the X axis direction, that is, the plurality of sub-pixels SPix which belong to the same row of the liquid crystal display device 20 are connected to each other by the common electrode COML.

The common electrodes COML are connected to the driving electrode driver 14 (see FIG. 1) and driving signals Vcom (see FIG. 1) are supplied thereto from the driving electrode driver 14. In other words, in the example illustrated in FIG. 10, the plurality of sub-pixels SPix which belong to the same row share one common electrode COML. The plurality of common electrodes COML respectively extend in the X axis direction and are arrayed in the Y axis direction in the display region Ad. As described above, since the plurality of scanning lines GCL respectively extend in the X axis direction and are arrayed in the Y axis direction in the display region Ad, the direction in which each of the plurality of common electrodes COML extends is parallel to the direction in which each of the plurality of scanning lines GCL extends. However, the direction in which each of the plurality of common electrodes COML extends is not limited, and for example, the direction in which each of the plurality of common electrodes COML extends may be a direction which is parallel to the direction in which each of the plurality of signal lines SGL extends.

The gate driver 12 illustrated in FIG. 1 sequentially selects one row, namely, one horizontal line from among the sub-pixels SPix which are arrayed in a matrix form in the liquid crystal display device 20 as an object of display driving by applying the scanning signals Vscan to the gate electrode of the TFT element Tr of each of the sub-pixels SPix via the scanning lines GCL illustrated in FIG. 10. The source driver 13 illustrated in FIG. 1 supplies the pixel signals Vpix to each of the plurality of sub-pixels SPix which constitute one horizontal line sequentially selected by the gate driver 12 via the signal lines SGL illustrated in FIG. 10. Then, displays in accordance with the supplied pixel signals Vpix are made at the plurality of sub-pixels SPix constituting one horizontal line.

The driving electrode driver 14 illustrated in FIG. 1 applies driving signals Vcom to drive the common electrodes COML for each of the sensing blocks corresponding to one or a plurality of common electrodes COML.

In the liquid crystal display device 20, the gate driver 12 is driven so as to sequentially scan the scanning lines GCL on time division basis, thereby sequentially selecting the sub-pixels SPix for each horizontal line. Also, in the liquid crystal display device 20, the source driver 13 supplies pixel signals Vpix to the sub-pixels SPix which belong to one horizontal line, so that displays are made for each horizontal line. In performing the display operation, the driving electrode driver 14 applies driving signals Vcom to a sensing block including the common electrodes COML corresponding to the one horizontal line.

Figure 11:
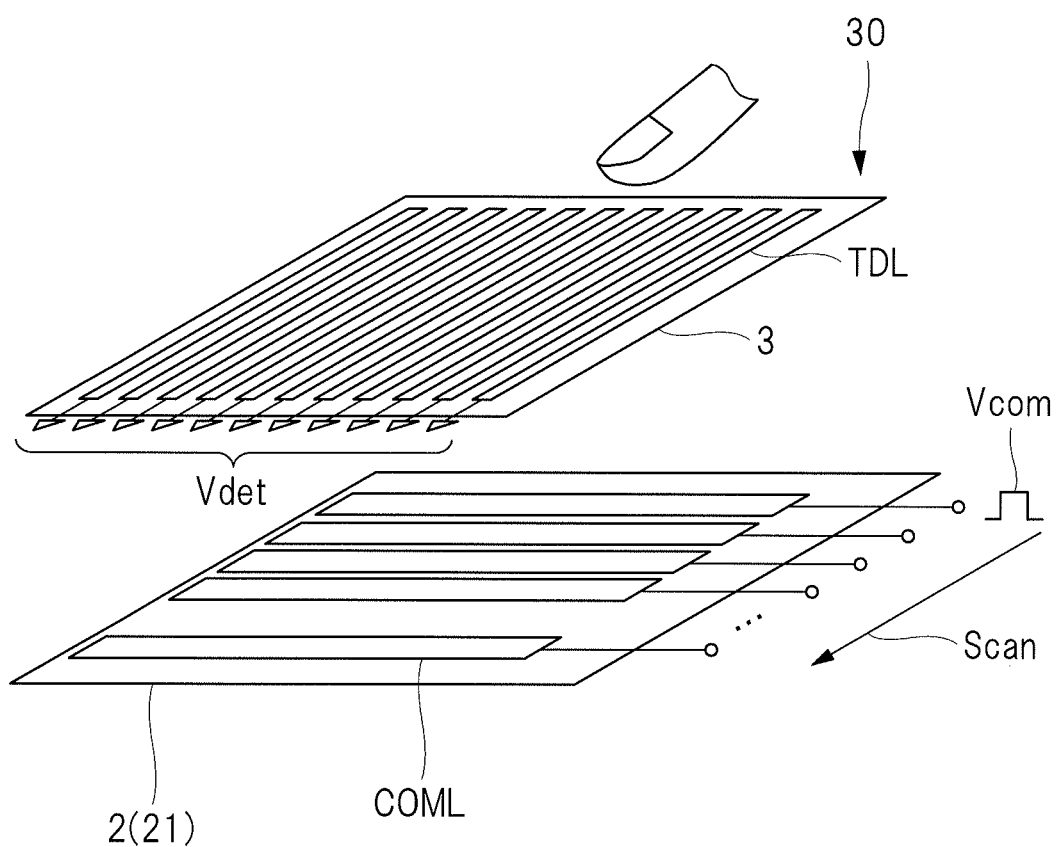
FIG. 11 is a perspective view illustrating one configuration example of driving electrodes and sensing electrodes of the display device according to the first embodiment.

The common electrodes COML of the display device 1 according to the present first embodiment operate as driving electrodes of the liquid crystal display device 20 and also operate as driving electrodes of the touch sensing device 30. FIG. 11 is a perspective view illustrating one configuration example of the driving electrodes and the sensing electrodes of the display device according to the present first embodiment.

The touch sensing device 30 includes a plurality of common electrodes COML provided on the pixel substrate 2 and a plurality of sensing electrodes TDL provided on the opposing substrate 3. The plurality of sensing electrodes TDL respectively extend in the direction which intersects the direction in which each of the plurality of common electrodes COML extends when seen in a plan view. In other words, the plurality of sensing electrodes TDL are provided at intervals so as to respectively overlap the plurality of common electrodes COML when seen in a plan view. Also, each of the plurality of sensing electrodes TDL opposes the common electrodes COML in a direction which is perpendicular to the front surface of the TFT substrate 21 included in the pixel substrate 2. Each of the plurality of sensing electrodes TDL is respectively connected to the touch sensing signal amplifying unit 42 (see FIG. 1) of the touch sensing unit 40. Electrostatic capacitance is generated at intersecting portions between each of the plurality of common electrodes COML and each of the plurality of sensing electrodes TDL seen in a plan view. Thus, input positions are sensed based on the electrostatic capacitance between each of the plurality of common electrodes COML and each of the plurality of sensing electrodes TDL. More specifically, by the electrode substrate as the opposing substrate 3 and the common electrodes COML, a sensing unit for sensing the input position, that is, an input device is formed. Note that, as described above with reference to FIG. 9, the common electrodes COML oppose the pixel electrodes 22 in a direction which is perpendicular to the front surface of the TFT substrate 21.

With the configuration described above, when performing the touch sensing operation in the touch sensing device 30, one sensing block corresponding to one or a plurality of common electrodes COML in a scanning direction Scan is sequentially selected by the driving electrode driver 14. Then, in the selected sensing block, driving signals Vcom for measuring the electrostatic capacitance between the common electrodes COML and the sensing electrodes TDL are input to the common electrodes COML, and sensing signals Vdet for sensing input positions are output from the sensing electrodes TDL. In this manner, the touch sensing device 30 is configured so as to perform the touch sensing for each sensing block. More specifically, one sensing block corresponds to the driving electrode E1 of the above-described principle of touch sensing, and the sensing electrode TDL corresponds to the sensing electrode E2.

As illustrated in FIG. 11, the plurality of common electrodes COML and the plurality of sensing electrodes TDL which intersect each other when seen in a plan view form an electrostatic capacitive touch sensor having a matrix arrangement. Accordingly, by scanning the entire touch sensing surface of the touch sensing device 30, positions which have been contacted or approached by a finger or the like can be sensed.

As illustrated in FIG. 9, the opposing substrate 3 includes a glass substrate 31, a color filter 32, sensing electrodes TDL and a protective film 33. The glass substrate 31 has an upper surface serving as a main surface and a lower surface serving as a main surface opposed to the upper surface. The color filter 32 is formed on the lower surface serving as one main surface of the glass substrate 31. The sensing electrodes TDL are the sensing electrodes of the touch sensing device 30, and are formed on the upper surface serving as the other main surface of the glass substrate 31. The protective film 33 is formed on the upper surface of the glass substrate 31 so as to cover the sensing electrodes TDL. Note that shapes of the sensing electrode TDL as an electrode and the protective film 33 will be described later.

For example, color filters colored in three colors of red (R), green (G) and blue (B) are arrayed in the X axis direction as the color filter 32. In this manner, as illustrated in FIG. 10, a plurality of sub-pixels SPix corresponding to each of color regions 32R, 32G and 32B of the three colors of R, G and B are formed, and one pixel Pix is formed by one set of the plurality of sub-pixels SPix each corresponding to the color regions 32R, 32G and 32B. The pixels Pix are arrayed in a matrix form in the direction in which the scanning lines GCL extend (X axis direction) and the direction in which the signal lines SGL extend (Y axis direction). Further, the region in which the pixels Pix are arrayed in a matrix form is the above-described display region Ad. Note that the combination of colors of the color filter 32 may be another combination including a plurality of colors other than R, G and B. It is also possible to provide no color filter 32. Alternatively, one pixel Pix may include a sub-pixel SPix which is not provided with the color filter 32, that is, a white-colored sub-pixel SPix.

Note that, as illustrated in FIG. 9, a polarizing plate 25 may be provided on the opposite side of the opposing substrate 3 with the pixel substrate 2 interposed therebetween. In addition, a polarizing plate 34 may be provided on the opposite side of the pixel substrate 2 with the opposing substrate 3 interposed therebetween.

<Configuration of Electrode Substrate>

Next, a configuration of the electrode substrate will be described with reference to FIGS. 12 to 15. Note that, in the description of the first embodiment, an electrode substrate used as an opposing substrate to which sensing electrodes are formed in a display device with an input device is taken as an example.

Figure 12:
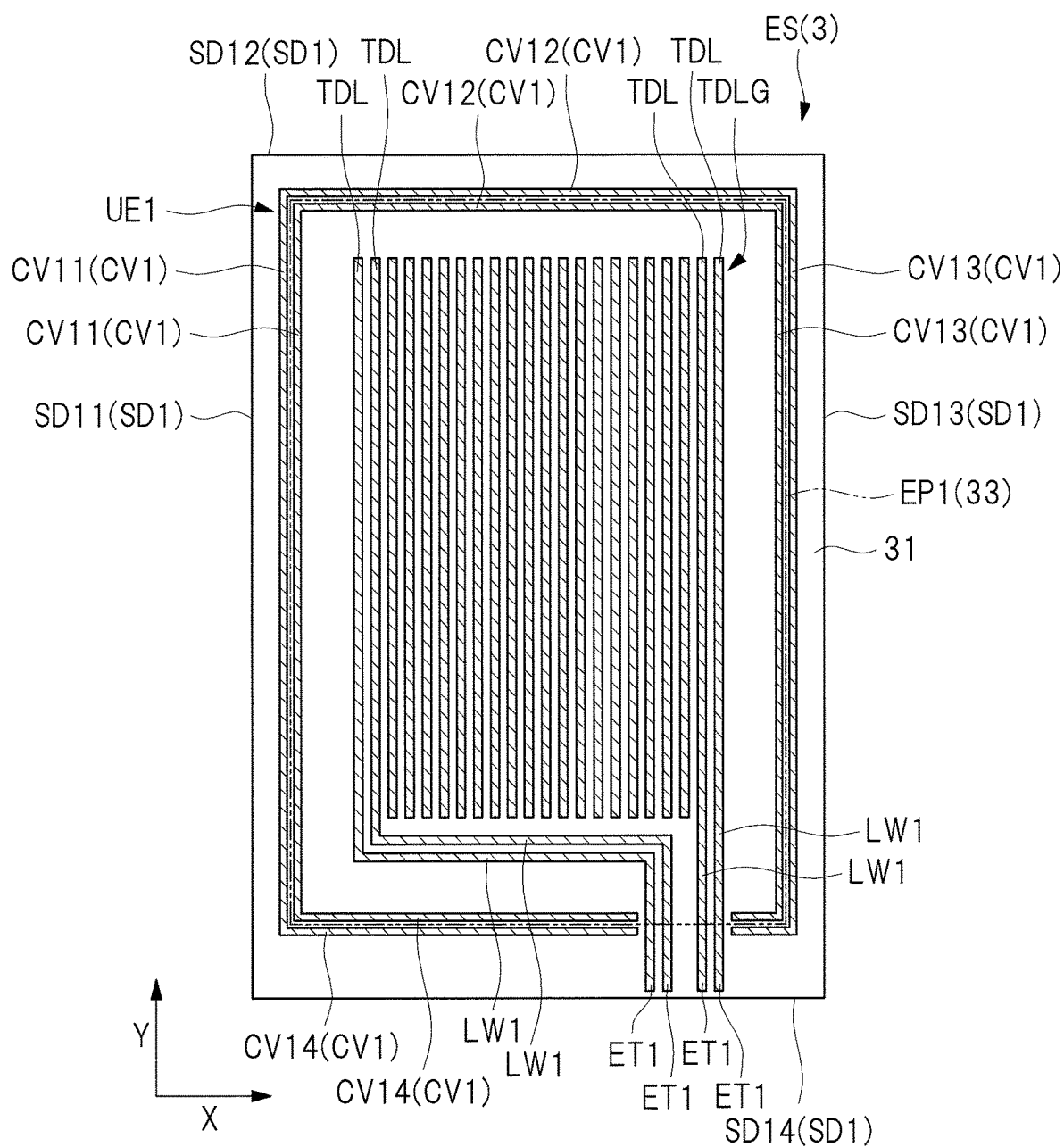
FIG. 12 is a plan view illustrating an electrode substrate according to the first embodiment.
Figure 13:
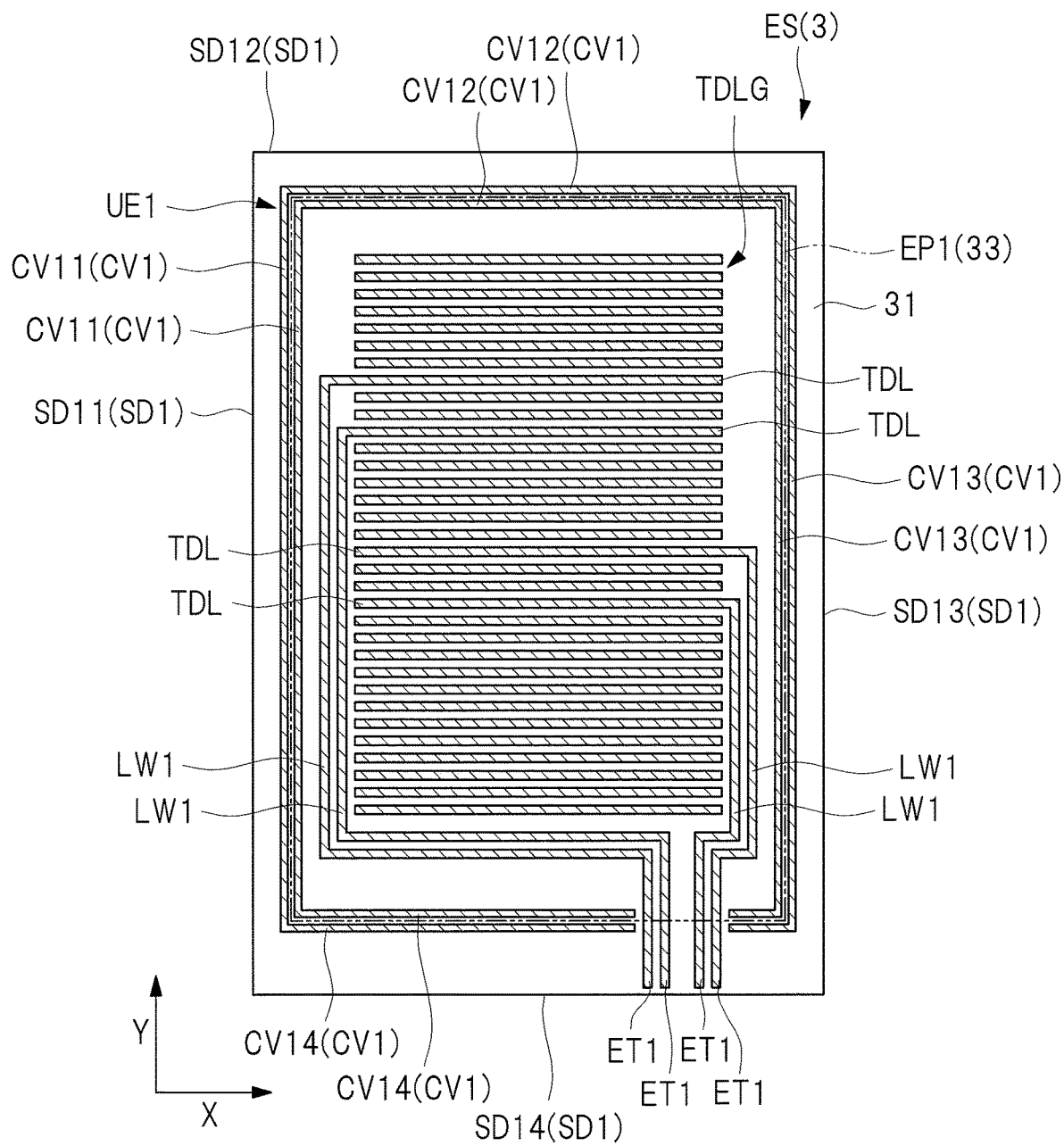
FIG. 13 is a plan view illustrating the electrode substrate according to the first embodiment.
Figure 14:
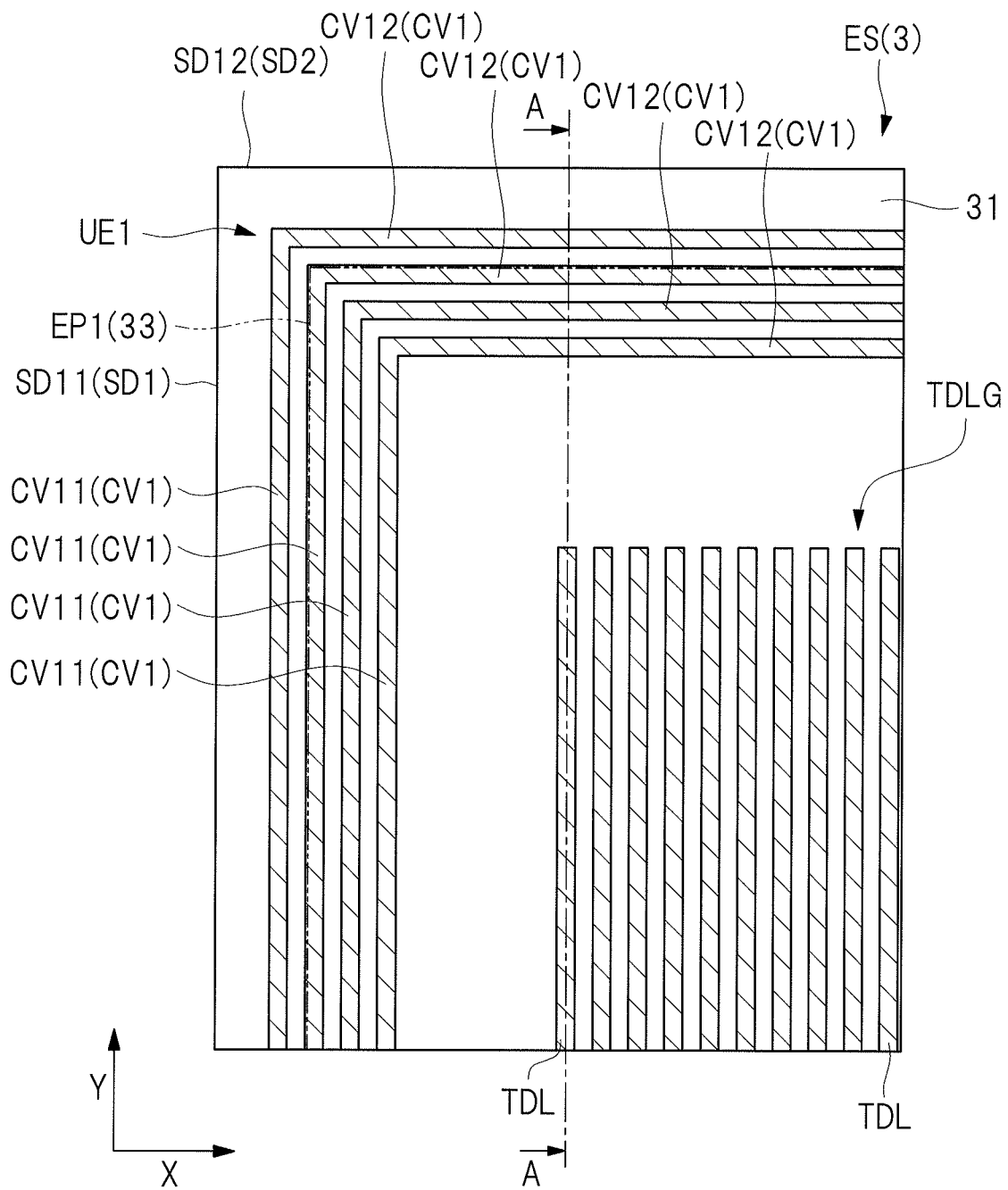
FIG. 14 is a plan view illustrating the electrode substrate according to the first embodiment.
Figure 15:
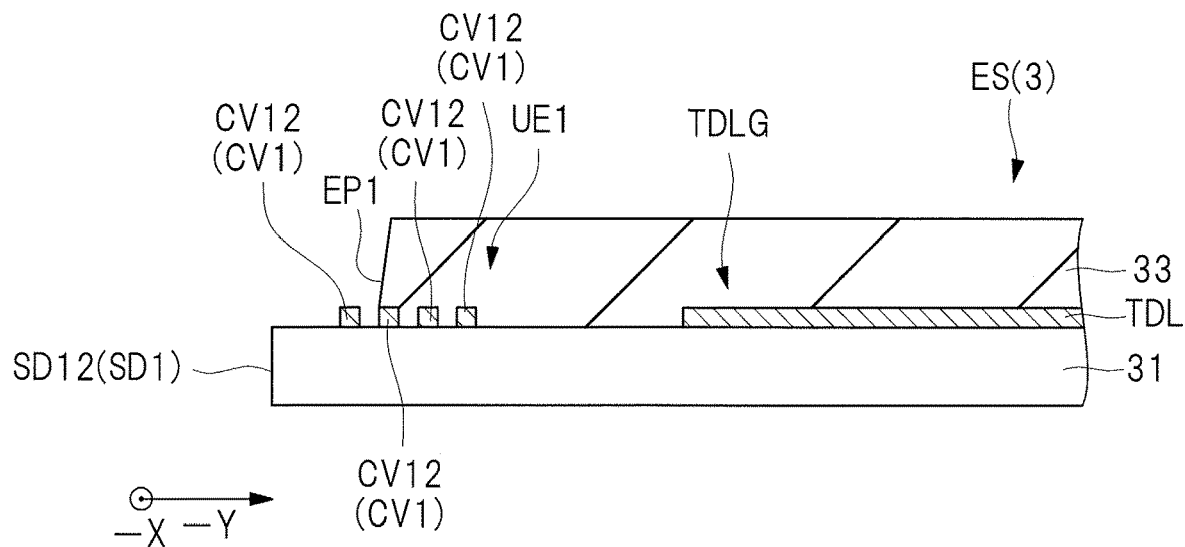
FIG. 15 is a cross-sectional view illustrating the electrode substrate according to the first embodiment.

FIGS. 12 to 14 are plan views illustrating the electrode substrate according to the first embodiment. FIG. 15 is a cross-sectional view illustrating an electrode substrate according to the first embodiment. In the examples illustrated in FIGS. 12 and 13, the directions in which the sensing electrodes extend as a whole are different from each other. FIG. 14 illustrates a part of FIG. 12 in an enlarged manner. FIG. 15 is a cross-sectional view taken along the line A-A of FIG. 14. Note that, in FIGS. 12 and 13, a state in which the protective film 33 is eliminated is illustrated and the outer periphery of the protective film 33, that is, the end portion EP1 of the protective film 33 is represented by a dashed-two dotted line.

The electrode substrate ES as the opposing substrate 3 includes the glass substrate 31, the sensing electrode TDL, the protective film 33, and a concave/convex pattern UE1.

Note that, in the present specification, the "concave/convex pattern" means a pattern formed of concave portions, a pattern formed of convex portions, or a pattern formed of concave portions and convex portions.

In addition, as described above, since an electrode substrate used as the opposing substrate 3 in which the sensing electrodes TDL are formed in the display device with an input device is taken as an example of the electrode substrate ES, a case of using the glass substrate 31 as a base of the electrode substrate ES will be described in the first embodiment. However, when manufacturing the electrode substrate used as a substrate except for the opposing substrate 3 in the display device with an input device or manufacturing an electrode substrate used in various electronic devices except for a display device, various substrates such as a film made of, for example, resin and a semiconductor substrate made of, for example, silicon (Si) may be used as a base of the electrode substrate ES.

Hereinafter, two directions which mutually intersect, preferably orthogonally, with each other within an upper surface serving as a main surface of the glass substrate 31 are defined to be an X axis direction and a Y axis direction.

In the example illustrated in FIG. 12, the sensing electrode TDL extends in the Y axis direction when seen in a plan view. In addition, in the example illustrated in FIG. 13, the sensing electrode TDL extends in the X axis direction when seen in a plan view. The sensing electrode TDL is formed of a conductive film.

Note that, as described above, the expression "when seen in a plan view" in the present specification indicates the case in which components are seen from a direction perpendicular to the upper surface serving as the main surface of the TFT substrate 21 (see FIG. 9) or the upper surface serving as the main surface of the glass substrate 31.

Preferably, the sensing electrode TDL is formed of a conductive film having a metal layer or an alloy layer made of one or more metals selected from a group including aluminum (Al), copper (Cu), silver (Ag), molybdenum (Mo), chrome (Cr) and tungsten (W). In this manner, conductivity of the sensing electrode TDL can be improved and thus the sensing sensitivity or sensing speed of the sensing electrode TDL can be improved.

In the example illustrated in FIG. 12, the sensing electrode TDL may include a plurality of conductive lines arrayed in the X axis direction. Here, each of the plurality of conductive lines may have a zigzag shape extending in the Y axis direction as a whole while being alternately bent in the opposite directions when seen in a plan view. Alternatively, the sensing electrode TDL may have a mesh shape formed by the plurality of conductive lines when seen in a plan view.

The opposing substrate 3 has a plurality of sensing electrodes TDL. The plurality of sensing electrodes TDL form an electrode group TDLG.

The protective film 33 is formed so as to cover the sensing electrodes TDL. The protective film 33 protects the sensing electrodes TDL formed of the conductive film by preventing moisture in the air or the like from contacting the sensing electrodes TDL so that the sensing electrodes TDL are not corroded. As the protective film 33, for example, a resin film formed of ultraviolet (UV) setting resin or thermosetting resin made of acryl resin, epoxy resin, polyimide resin, or else may be used. Note that the protective film 33 has also a function of flattening the upper surface of the glass substrate 31 in which the sensing electrodes TDL are formed.

As described above, when the plurality of sensing electrodes TDL form the electrode group TDLG, the protective film 33 is formed so as to cover the electrode group TDLG.

The concave/convex pattern UE1 is formed on the glass substrate 31. The concave/convex pattern UE1 is disposed closer to an outer periphery of the glass substrate 31 than the sensing electrode TDL is when seen in a plan view. In addition, the protective film 33 is formed so as to cover the sensing electrode TDL and a part of the glass substrate 31 positioned between the sensing electrode TDL and the concave/convex pattern UE1 when seen in a plan view.

As described above, when the plurality of sensing electrodes TDL form the electrode group TDLG, the concave/convex pattern UE1 is disposed closer to the outer periphery of the glass substrate 31 than the electrode group TDLG is when seen in a plan view. In other words, the concave/convex pattern UE1 is disposed so as to surround the electrode group TDLG when seen in a plan view. In addition, the protective film 33 is formed so as to cover the electrode group TDLG and a part of the glass substrate 31 positioned between the electrode group TDLG and the concave/convex pattern UE1 when seen in a plan view.

As described above, the concave/convex pattern UE1 includes, for example, concave portions or convex portions. More specifically, the concave/convex pattern UE1 includes step portions made up of a high-level portion and a low-level portion. When applying the coating liquid for forming a protective film onto the glass substrate 31, the coating liquid spreads along the step portion, but it is difficult for the coating liquid to spread in the direction intersecting the step portion. Therefore, by adjusting the shape of the concave/convex pattern UE1, it is possible to prevent or suppress the coating liquid applied onto the glass substrate 31 from spreading toward the outer periphery of the glass substrate 31, so that positions of end portions of the applied coating liquid can be highly accurately adjusted. More specifically, the concave/convex pattern UE1 is a positioning pattern for adjusting the position of the end portion EP1 of the protective film 33.

Preferably, the concave/convex pattern UE1 is disposed so as to surround the electrode group TDLG over the entire circumference of the electrode group TDLG when seen in a plan view. In this manner, it is possible to prevent or suppress the coating liquid for forming a protective film applied so as cover the electrode group TDLG from spreading toward the outer periphery of the glass substrate 31 over the entire circumference of the electrode group TDLG, so that positions of end portions of the applied coating liquid can be highly accurately adjusted over the entire circumference of the electrode group TDLG.

Preferably, the concave/convex pattern UE1 includes a convex portion CV1 and the convex portion CV1 is formed of a film formed on the glass substrate 31. Consequently, the convex portion CV1 formed of a film can be easily formed by forming a film on the glass substrate 31 and patterning the same by, for example, photolithography technique and etching technique.

More preferably, the convex portion CV1 is formed of a conductive film formed in the same layer as the conductive film included in the sensing electrode TDL. Consequently, since it is possible to form the sensing electrode TDL and the convex portion CV1 in the same step, the number of steps in a manufacturing process of the electrode substrate can be reduced. Note that the convex portion CV1 may be formed of a film except for the conductive film, for example, an insulating film.

In addition, preferably, the glass substrate 31 has sides SD11, SD12, SD13, and SD14 as the four sides SD1. The side SD12 intersects the side SD11. The side SD13 is opposed to the side SD11. The side SD14 is opposed to the side SD12.

In the example illustrated in FIG. 12, the direction along the side SD11 or the direction along the side SD13 is defined as a Y axis direction, and the direction along the side SD12 or the direction along the side SD14 is defined as an X axis direction. The Y axis direction may not be in parallel with either of the direction in which the side SD11 extends or the direction in which the side SD13 extends, and the X axis direction may not be in parallel with either of the direction in which the side SD12 extends or the direction in which the side SD14 extends.

Here, the concave/convex pattern UE1 includes convex portions CV11, CV12, CV13, and CV14 as the convex portions CV1 formed of the conductive film formed on the glass substrate 31. The convex portion CV11 is disposed closer to the side SD11 than the electrode group TDLG formed of the sensing electrodes TDL is, and the convex portion CV12 is disposed closer to the side SD12 than the electrode group TDLG formed of the sensing electrodes TDL is. In addition, the convex portion CV13 is disposed closer to the side SD13 than the electrode group TDLG formed of the sensing electrodes TDL is, and the convex portion CV14 is disposed closer to the side SD14 than the electrode group TDLG formed of the sensing electrodes TDL is.

In the example illustrated in FIG. 12, preferably, the convex portion CV11 extends in the Y axis direction that is along the side SD11 when seen in a plan view. Consequently, it is possible to prevent or suppress the coating liquid for forming a protective film applied so as to cover the electrode group TDLG from spreading toward the side SD11. In addition, the convex portion CV12 extends in the X axis direction that is along the side SD12 when seen in a plan view. Consequently, it is possible to prevent or suppress the coating liquid for forming a protective film applied so as to cover the electrode group TDLG from spreading toward the side SD12.

In addition, the convex portion CV13 extends in the Y axis direction that is along the side SD13 when seen in a plan view. Consequently, it is possible to prevent or suppress the coating liquid for forming a protective film applied so as to cover the electrode group TDLG from spreading toward the side SD13. Further, the convex portion CV14 extends in the X axis direction that is along the side SD14 when seen in a plan view. Consequently, it is possible to prevent or suppress the coating liquid for forming a protective film applied so as to cover the electrode group TDLG from spreading toward the side SD14.

In addition, except for the point that the direction in which each of the plurality of sensing electrodes TDL extends as a whole is different, the example illustrated in FIG. 13 can be the same as the example illustrated in FIG. 12.

Note that, in the example illustrated in FIG. 12, the Y axis direction may be in parallel with either of the direction in which the side SD11 extends or the direction in which the side SD13 extends, and the X axis direction may be in parallel with either of the direction in which the side SD12 extends or the direction in which the side SD14 extends. In addition, except for the point that the direction in which each of the plurality of sensing electrodes TDL extends as a whole is different, the example illustrated in FIG. 13 can be the same as the example illustrated in FIG. 12.

Preferably, the concave/convex pattern UE1 includes a plurality of convex portions CV11. In the example illustrated in FIG. 12, the plurality of convex portions CV11 extend in the Y axis direction and are arrayed in the X axis direction when seen in a plan view. Consequently, on the side of the electrode group TDLG close to the side SD11, the plurality of convex portions CV11 are disposed at positions different from each other in the X axis direction, so that it is possible to easily prevent or suppress the coating liquid applied so as to cover the electrode group TDLG from spreading toward the side SD11. In addition, except for the point that the direction in which each of the plurality of sensing electrodes TDL extends as a whole is different, the example illustrated in FIG. 13 can be the same as the example illustrated in FIG. 12.

In the same manner, preferably, the concave/convex pattern UE1 includes a plurality of convex portions CV12. In the example illustrated in FIG. 12, the plurality of convex portions CV12 extend in the X axis direction and are arrayed in the Y axis direction when seen in a plan view. Consequently, on the side of the electrode group TDLG close to the side SD12, the plurality of convex portions CV12 are disposed at positions different from each other in the Y axis direction, so that it is possible to easily prevent or suppress the coating liquid applied so as to cover the electrode group TDLG from spreading toward the side SD12. In addition, except for the point that the direction in which each of the plurality of sensing electrodes TDL extends as a whole is different, the example illustrated in FIG. 13 can be the same as the example illustrated in FIG. 12.

Also, preferably, the concave/convex pattern UE1 includes a plurality of convex portions CV13. In the example illustrated in FIG. 12, the plurality of convex portions CV13 extend in the Y axis direction and are arrayed in the X axis direction when seen in a plan view. Consequently, on the side of the electrode group TDLG close to the side SD13, the plurality of convex portions CV13 are disposed at positions different from each other in the X axis direction, so that it is possible to easily prevent or suppress the coating liquid applied so as to cover the electrode group TDLG from spreading toward the side SD13. In addition, except for the point that the direction in which each of the plurality of sensing electrodes TDL extends as a whole is different, the example illustrated in FIG. 13 can be the same as the example illustrated in FIG. 12.

In the same manner, preferably, the concave/convex pattern UE1 includes a plurality of convex portions CV14. In the example illustrated in FIG. 12, the plurality of convex portions CV14 extend in the X axis direction and are arrayed in the Y axis direction when seen in a plan view. Consequently, on the side of the electrode group TDLG close to the side SD14, the plurality of convex portions CV14 are disposed at positions different from each other in the Y axis direction, so that it is possible to easily prevent or suppress the coating liquid applied so as to cover the electrode group TDLG from spreading toward the side SD14. In addition, except for the point that the direction in which each of the plurality of sensing electrodes TDL extends as a whole is different, the example illustrated in FIG. 13 can be the same as the example illustrated in FIG. 12.

Preferably, the protective film 33 is terminated on the concave/convex pattern UE1. In other words, the end portion EP1 of the protective film 33 is positioned on the concave/convex pattern UE1. In addition, as described above, the concave/convex pattern UE1 is disposed closer to the outer periphery of the glass substrate 31 than the sensing electrode TDL is. Thus, as the protective film 33 is terminated on the concave/convex pattern UE1, it is possible to prevent or suppress the end portion EP1 of the protective film 33 from reaching the outer periphery of the glass substrate 31. In other words, as the end portion EP1 of the protective film 33 is positioned on the concave/convex pattern UE1, it is possible to prevent or suppress the end portion EP1 of the protective film 33 from reaching the outer periphery of the glass substrate 31.

In addition, the electrode substrate ES as the opposing substrate 3 includes a lead wiring LW1 and an electrode terminal ET1. The lead wiring LW1 and the electrode terminal ET1 are formed on the glass substrate 31. Each of the sensing electrodes TDL is electrically connected by the lead wiring LW1 to the electrode terminal ET1 that is formed, for example, on one side (the lower side in FIG. 12 and the lower side in FIG. 13) of the glass substrate 31 in the Y axis direction.

Preferably, the lead wiring LW1 is formed of a conductive film formed in the same layer as the conductive film included in the sensing electrode TDL, and the electrode terminal ET1 is formed of a conductive film formed in the same layer as the conductive film included in the sensing electrode TDL. In this manner, the sensing electrode TDL, the lead wiring LW1, and the electrode terminal ET1 can be formed in the same step and thus the number of steps in the manufacturing process of the electrode substrate ES as the opposing substrate 3 can be reduced.

Note that, although not illustrated, each of the electrode terminals ET1 is electrically connected to an electrode terminal formed on a wiring board formed of, for example, a flexible printing circuit (FPC) board via an anisotropic conductive film.

<Planar Shape of Convex Portion>

Next, a planar shape of the convex portion will be described with reference to FIGS. 16 and 17.

Figure 16:
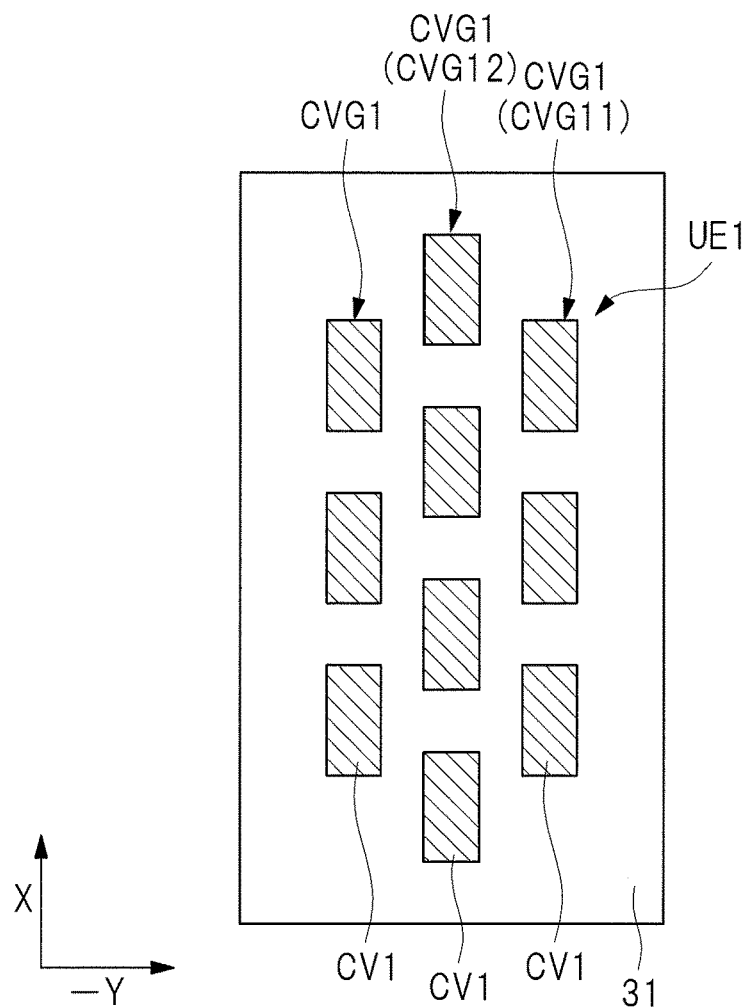
FIG. 16 is a plan view illustrating convex portions of the electrode substrate according to the first embodiment.
Figure 17:
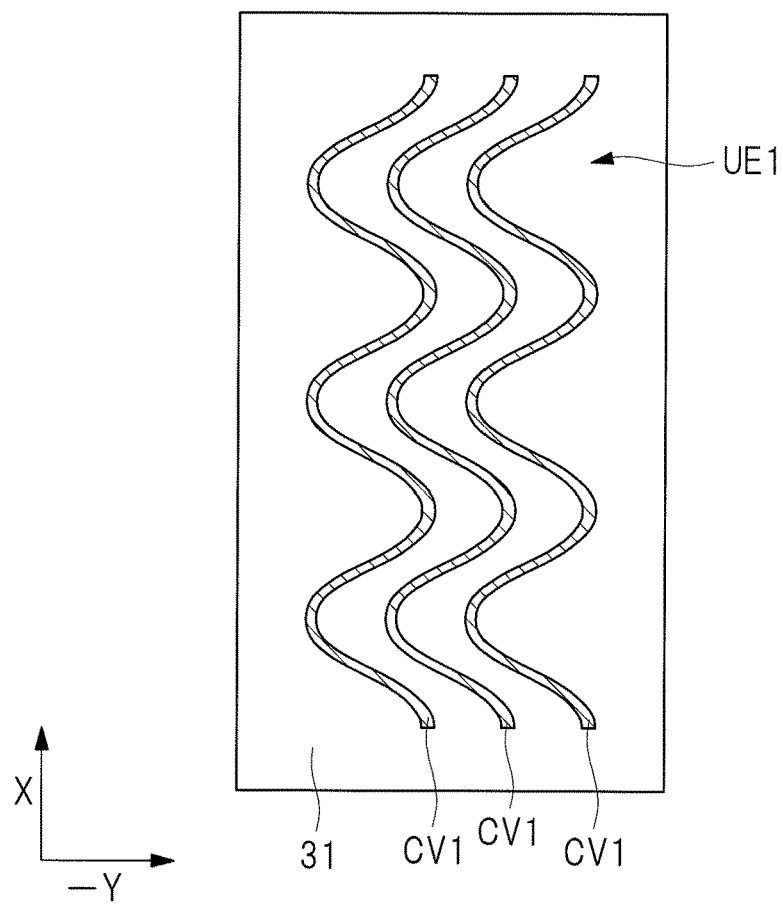
FIG. 17 is a plan view illustrating convex portions of the electrode substrate according to the first embodiment.

FIGS. 16 and 17 are plan views illustrating the convex portion of the electrode substrate according to the first embodiment.

In the example illustrated in FIG. 16, the concave/convex pattern UE1 includes a plurality of convex portions CV1. The plurality of convex portions CV1 are disposed in, for example, a staggered pattern in the X axis direction. More specifically, the plurality of convex portions CV1 form a convex portion group CVG1 arrayed in the X axis direction when seen in a plan view, and a plurality of the convex portion groups CVG1 are arrayed in a direction intersecting both the X axis direction and Y axis direction. In other words, the plurality of convex portion groups CVG1 are arrayed so that positions of the convex portions CV1 in the X axis directions are different between the two convex portion groups CVG1 next to each other in the Y axis direction.

Here, the case in which the coating liquid spreads toward one side (left side in FIG. 16) in the Y axis direction through a part on the glass substrate 31 between the two convex portions CV1 next to each other in the X axis direction included in a convex portion group CVG11 as a convex portion group CVG1 is assumed. In this case, the coating liquid is stopped by a convex portion CV1 included in a convex portion group CVG12 as the convex portion group CVG1 positioned closer to one side (left side in FIG. 16) in the Y axis direction than the concave portion group CVG11 is. Thus, when the X axis direction is a direction along the side SD1, it is possible to easily prevent or suppress the coating liquid for forming a protective film applied so as to cover the electrode group TDLG from spreading toward the side SD1, and positions of end portions of the coating liquid applied so as to cover the gate electrode group TDLG can be easily and highly accurately adjusted.

In the example illustrated in FIG. 17, the concave/convex pattern UE1 includes a plurality of convex portions CV1. The plurality of convex portions CV1 are arrayed in, for example, the Y axis direction. Also, in the example illustrated in FIG. 17, each of the plurality of convex portions CV1 extends in the X axis direction as a whole while being curved in a wave-like manner when seen in a plan view. More specifically, each of the plurality of convex portions CV1 has a wave-like shape when seen in a plan view.

In this manner, compared with the case in which the convex portion CV1 has a linear shape when seen in a plan view, the length of the step portion made up of the high-level portion and the low-level portion of the concave/convex pattern UE1 can be increased. Thus, it is possible to easily prevent or suppress the coating liquid for forming a protective film applied so as to cover the electrode group TDLG from spreading toward the side SD1, and the positions of the end portions of the coating liquid applied so as to cover the gate electrode group TDLG can be easily and highly accurately adjusted.

<Cross-Sectional Shape of Convex Portion and Protective Film>

Next, cross-sectional shapes of the convex portion and the protective film will be described with reference to FIGS. 18 to 25.

Figure 18:
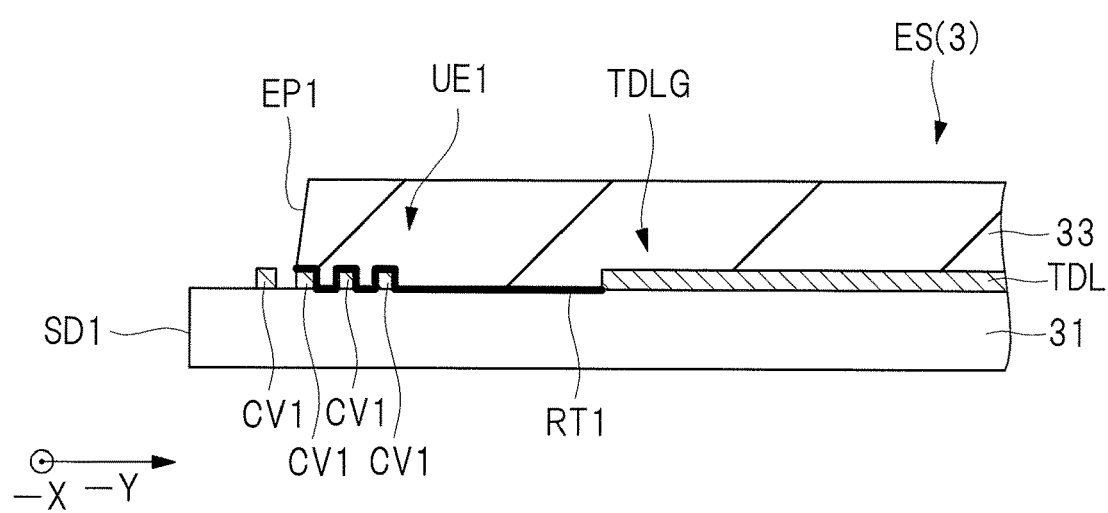
FIG. 18 is a cross-sectional view illustrating the electrode substrate according to the first embodiment.

FIG. 18 is a cross-sectional view illustrating the electrode substrate according to the first embodiment. FIG. 18 illustrates a route RT1 by which moisture in the air reaches the sensing electrode TDL through the gap between the protective film 33 and the glass substrate 31 by a bold line in the cross-sectional view of FIG. 15.

As illustrated in FIG. 18, in a region in which the protective film 33 is formed on the glass substrate 31, in a part closer to the side SD1 than the electrode group TDLG formed of the sensing electrodes TDL is, moisture in the air passes through the gap between the protective film 33 and the glass substrate 31 in a part where the convex portion CV1 is not formed. On the other hand, in a region in which the protective film 33 is formed on the glass substrate 31, in a part closer to the side SD1 than the electrode group TDLG is, moisture in the air passes through the gap between the protective film 33 and the convex portion CV1 in a part where the convex portion CV1 is formed. Thus, as compared with the case in which the convex portion CV1 is not formed on the glass substrate 31, that is, as compared with a comparative example described later with reference to FIG. 35, the length of the route RT1 by which moisture in the air reaches the sensing electrode TDL through the gap between the protective film 33 and the glass substrate 31 is increased. Thus, since it makes moisture in the air difficult to reach the sensing electrode TDL through the gap between the protective film 33 and the glass substrate 31, corrosion of the sensing electrode TDL due to moisture in the air and exfoliation of the sensing electrode TDL from the glass substrate 31 can be prevented or suppressed.

Note that, as illustrated in FIGS. 12 and 13, in the case in which the lead wiring LW1 is formed on the outer periphery side of the electrode group TDLG when seen in a plan view, the lead wiring LW1 is likely to be corroded by moisture in the air or likely to be exfoliated from the glass substrate 31 as compared with the sensing electrode TDL. Thus, the effect of preventing or suppressing corrosion of the lead wiring LW1 due to moisture in the air, which is obtained by forming the convex portion CV1 on the glass substrate 31, is larger than the effect of preventing or suppressing corrosion of the sensing electrode TDL due to moisture in the air. In addition, the effect of preventing or suppressing exfoliation of the lead wiring LW1 from the glass substrate 31 obtained by forming the convex portion CV1 on the glass substrate 31 is larger than the effect of preventing or suppressing exfoliation of the sensing electrode TDL from the glass substrate 31.

Alternatively, in the case in which the convex portion CV1 is formed of a conductive film and a constant potential is applied to the sensing electrode TDL, it is desirable that the convex portion CV1 is electrically floating or a potential substantially equal to the potential applied to the sensing electrode TDL is applied to the convex portion CV1. Consequently, it is possible to prevent or suppress generation of a potential difference between the sensing electrode TDL and the convex portion CV1, and it is possible to prevent or suppress corrosion of the sensing electrode TDL or the convex portion CV1 due to a potential difference between the sensing electrode TDL and the convex portion CV1.

Figure 19:
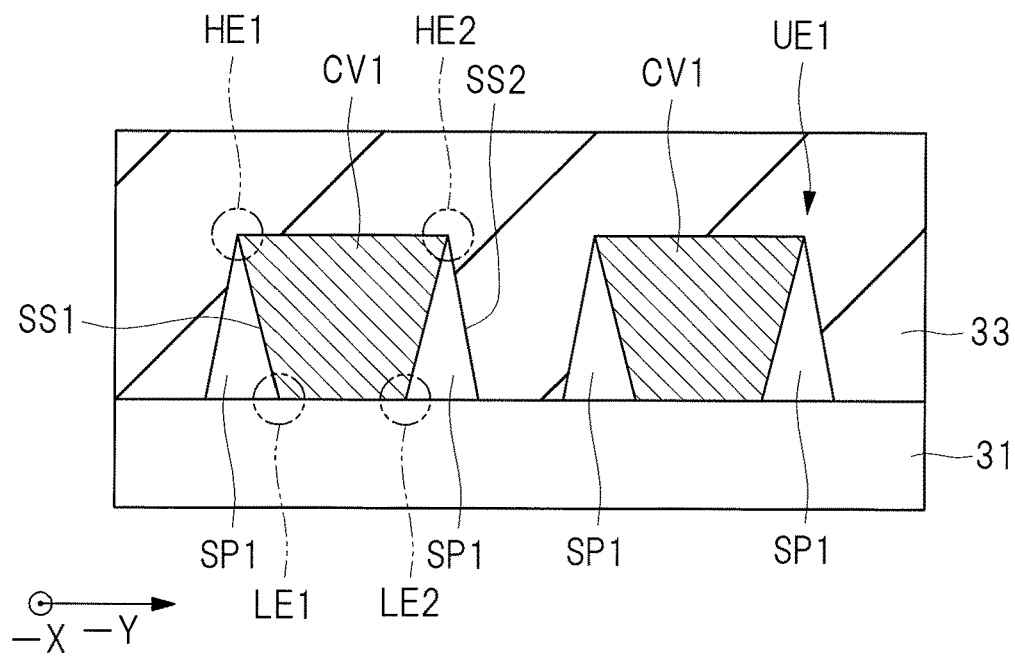
FIG. 19 is a cross-sectional view illustrating another example of the electrode substrate according to the first embodiment.

FIG. 19 is a cross-sectional view illustrating another example of the electrode substrate according to the first embodiment. In FIG. 19, a part around the convex portion is illustrated in an enlarged manner.

As illustrated in FIG. 19, the concave/convex pattern UE1 includes a plurality of convex portions CV1. Each of the plurality of convex portions CV1 extends in the X axis direction. The convex portion CV1 includes a side surface portion SS1 positioned on, for example, one side (left side in FIG. 19) in the Y axis direction orthogonally intersecting the X axis direction when seen in a plan view, and an upper end portion HE1 of the side surface portion SS1 is positioned closer to the one side (left side in FIG. 19) than a lower end portion LE1 of the side surface portion SS1 is in the Y axis direction. In addition, the convex portion CV1 includes a side surface portion SS2 positioned on, for example, the other side (right side in FIG. 19) in the Y axis direction orthogonally intersecting the X axis direction when seen in a plan view, and an upper end portion HE2 of the side surface portion SS2 is positioned closer to the other side (right side in FIG. 19) than the lower end portion LE2 of the side surface portion SS2 is in the Y axis direction.

In the example illustrated in FIG. 19, a cross-sectional shape of the convex portion CV1 perpendicular to the X axis direction is an inverted trapezoidal shape. More specifically, in the cross section perpendicular to the X axis direction, either or both of side surfaces of the convex portion CV1 is inclined so that the width of the convex portion CV1 decreases toward the lower surface of the convex portion CV1 from the upper surface of the convex portion CV1.

As described later with reference to FIGS. 20 to 24, for example, after conductive films are stacked in a plurality of layers so that an etching rate to an etchant becomes higher from an upper layer to a lower layer, etching using the etchant is performed. In this manner, the convex portion CV1 can be formed so that the upper end portion HE1 of the side surface portion SS1 is positioned closer to one side (left side in FIG. 19) than the lower end portion LE1 of the side surface portion SS1 is in the Y axis direction, and the upper end portion HE2 of the side surface portion SS2 is positioned closer to the other side (right side in FIG. 19) than the lower end portion LE2 of the side surface portion SS2 is in the Y axis direction.

In such a case, when forming the protective film 33, for example, the coating liquid does not sufficiently spread around the sides of the convex portion CV1, so that a space SP1 may be formed on the both side surface portions of the convex portion CV1. Consequently, moisture in the air is likely to remain in the space SP1 before the moisture in the air passes through the gap between the protective film and the glass substrate 31 to reach the sensing electrode TDL. Thus, since it becomes even harder for moisture in the air to reach the sensing electrode TDL through the gap between the protective film 33 and the glass substrate 31, it is possible to prevent or suppress corrosion of the sensing electrode TDL due to moisture in the air or exfoliation of the sensing electrode TDL from the glass substrate 31.

Alternatively, the case where the space SP1 illustrated in FIG. 19 is not formed, that is, the case where the protective film 33 is formed to be in contact with both of the side surface portions SS1 and SS2 of the convex portion CV1 is assumed. Even in this case, the length of the route RT1 (see FIG. 18) by which moisture in the air reaches the sensing electrode TDL through the gap between the protective film 33 and the glass substrate is increased as compared with the case where the cross-sectional shape of the convex portion CV1 perpendicular to the X axis direction is a rectangular shape or a trapezoidal shape. Thus, since it becomes more difficult for moisture in the air to reach the sensing electrode TDL through the gap between the protective film 33 and the glass substrate 31, corrosion of the sensing electrode TDL due to moisture in the air or exfoliation of the sensing electrode TDL from the glass substrate 31 can be easily prevented or suppressed.

Figure 20:
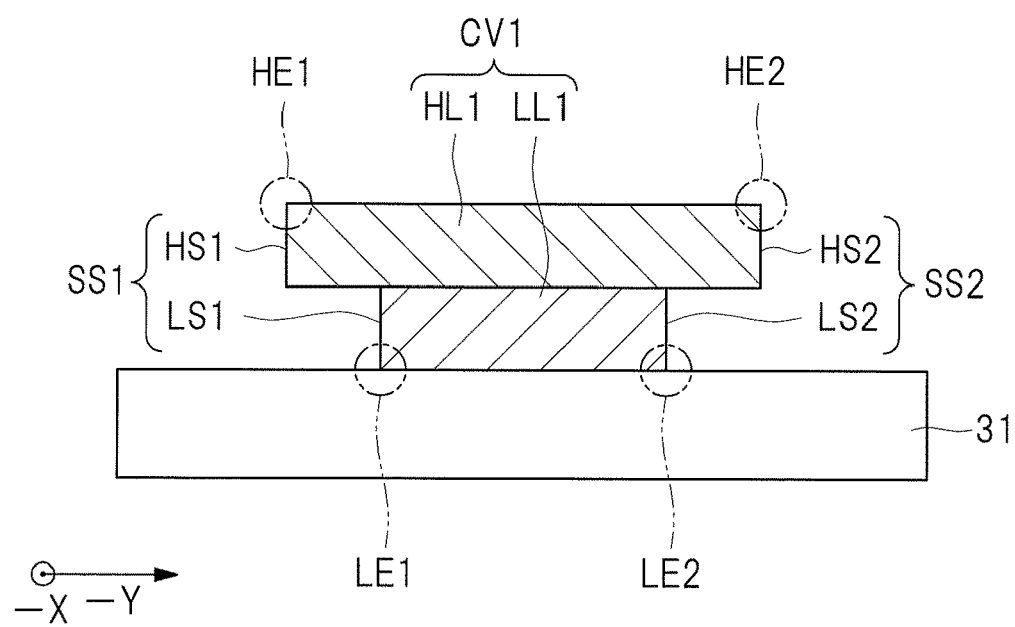
FIG. 20 is a cross-sectional view illustrating another example of the convex portion of the electrode substrate according to the first embodiment.
Figure 21:
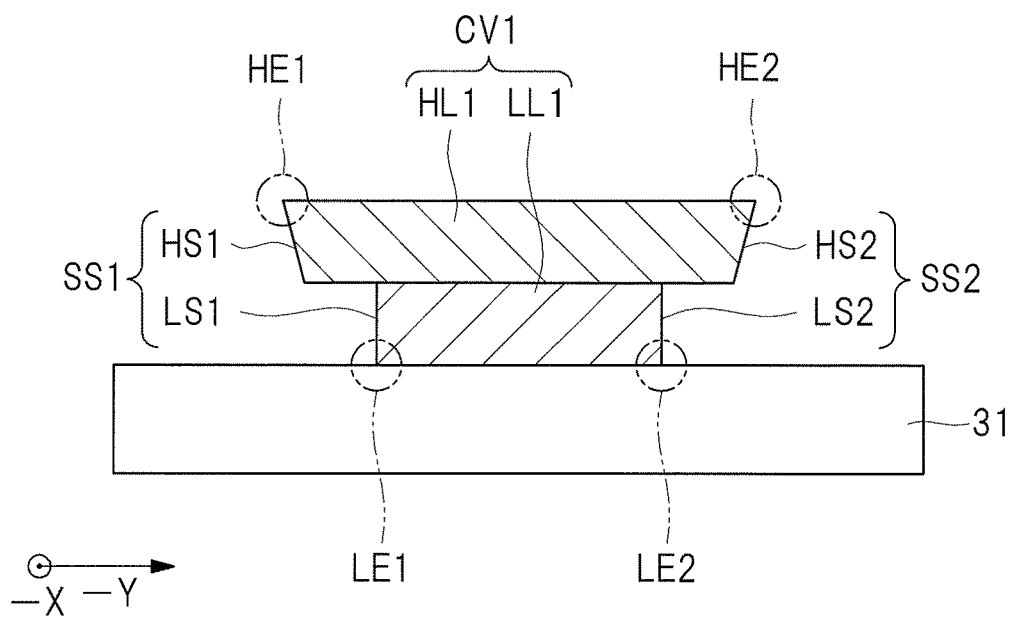
FIG. 21 is a cross-sectional view illustrating another example of the convex portion of the electrode substrate according to the first embodiment.

FIGS. 20 and 21 are cross-sectional views illustrating another example of the convex portion of the electrode substrate according to the first embodiment. In FIGS. 20 and 21, one of the plurality of convex portions included in the concave/convex pattern is illustrated in an enlarged manner, and illustration of the protective film 33 is omitted.

In the example illustrated in FIGS. 20 and 21, the convex portion CV1 includes a lower layer portion LL1 formed on the glass substrate 31 and an upper layer portion HL1 formed on the lower layer portion LL1. The side surface portion LS1 of the lower layer portion LL1 on one side (left side in FIGS. 20 and 21) in the Y axis direction is caved in toward the opposite side of the one side (left side in FIGS. 20 and 21) than the side surface portion HS1 of the upper layer portion HL1 on the one side (left side in FIGS. 20 and 21) in the Y axis direction. In addition, the side surface portion LS2 of the lower layer portion LL1 on the other side (right side in FIGS. 20 and 21) in the Y axis direction is caved in toward the opposite side of the other side (right side in FIGS. 20 and 21) than the side surface portion HS2 of the upper layer portion HL1 on the other side (right side in FIGS. 20 and 21) in the Y axis direction. Consequently, the upper end portion HE1 of the side surface portion SS1 is positioned closer to the one side (left side in FIGS. 20 and 21) than the lower end portion LE1 of the side surface portion SS1 is in the Y axis direction, and the upper end portion HE2 of the side surface portion SS2 is positioned closer to the other side (right side in FIGS. 20 and 21) than the lower end portion LE2 of the side surface portion SS2 is in the Y axis direction.

For example, after the lower layer portion LL1 and the upper layer portion HL1 are stacked so that an etching rate of the lower layer portion LL1 to an etchant becomes higher than an etching rate of the upper layer portion HL1 to the etchant, etching using the etchant is performed. In this manner, the convex portion CV1 can be formed so that the upper end portion HE1 of the side surface portion SS1 is positioned closer to one side (left side in FIGS. 20 and 21) than the lower end portion LE1 of the side surface portion SS1 is in the Y axis direction and the upper end portion HE2 of the side surface portion SS2 is positioned closer to the other side (right side in FIGS. 20 and 21) than the lower end portion LE2 of the side surface portion SS2 is in the Y axis direction.

Note that, as illustrated in FIG. 20, the side surface portions HS1 and HS2 of the upper layer portion HL1 may be perpendicular to the upper surface of the glass substrate 31. Alternatively, as illustrated in FIG. 21, the side surface portions HS1 and HS2 of the upper layer portion HL1 may be inclined relative to the surface perpendicular to the upper surface of the glass substrate 31.

Figure 22:
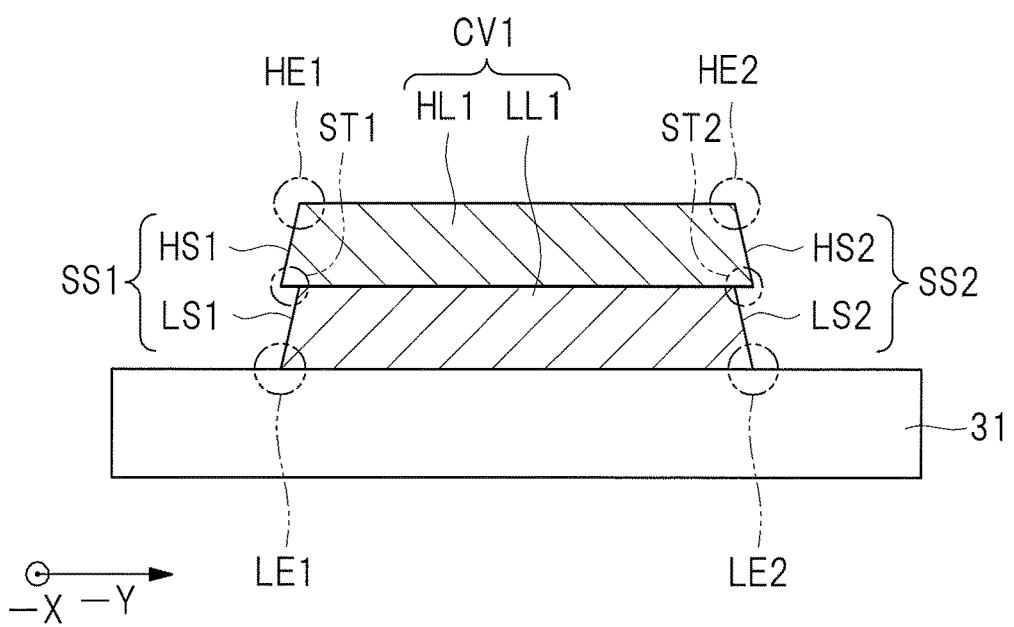
FIG. 22 is a cross-sectional view illustrating another example of the convex portion of the electrode substrate according to the first embodiment.

FIG. 22 is a cross-sectional view illustrating another example of the convex portion of the electrode substrate according to the first embodiment. In FIG. 22, one of the plurality of convex portions included in the concave/convex pattern is illustrated in an enlarged manner, and illustration of the protective film 33 is omitted.

Also in the example illustrated in FIG. 22, in the same manner as that described in the example of FIGS. 20 and 21, the convex portion CV1 includes the lower layer portion LL1 formed on the glass substrate 31 and the upper layer portion HL1 formed on the lower layer portion LL1. The side surface portion LS1 of the lower layer portion LL1 on one side (left side in FIG. 22) in the Y axis direction is caved in toward the opposite side of the one side (left side in FIG. 22) than the side surface portion HS1 of the upper layer portion HL1 on the one side (left side in FIG. 22) in the Y axis direction. Also, the side surface portion LS2 of the lower layer portion LL1 on the other side (right side in FIG. 22) in the Y axis direction is caved in toward the opposite side of the other side (right side in FIG. 22) than the side surface portion HS2 of the upper layer portion HL1 on the other side (right side in FIG. 22) in the Y axis direction. In this manner, a step portion ST1 is formed on the side surface portion SS1 and a step portion ST2 is formed on the side surface portion SS2.

On the other hand, in the example illustrated in FIG. 22, the lower end portion LE1 of the side surface portion SS1 is positioned closer to the one side (left side in FIG. 22) than the upper end portion HE1 of the side surface portion SS1 is in the Y axis direction, and the lower end portion LE2 of the side surface portion SS2 is positioned closer to the other side (right side in FIG. 22) than the upper end portion HE2 of the side surface portion SS2 is in the Y axis direction.

Also in such a case, as compared with the case in which no step portion is formed on both of the side surface portions SS1 and SS2 and the side surface portions SS1 and SS2 are both formed of only flat surfaces, the space SP1 (see FIG. 19) is likely to be formed when forming the protective film 33 (see FIG. 19) or the length of the route RT1 (see FIG. 18) by which moisture in the air reaches the sensing electrode TDL through the gap between the protective film 33 and the glass substrate 31 is increased.

Figure 23:
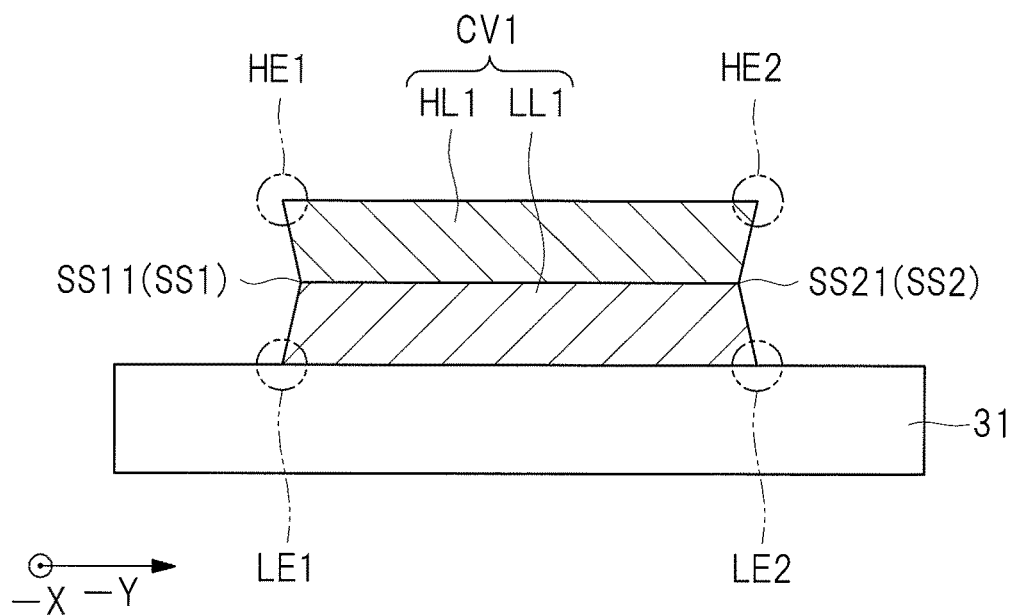
FIG. 23 is a cross-sectional view illustrating another example of the convex portion of the electrode substrate according to the first embodiment.
Figure 24:
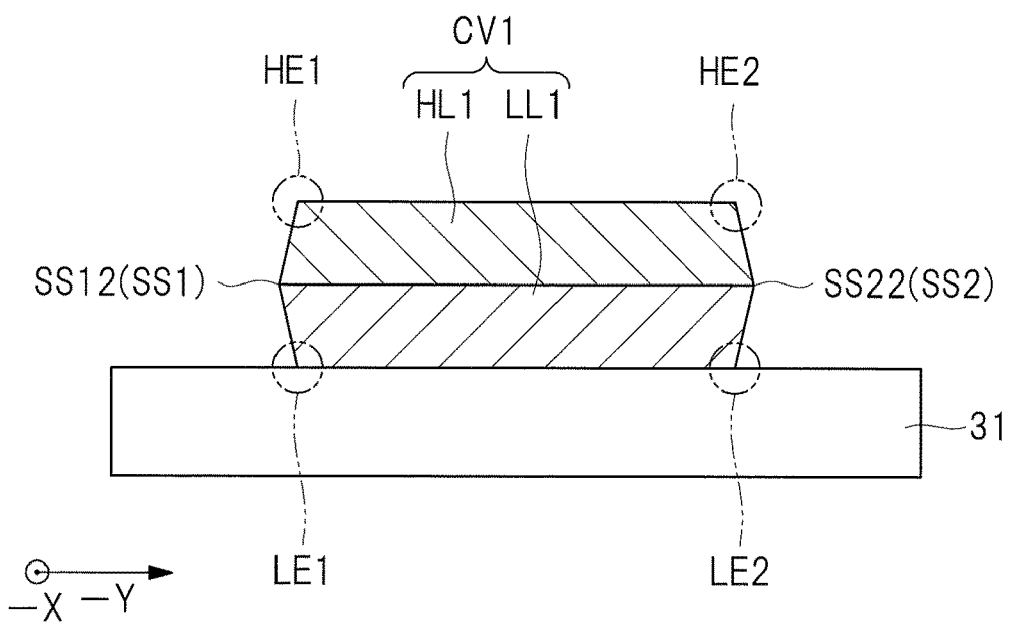
FIG. 24 is a cross-sectional view illustrating another example of the convex portion of the electrode substrate according to the first embodiment.

FIGS. 23 and 24 are cross-sectional views illustrating other examples of the convex portion of the electrode substrate according to the first embodiment. In FIGS. 23 and 24, one of the plurality of convex portions included in the concave/convex pattern is illustrated in an enlarged manner, and illustration of the protective film 33 is omitted.

Also in the examples illustrated in FIGS. 23 and 24, in the same manner as the examples illustrated in FIGS. 20 and 21, the convex portion CV1 includes the lower layer portion LL1 formed on the glass substrate 31 and the upper layer portion HL1 formed on the lower layer portion LL1.

In the examples illustrated in FIGS. 23 and 24, the upper end portion HE1 of the side surface portion SS1 is positioned at the same position as the lower end portion LE1 of the side surface portion SS1 in the Y axis direction, and the upper end portion HE2 of the side surface portion SS2 is positioned at the same position as the lower end portion LE2 of the side surface portion SS2 in the Y axis direction. In addition, in the example illustrated in FIG. 23, a concave portion SS11 is formed on the side surface portion SS1, and a concave portion SS21 is formed on the side surface portion SS2. Alternatively, in the example illustrated in FIG. 24, a convex portion SS12 is formed on the side surface portion SS1, and a convex portion SS22 is formed on the side surface portion SS2.

Also in such a case, as compared with the case in which none of the concave portion and the convex portion is formed on the side surface portions SS1 and SS2 and the side surface portions SS1 and SS2 are both formed of only flat surfaces, the space SP1 (see FIG. 19) is likely to be formed when forming the protective film 33 (see FIG. 19) or the length of the route RT1 (see FIG. 18) by which moisture in the air reaches the sensing electrode TDL through the gap between the protective film 33 and the glass substrate 31 is increased.

Figure 25:
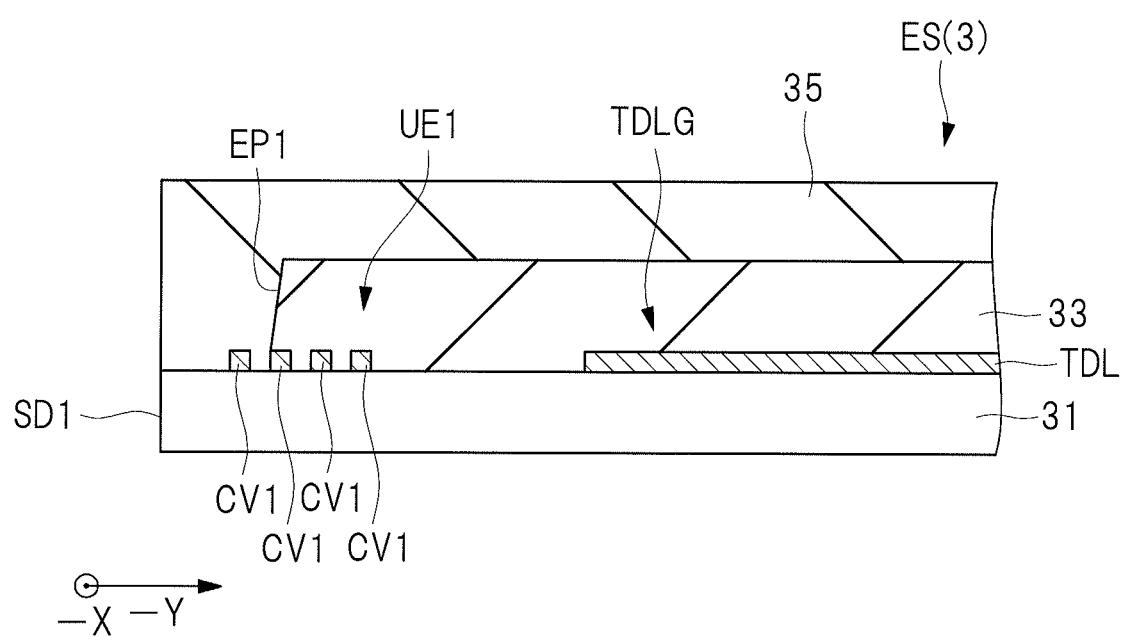
FIG. 25 is a cross-sectional view illustrating another example of the electrode substrate according to the first embodiment.

FIG. 25 is a cross-sectional view illustrating another example of the electrode substrate according to the first embodiment.

In the example illustrated in FIG. 25, the electrode substrate ES as the opposing substrate 3 further includes a protective film 35 in addition to the glass substrate 31, the sensing electrode TDL, the protective film 33, and the concave/convex pattern UE1. The protective film 35 is formed so as to cover the protective film 33 and a part of the concave/convex pattern UE1 exposed from the protective film 33.

In the same manner as the example illustrated in FIG. 15, when the protective film 33 is terminated on the concave/convex pattern UE1, a part of the concave/convex pattern UE1 on the side close to the side SD1 is exposed from the protective film 33. In other words, when the end portion EP1 of the protective film 33 is positioned on the concave/convex pattern UE1, the part of the concave/convex pattern UE1 on the side close to the side SD1 is exposed from the protective film 33. Thus, by forming the protective film 35, the end portion EP1 of the protective film 33 is covered with the protective film 35, and it becomes more difficult for moisture in the air to reach the sensing electrode TDL through the gap between the protective film 33 and the glass substrate 31. Therefore, corrosion of the sensing electrode TDL due to moisture in the air or exfoliation of the sensing electrode TDL from the glass substrate 31 can be more easily prevented or suppressed.

Note that UV setting resin made of acryl resin or epoxy resin can be used as the protective film 35. In addition, it is also possible to further provide a protective member such as a cover glass on the protective film 35 with using the protective film 35 as an adhesive layer.

<Method of Manufacturing Electrode Substrate>

Next, a method of manufacturing an electrode substrate will be described with reference to FIGS. 26 to 33.

Figure 27:
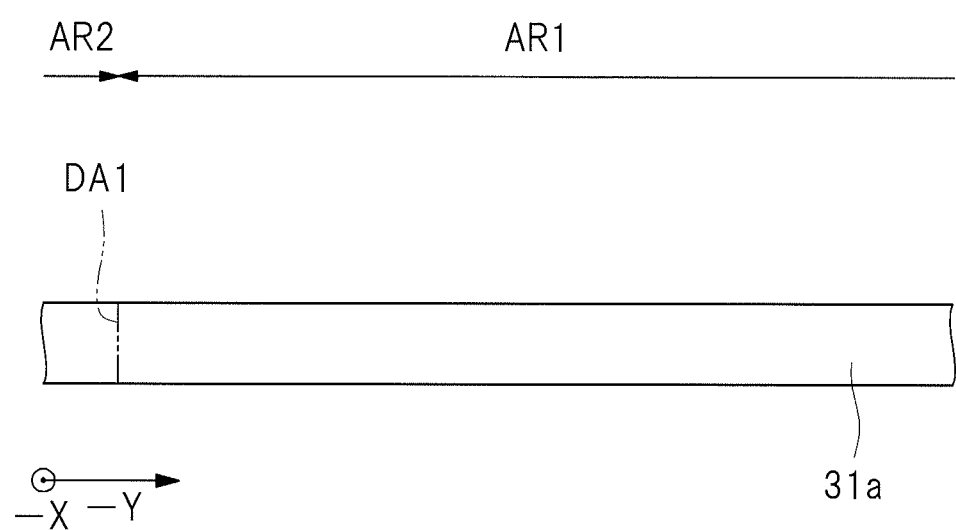
FIG. 27 is a cross-sectional view illustrating the electrode substrate according to the first embodiment during the manufacturing process thereof.
Figure 28:
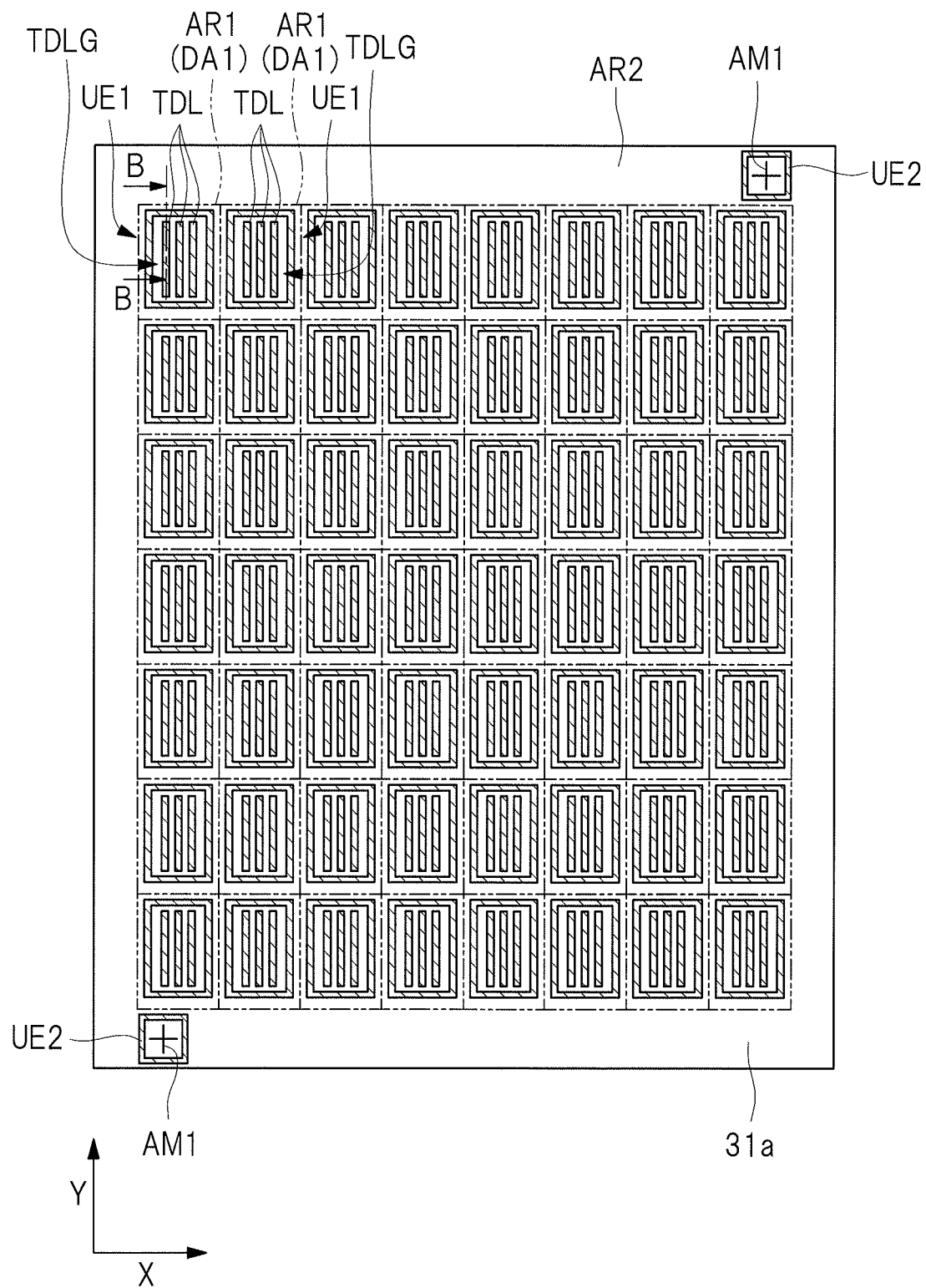
FIG. 28 is a plan view illustrating the electrode substrate according to the first embodiment during the manufacturing process thereof.
Figure 29:
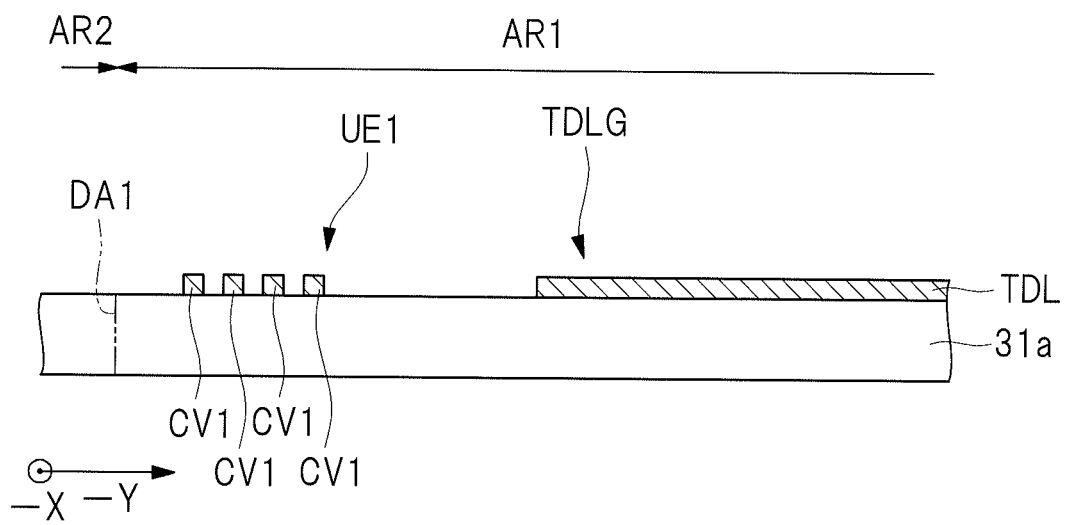
FIG. 29 is a cross-sectional view illustrating the electrode substrate according to the first embodiment during the manufacturing process thereof.
Figure 30:
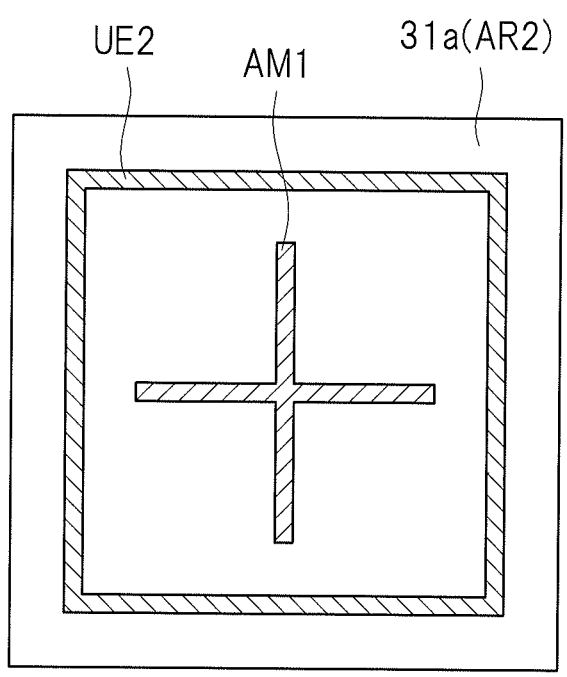
FIG. 30 is a plan view illustrating the electrode substrate according to the first embodiment during the manufacturing process thereof.
Figure 31:
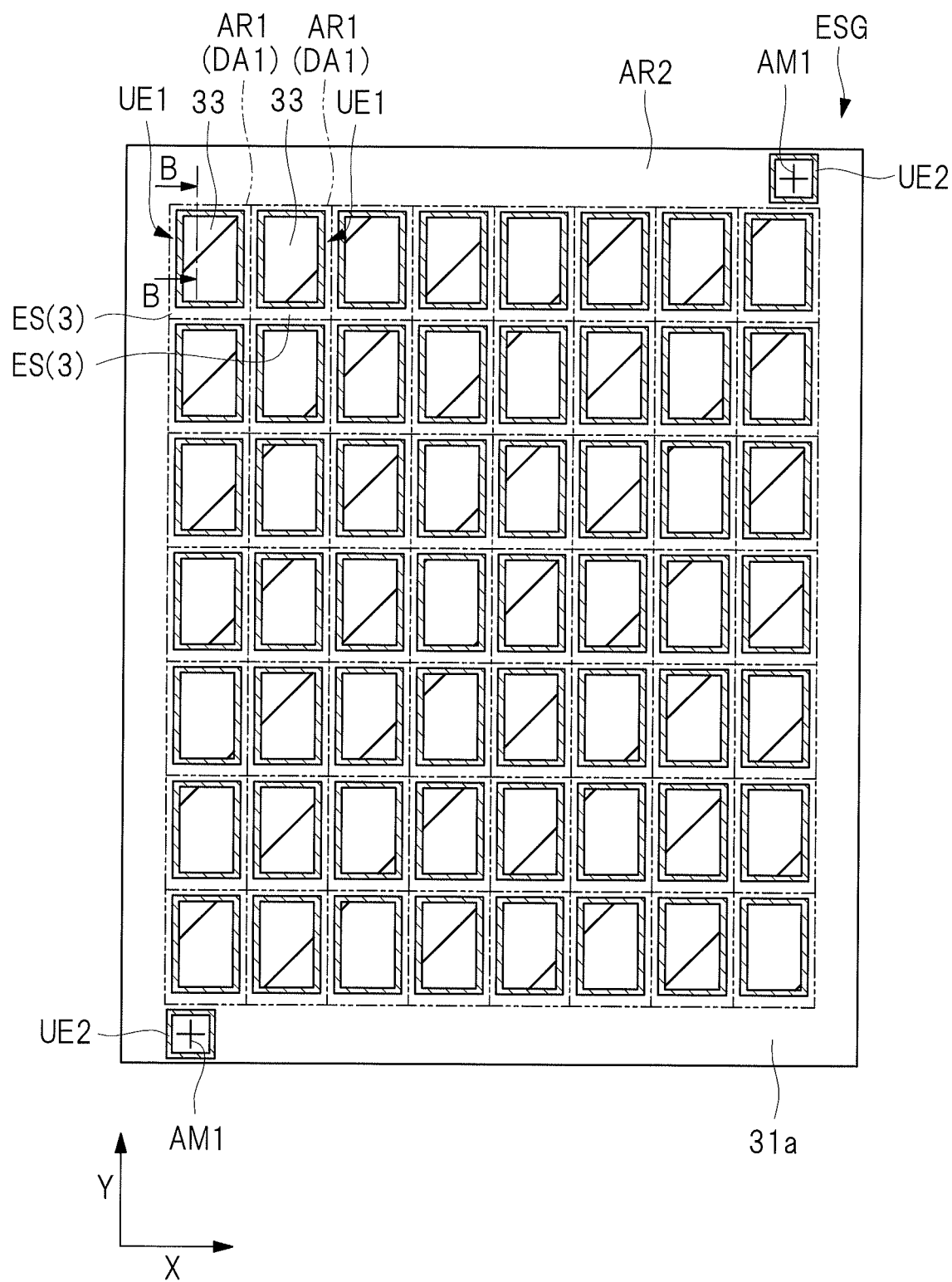
FIG. 31 is a plan view illustrating the electrode substrate according to the first embodiment during the manufacturing process thereof.
Figure 32:
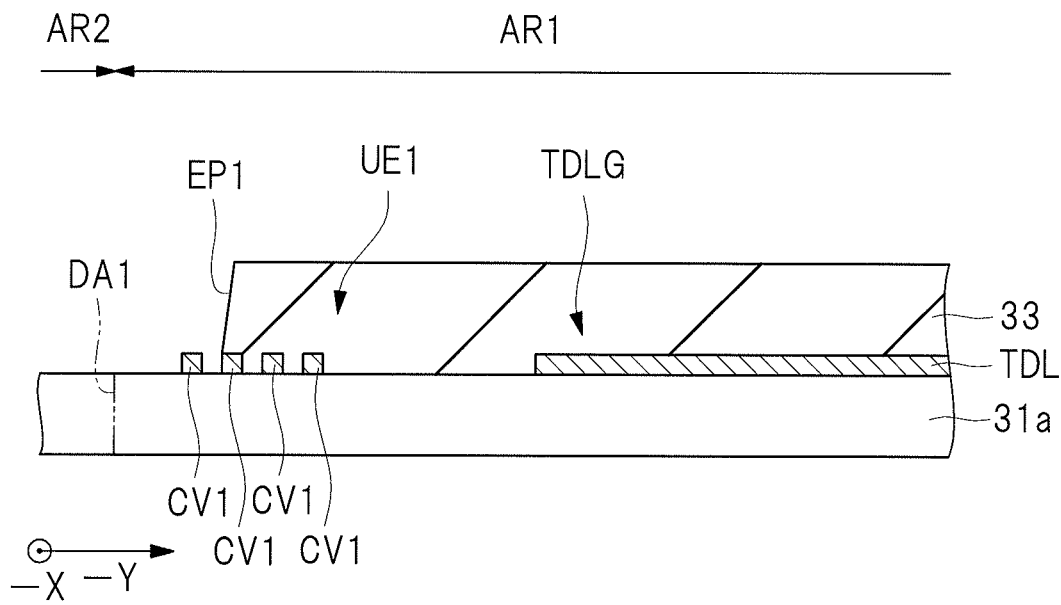
FIG. 32 is a cross-sectional view illustrating the electrode substrate according to the first embodiment during the manufacturing process thereof.
Figure 33:
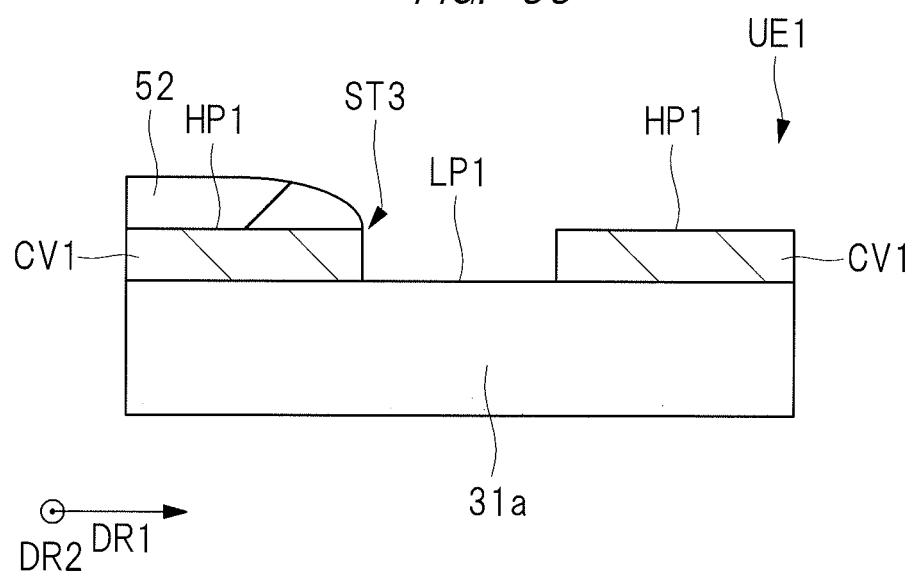
FIG. 33 is a cross-sectional view illustrating the electrode substrate according to the first embodiment during the manufacturing process thereof.

FIGS. 26, 28, 30, and 31 are plan views of the electrode substrate according to the first embodiment during a manufacturing process. FIGS. 27, 29, 32, and 33 are cross-sectional views of the electrode substrate according to the first embodiment during the manufacturing process. The cross-sectional views in FIGS. 27, 29, and 32 are cross-sectional views taken along the line B-B in FIGS. 26, 28, and 31, respectively. In FIGS. 28 and 31, an outer periphery of an electrode-substrate forming region AR1 and a dicing region DA1 are collectively illustrated by dashed-two dotted lines. FIG. 30 illustrates the periphery of an alignment mark AM1 in an enlarged manner. FIG. 33 illustrates the periphery of a step portion ST3 included in the concave/convex pattern UE1 in an enlarged manner.

Figure 26:
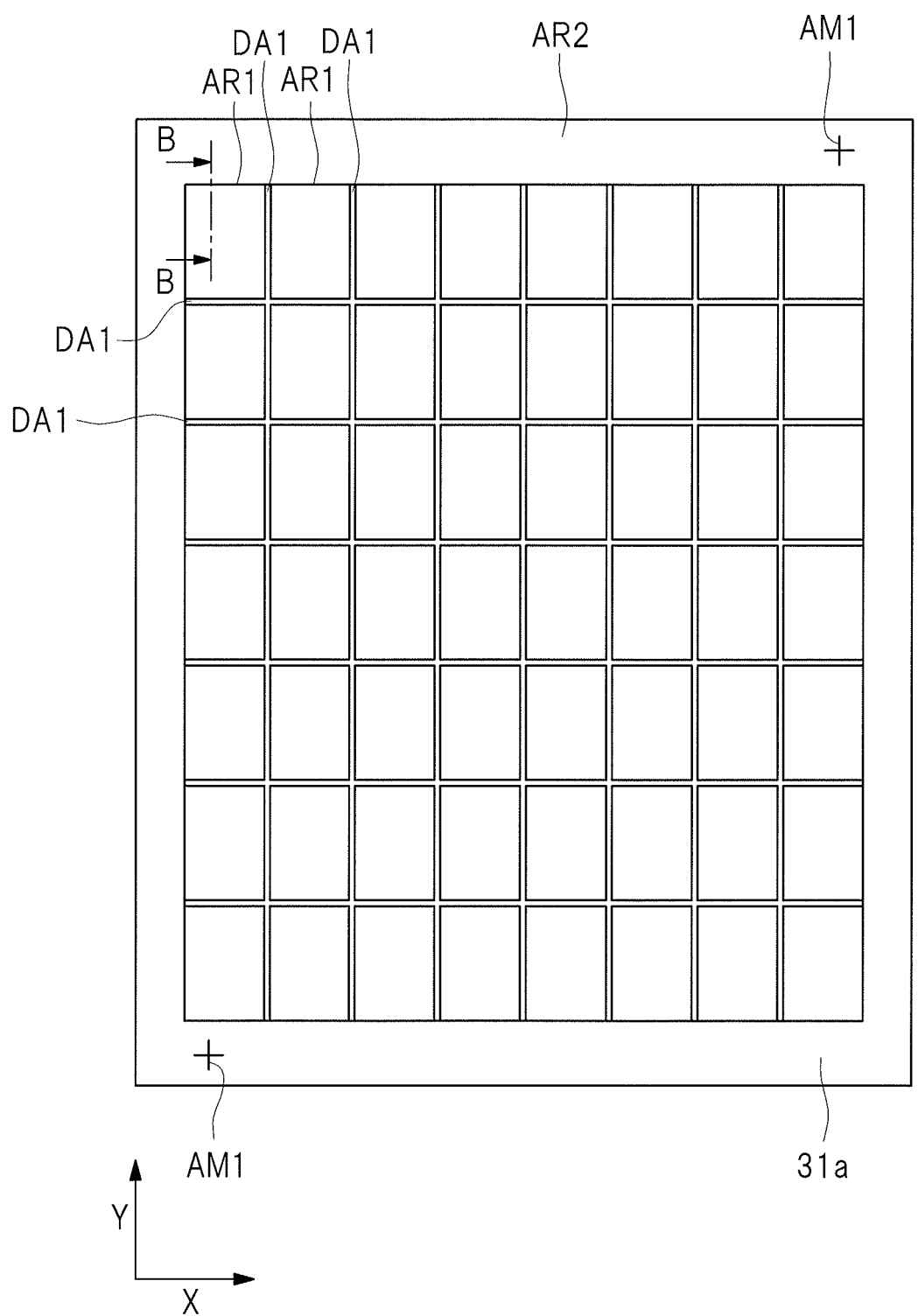
FIG. 26 is a plan view illustrating the electrode substrate according to the first embodiment during a manufacturing process thereof.

First, as illustrated in FIGS. 26 and 27, a glass substrate 31a is prepared. The glass substrate 31a has a plurality of electrode-substrate forming regions AR1 and a frame region AR2 as regions of the upper surface serving as the main surface of the glass substrate 31a. For example, the plurality of electrode-substrate forming regions AR1 are arrayed in matrix in the X axis direction and the Y axis direction. In addition, the dicing region DA1 is disposed between two neighboring electrode-substrate forming regions AR1. The dicing region DA1 is a region to be cut, that is, diced when dividing the glass substrate into respective electrode-substrate forming regions AR1. After the process up to a step of forming the protective film 33 described later is performed, the glass substrate 31a is divided into the plurality of electrode-substrate forming regions AR1, thereby forming a plurality of pieces of the electrode substrates ES as the opposing substrate 3. More specifically, the glass substrates obtained by singulating the glass substrate 31a into the plurality of electrode-substrate forming regions AR1 correspond to the glass substrates 31 (see FIG. 12).

Also, in the frame region AR2, the alignment mark AM1 is formed on the glass substrate 31a.

As described above, in the first embodiment, an electrode substrate used as the opposing substrate 3 in which the sensing electrode TDL is formed in a display device with an input device is exemplified as the electrode substrate ES. Thus, a step of preparing the glass substrate 31a as a base of the electrode substrate ES will be described. However, when manufacturing an electrode substrate used as a substrate other than the opposing substrate 3 in the display device with an input device or manufacturing an electrode substrate used in various electronic devices except for a display device, various substrates such as a film made of, for example, resin and a semiconductor substrate made of, for example, silicon (Si) can be prepared as the base of the electrode substrate ES.

Next, as illustrated in FIGS. 28 and 29, the sensing electrode TDL is formed. In this step of forming the sensing electrode TDL, first, in the plurality of electrode-substrate forming regions AR1 and the frame region AR2, a conductive film is deposited on the glass substrate 31a. In this step of depositing the conductive film, for example, a conductive film formed of a metal film can be deposited by sputtering or chemical vapor deposition (CVD). Preferably, as the conductive film, a conductive film including a metal layer or an alloy layer made of one or more metals selected from a group including aluminum (Al), copper (Cu), silver (Ag), molybdenum (Mo), chrome (Cr), and tungsten (W) can be deposited.

Note that, after performing the step of forming a metal film and before performing a patterning step described later, in order to make wettability of the coating liquid to be applied by the ink jet method or the electric field jet method uniform, a surface processing can be performed to the substrate on which the conductive film has been formed. As such a surface processing, a surface processing by UV light, a surface processing by atmospheric pressure (AP) plasma, or a surface processing by hexamethyldisiloxane (HMDS) can be performed.

Next, the conductive film is patterned. In this manner, as illustrated in FIGS. 28 and 29, the sensing electrode TDL is formed on the glass substrate 31a in each of the plurality of electrode-substrate forming regions AR1. In the step of forming the sensing electrode TDL, by patterning the conductive film by, for example, photolithography and etching, the sensing electrode TDL can be formed on the glass substrate 31a in each of the plurality of electrode-substrate forming regions AR1.

Preferably, the plurality of sensing electrodes TDL can be formed on the glass substrate 31a in each of the plurality of electrode-substrate forming regions AR1. At this time, in each of the plurality of electrode-substrate forming regions AR1, the electrode group TDLG made up of the plurality of sensing electrodes TDL is formed.

In addition, by patterning the conductive film by performing the same step as the step of forming the sensing electrode TDL, the concave/convex pattern UE1 is formed on the glass substrate 31a in each of the plurality of electrode-substrate forming regions AR1. In this step of forming the concave/convex pattern UE1, in each of the electrode-substrate forming regions AR1, the concave/convex pattern UE1, which is disposed closer to the outer periphery of each of the electrode-substrate forming regions AR1 than the electrode group TDLG made up of the plurality of sensing electrodes TDL is when seen in a plan view, is formed on the glass substrate 31a. As illustrated in FIG. 29, the concave/convex pattern UE1 can be designed to include the convex portion CV1. In addition, the planar shape of the concave/convex pattern UE1 including the convex portion CV1 can be the shape described with reference to any of FIGS. 14, 16, and 17. Moreover, the cross-sectional shape of the concave/convex pattern UE1 can be the shape described with reference to FIGS. 19 to 24.

Note that, by the same step as the step of forming the sensing electrode TDL, the concave/convex pattern UE1 can be formed. Consequently, the number of manufacturing steps can be reduced.

Alternatively, as the concave/convex pattern UE1, a concave/convex pattern formed of a different kind of film from the conductive film included in the sensing electrode TDL can also be formed.

Further, by patterning the conductive film by performing the same step as the step of forming the sensing electrode TDL, as illustrated in FIGS. 28 and 30, a concave/convex pattern UE2 is formed on the glass substrate 31a in the frame region AR2. In this step of forming the concave/convex pattern UE2, the concave/convex pattern UE2 disposed so as to surround the alignment mark AM1 when seen in a plan view is formed on the glass substrate 31a in the frame region AR2.

Note that, by the same step as the step of forming the sensing electrode TDL, the concave/convex pattern UE2 can be formed. Consequently, the number of manufacturing steps can be reduced.

Alternatively, as the concave/convex pattern UE2, a concave/convex pattern formed of a different kind of film from the conductive film included in the sensing electrode TDL can also be formed.

Next, as illustrated in FIGS. 31 and 32, by forming the protective film 33, an electrode-substrate assembly ESG is formed. In this step of forming the protective film 33, first, the coating liquid for forming a protective film is applied. In this step of applying the coating liquid, a coating liquid is applied by coating. Preferably, a coating liquid for forming a protective film is applied by the ink jet method or the electric field jet method.

As the protective film 33, a resin film formed of UV-setting resin or thermo-setting resin made of, for example, acryl resin, epoxy resin, or polyimide resin can be formed. Thus, as the coating liquid for forming a protective film, a coating liquid containing the above-mentioned UV-setting resin or thermo-setting resin can be used.

More specifically, after forming a coating film by applying a coating liquid on the glass substrate 31a by the ink jet method or the electric field jet method so as to cover the electrode group TDLG made up of the plurality of sensing electrodes TDL, the formed coating film is cured. In this manner, the protective film 33 having a desired pattern can be formed without increasing the number of manufacturing steps.

In addition, when the coating liquid is applied by using the ink jet method or the electric field jet method, it is not necessary to prepare a photomask for forming the pattern formed of the coating film that is formed by applying the coating liquid by using photolithography and etching, and thus a desired pattern can be formed each time. Further, when the coating liquid is applied by using the ink jet method or the electric field jet method, the coating liquid can be efficiently used, and thus the manufacturing cost can be reduced. Moreover, when the ink jet method or the electric field jet method is used, the film can be deposited under the atmospheric pressure and it is not necessary to use the deposition apparatus provided with a vacuum chamber, and thus the deposition apparatus can be downsized.

In the first embodiment, in each of the plurality of electrode-substrate forming regions AR1, the concave/convex pattern UE1, which is disposed closer to the outer periphery of each of the electrode-substrate forming regions AR1 than the electrode group TDLG made up of the plurality of sensing electrodes TDL is when seen in a plan view, is formed on the glass substrate 31a. Consequently, the length of the step portion made up of a high-level portion and a low-level portion formed closer to the outer periphery than the sensing electrode TDL of each of the electrode-substrate forming regions AR1 is can be increased. Thus, it is possible to prevent or suppress the coating liquid for forming a protective film applied so as to cover the electrode group TDLG from spreading toward the outer periphery of each of the electrode-substrate forming regions AR1. More specifically, by providing the concave/convex pattern UE1, the position of an end portion of the coating liquid applied so as to cover the electrode group TDLG can be easily and highly accurately adjusted.

The case in which a step portion ST3 included in the concave/convex pattern UE1 and formed of a high-level portion HP1 and a low-level portion LP1 as the convex portion CV1 extends in a direction DR2 intersecting a direction DR1 in which the coating liquid spreads as illustrated in FIG. 33 is assumed. In such a case, a coating liquid 52 spreading in the direction DR1 on the high-level portion HP1 stops at, for example, the peripheral edge of the high-level portion HP1, that is, on the upper surface of the step portion ST3 and does not spread up to the low-level portion LP1. Thus, it is possible to prevent or suppress the coating liquid 52 from spreading further in the direction DR1 beyond the step portion ST3.

More specifically, in the step of applying the coating liquid 52, the coating liquid 52 is applied so that the applied coating liquid 52 is terminated on the concave/convex pattern UE1. In other words, in the step of applying the coating liquid 52, the coating liquid 52 is applied so that an end portion of the applied coating liquid 52 is positioned on the concave/convex pattern UE1.

In addition, in the first embodiment, in the frame region AR2 surrounding the plurality of electrode-substrate forming regions AR1, the concave/convex pattern UE2 disposed so as to surround the alignment mark AM1 when seen in a plan view is formed on the glass substrate 31a. In this manner, even when the coating liquid for forming a protective film applied so as to cover the electrode group TDLG spreads up to the frame region AR2, it is possible to prevent or suppress the coating liquid which has spread in the frame region AR2 from reaching a position on the alignment mark AM1. Thus, it is possible to prevent or suppress the protective film 33 from being formed on the alignment mark AM1 when forming the protective film 33. Therefore, when cutting the glass substrate 31a along the dicing regions DA1, the decrease in accuracy of position alignment using the alignment mark AM1 can be prevented or suppressed.

Next, the coating film made of the applied coating liquid 52 is cured. When a coating liquid containing UV-setting resin is used as the coating liquid 52, the coating film is cured by irradiating light of UV, that is, UV light onto the formed coating film. Alternatively, when a coating liquid containing thermosetting resin is used as the coating liquid 52, the coating film is cured by subjecting the formed coating film to thermal processing. Consequently, as illustrated in FIG. 31, the protective film 33 formed of the cured coating film is formed.

Here, as described above, when the applied coating liquid 52 is terminated on the concave/convex pattern UE1, that is, the formed coating film is terminated on the concave/convex pattern UE1, the protective film 33 formed of the cured coating film is also terminated on the concave/convex pattern UE1. In other words, when an end portion of the coating film is positioned on the concave/convex pattern UE1, the end portion EP1 of the protective film 33 is also positioned on the concave/convex pattern UE1.

In the above-described manner, the electrode-substrate assembly ESG is formed. The electrode-substrate assembly ESG has the glass substrate 31a including the plurality of electrode-substrate forming regions AR1. In addition, by dividing the glass substrate 31a into each of the plurality of electrode-substrate forming regions AR1, a plurality of the electrode substrates ES serving as the opposing substrates 3 are formed. More specifically, the glass substrate 31a is a multi-chip substrate from which a plurality of electrode substrates ES serving as the opposing substrates 3 are formed by dividing the glass substrate 31a into each of the plurality of electrode-substrate forming regions AR1.

The electrode-substrate assembly ESG includes the plurality of sensing electrodes TDL, the plurality of concave/convex patterns UE1, and the plurality of protective films 33. The plurality of sensing electrodes TDL are formed on the glass substrate 31a in each of the plurality of electrode-substrate forming regions AR1. The plurality of concave/convex patterns UE1 are formed on the glass substrate 31a in the plurality of electrode-substrate forming regions AR1. The plurality of protective films 33 are formed so as to cover the sensing electrodes TDL in the plurality of electrode-substrate forming regions AR1. In each of the electrode-substrate forming regions AR1, the concave/convex pattern UE1 is disposed closer to the outer periphery of each of the electrode-substrate forming regions AR1 than the sensing electrode TDL is when seen in a plan view. In addition, in each of the electrode-substrate forming regions AR1, the protective film 33 is formed so as to cover a part of the glass substrate 31a positioned between the sensing electrode TDL and the concave/convex pattern UE1 when seen in a plan view.

Preferably, the electrode-substrate assembly ESG includes the concave/convex pattern UE2. The concave/convex pattern UE2 is disposed in the frame region AR2 so as to surround the alignment mark AM1 when seen in a plan view. Consequently, it is possible to prevent or suppress the protective film 33 from being formed on the alignment mark AM1, and also the decrease in accuracy of position alignment using the alignment mark AM1 can be prevented or suppressed.

Note that the electrode-substrate assembly ESG includes the plurality of sensing electrodes TDL, the plurality of protective film 33, and the concave/convex pattern UE2, but may not include the concave/convex pattern UE1. In such a case, it is possible to prevent or suppress the protective film 33 from being formed on the alignment mark AM1, and the decrease in accuracy of position alignment using the alignment mark AM1 can be prevented or suppressed. In addition, in a part of the frame region AR2 in which the alignment mark AM1 is formed, it is possible to prevent or suppress the coating liquid for forming a protective film applied on the glass substrate 31a from spreading toward the outer periphery of the glass substrate 31a. Thus, when forming the protective film 33 so as to cover the sensing electrode TDL, the position of an end portion of the coating liquid applied on the glass substrate 31a can be highly accurately adjusted.

Next, the electrode-substrate assembly ESG is divided into the plurality of electrode substrates ES. In this step of dividing the electrode-substrate assembly ESG, the glass substrate 31a in the electrode-substrate assembly ESG illustrated in FIG. 31 is divided into the plurality of electrode-substrate forming regions AR1. More specifically, the glass substrate 31a is cut along the dicing regions DA1 (see FIG. 26) between two neighboring electrode-substrate forming regions AR1 to divide the glass substrate 31a into each of the plurality of electrode-substrate forming regions AR1, thereby forming a plurality of electrode substrates ES serving as singulated opposing substrates 3.

Note that, after forming the protective film 33 and before dividing the electrode-substrate assembly ESG or after dividing the electrode-substrate assembly ESG, each of the electrode terminals ET1 (see FIGS. 12 and 13) is electrically connected to the electrode terminals formed on the wiring board formed of a flexible printed circuit (FPC) board via, for example, an anisotropic conductive film.

<Regarding Adjustment of Position of End Portion of Coating Liquid>

Next, adjustment of the position of the end portion of the coating liquid applied to the glass substrate will be described while comparing it with adjustment of a position of an end portion of a coating liquid applied to a glass substrate according to a comparative example.

Figure 34:
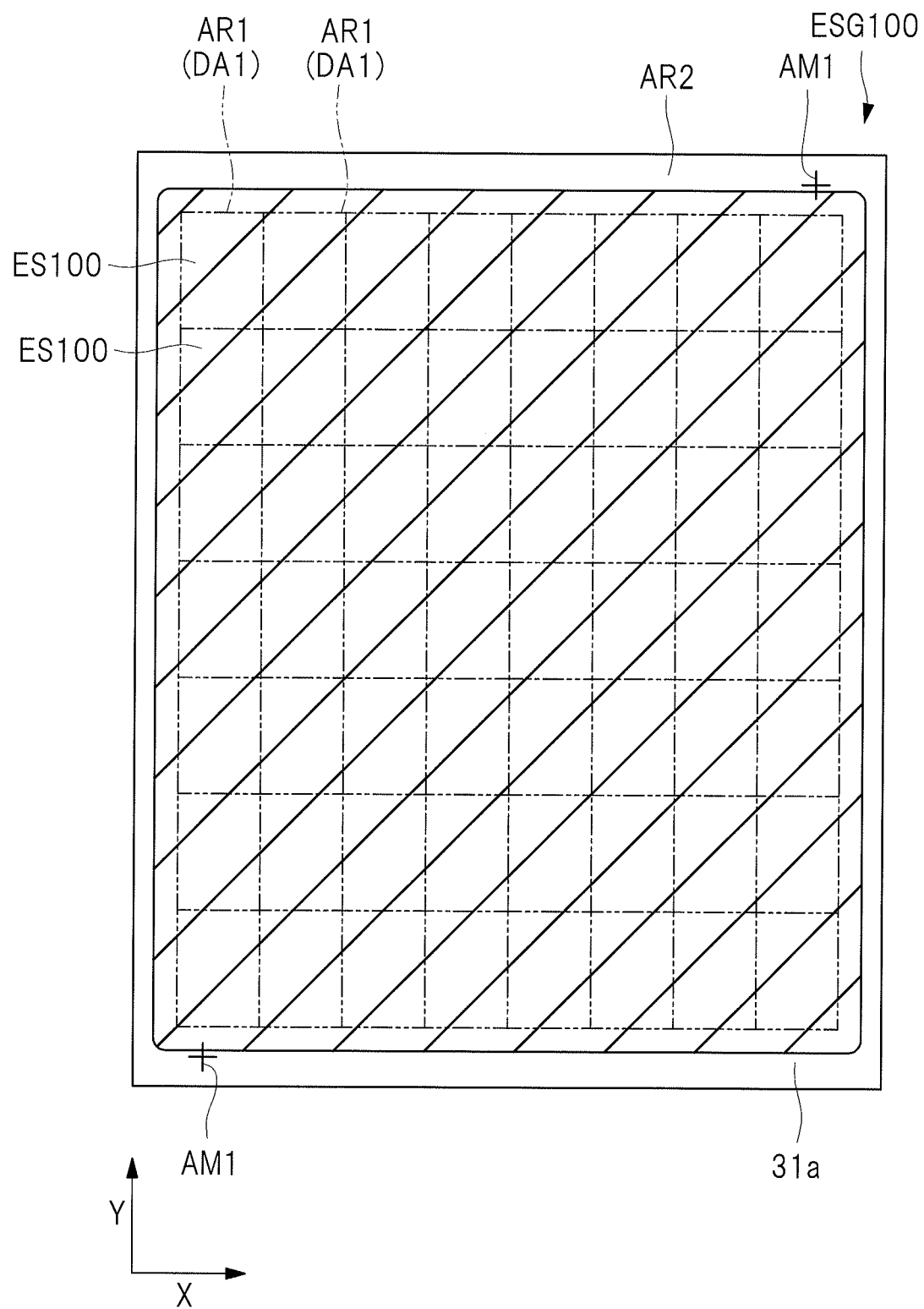
FIG. 34 is a plan view of an electrode substrate according to a comparative example during a manufacturing process thereof.
Figure 35:
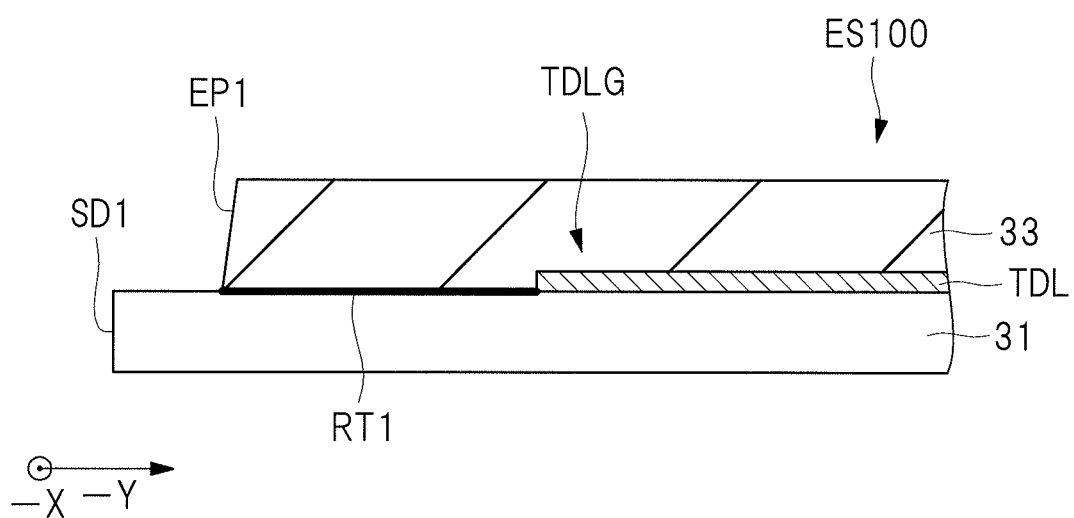
FIG. 35 is a cross-sectional view illustrating the electrode substrate according to the comparative example.

FIG. 34 is a plan view of an electrode substrate according to the comparative example during a manufacturing process thereof. FIG. 35 is a cross-sectional view illustrating the electrode substrate according to the comparative example. The cross-sectional view of FIG. 35 corresponds to the cross-sectional view of FIG. 15.

Also in the manufacturing process of the electrode substrate according to the comparative example, in the same manner as the manufacturing process of the electrode substrate according to the first embodiment, the electrode group TDLG (see FIG. 28) made up of sensing electrodes TDL is formed on the glass substrate 31a having a plurality of electrode-substrate forming regions, and then the protective film 33 is formed so as to cover the electrode group TDLG, thereby forming an electrode-substrate assembly ESG100. Thereafter, the formed electrode-substrate assembly ESG100 is divided into the plurality of electrode-substrate forming regions AR1, thereby manufacturing the electrode substrates ES100.

More specifically, first, also in the manufacturing process of the electrode substrate according to the comparative example, the glass substrate 31a is prepared by performing the same steps as those described above with reference to FIGS. 26 and 27 in the first embodiment.

Next, also in the manufacturing process of the electrode substrate according to the comparative example, the sensing electrode TDL is formed by performing the same steps as those described above with reference to FIGS. 28 and 29 in the first embodiment. However, in the comparative example, the concave/convex patterns UE1 and UE2 are not formed unlike the steps described above with reference to FIGS. 28 and 29 in the first embodiment.

Next, in the manufacturing process of the electrode substrate according to the comparative example, by forming the protective film 33 by performing the same steps as those described above with reference to FIGS. 31 and 32 in the first embodiment, the electrode-substrate assembly ESG100 is formed. Also in the comparative example, a protective film is formed on the glass substrate 31a by applying a coating liquid by the ink jet method or the electric field jet method.

However, when the coating liquid is applied on the glass substrate 31a by the ink jet method or the electric field jet method, it is difficult to highly accurately adjust the position of the end portion of the coating liquid spreading on the glass substrate 31a.

For example, in the case in which the coating liquid is applied by the ink jet method or the electric field jet method onto a surface of the glass substrate 31a and the surface of the glass substrate 31a is lyophilic to the coating liquid to some extent, the coating liquid applied to the surface of the glass substrate 31a easily spreads and thus it is difficult to highly accurately adjust the position of the end portion of the coating liquid. The spreadability of the coating liquid applied on the glass substrate 31a is varied depending on the surface tension acting on the coating liquid.

For example, the interfacial tension exists as the force acting on an interface between the liquid phase and the gas phase or between the liquid phase and the solid phase. For example, the reason why a droplet dropped onto a surface of a flat substrate remains in a hemisphere state is that water molecules in the droplet are pulled inside by the van der Waals' force to each other and interfacial tension acts so as to reduce the surface area of the droplet. In addition, when the interfacial tension acting so as to reduce the surface area as an interface is acting on a liquid, this interfacial tension is referred to also as surface tension of the liquid.

The larger the van der Waals's force of liquid is, the larger such surface tension of liquid is. Thus, the more the atomic weight or molecular weight of the materials contained in the liquid, the larger the surface tension is. Therefore, surface tension of the coating liquid applied on the glass substrate 31a is varied depending on the type of the coating liquid.

On the other hand, the spreadability of the coating liquid applied on the glass substrate 31a is varied depending on the shape of the surface of the glass substrate 31a other than the type of the coating liquid. For example, the coating liquid applied to a flat surface of the glass substrate 31a easily spreads over the surface of the glass substrate 31a.

When the coating liquid easily spreads over the surface of the glass substrate 31a like this, the coating liquid applied so as to cover the electrode group TDLG is likely to spread toward the outer periphery of each of the electrode-substrate forming regions AR1 as shown in FIG. 34.

More specifically, in the comparative example, it is impossible to highly accurately adjust the position of the end portion of the coating liquid applied so as to cover the electrode group TDLG. Thus, it is difficult to highly accurately adjust the position of the end portion of the protective film 33 formed by curing the coating film made of the applied coating liquid. Therefore, the end portion of the protective film 33 formed in each of the electrode-substrate forming regions AR1 may go beyond the outer periphery of each of the electrode-substrate forming regions AR1, and the manufacturing yield of the electrode substrate may be lowered when dividing the electrode-substrate assembly into each of the plurality of electrode-substrate forming regions.

For example, in the comparative example, when the end portion of the protective film 33 formed in each of the electrode-substrate forming regions AR1 goes beyond the outer periphery of each of the electrode-substrate forming regions AR1, the protective film 33 is formed also in the dicing region DA1 between the two neighboring electrode-substrate forming regions AR1. In such a case, when the glass substrate 31a is cut along the dicing region DA1 and the electrode-substrate assembly ESG100 is divided into each of the plurality of electrode-substrate forming regions AR1, thereby forming the electrode substrates ES100, for example, the cutting performance may be degraded due to the protective film 33 adhered to a dicing blade. Therefore, for example, cracks occur in the outer peripheral portion of the divided electrode substrate ES100, so that the manufacturing yield of the electrode substrate may be lowered.

Alternatively, when the end portion of the protective film 33 formed in each of the electrode-substrate forming regions AR1 goes beyond the outer periphery of each of the electrode-substrate forming regions AR1, the protective film is formed on the alignment mark AM1 in the frame region AR2. In such a case, when cutting the glass substrate 31a along the dicing region DA1, the accuracy of position alignment using the alignment mark AM1 may be lowered. Thus, as the accuracy in shape of the divided electrode substrate ES100 is lowered, the manufacturing yield of an electrode substrate may be lowered.

Meanwhile, in the comparative example, the surface of the glass substrate 31a between the electrode group TDLG and the outer periphery of the electrode-substrate forming regions AR1 is flat. Therefore, in the divided electrode substrate ES100, the surface of a part of the glass substrate 31 between the outer periphery of the glass substrate 31 and the outer periphery of the electrode group TDLG is flat. Thus, as illustrated in FIG. 35, even when the end portion EP1 of the protective film 33 does not reach the outer periphery of the glass substrate 31, the route RT1 by which moisture in the air reaches the sensing electrode TDL through the gap between the protective film 33 and the glass substrate 31 is shortened. Consequently, since moisture in the air easily reaches the sensing electrode TDL through the gap between the protective film 33 and the glass substrate 31, the sensing electrodes TDL may be corroded due to the moisture in the air or the sensing electrode TDL may be exfoliated from the glass substrate 31.

In the techniques described in the Patent Documents 1 to 3, a lyophilic region and a repellant region need to be formed on a surface of a substrate in order to adjust spreading of the applied coating liquid, so that the number of steps of the manufacturing process may be increased due to the addition of steps of forming the lyophilic region and the repellant region. In addition, since it is not easy to form the lyophilic region and the repellant region on the surface of the electrode formed on the substrate, the spreading of the coating liquid applied to the surface of the electrode formed on the substrate cannot be highly accurately adjusted.

In the technique described in the Patent Document 4, since a film to be quickly dried is applied like a frame as a stopper and a film which is dried slowly but good at leveling effect is then applied, the number of steps of the manufacturing process may be increased. In addition, since the material of the coating liquid is limited in order to obtain a desired drying rate, it cannot be widely used in practical manufacturing processes.

Note that it is difficult to adjust the position of an end portion of the applied coating liquid also in various electrode substrates divided after forming a protective film so as to cover the electrodes formed on a multi-chip substrate by the inkjet method or the electric field jet method with the inclusion of the TFT substrate 21 in which the common electrode COML is formed.

<Main Features and Effects of Present Embodiment>

On the other hand, in the first embodiment, the electrode substrate ES includes the concave/convex pattern UE1. The concave/convex pattern UE1 is disposed closer to the outer periphery of the glass substrate 31 than the sensing electrode TDL is when seen in a plan view. In addition, the protective film 33 formed so as to cover the sensing electrode TDL is formed so as to cover apart of the glass substrate 31 positioned between the sensing electrode TDL and the concave/convex pattern UE1 when seen in a plan view.

In other words, in the first embodiment, the electrode-substrate assembly ESG includes a plurality of concave/convex patterns UE1. Each of the concave/convex patterns UE1 is disposed closer to the outer periphery of the electrode-substrate forming region AR1 than the sensing electrode TDL is in each of the electrode-substrate forming regions AR1 when seen in a plan view. Also, in each of the electrode-substrate forming regions AR1, the protective film 33 formed so as to cover the sensing electrode TDL is formed so as to cover a part of the glass substrate 31a positioned between the sensing electrode TDL and the concave/convex pattern UE1 when seen in a plan view.

Consequently, when forming the protective film 33 so as to cover the sensing electrode TDL, the position of the end portion EP1 of the protective film 33 can be highly accurately adjusted. Therefore, it is possible to prevent or suppress the end portion EP1 of the protective film 33 formed in each of the electrode-substrate forming regions AR1 from going beyond the outer periphery of each of the electrode-substrate forming regions AR1. Thus, when dividing the electrode-substrate assembly ESG into each of the plurality of electrode-substrate forming regions AR1, the manufacturing yield of the electrode substrate can be improved. In addition, the manufacturing yield of a display device having such an electrode substrate can be improved.

For example, it is possible to prevent or suppress the protective film 33 from being formed in the dicing region DA1 between two neighboring electrode-substrate forming regions AR1. Therefore, when the glass substrate 31a is cut along the dicing region DA1 and the electrode-substrate assembly ESG is divided into each of the plurality of electrode-substrate forming regions AR1, thereby forming the electrode substrates ES, degradation of cutting performance due to the protective film 33 adhered onto the dicing blade or the like can be prevented or suppressed. Consequently, occurrence of cracks in the outer peripheral portion of the divided electrode substrate ES or the like can be prevented or suppressed, so that the manufacturing yield of the electrode substrate can be improved.

Alternatively, it is possible to prevent or suppress the protective film 33 from being formed on the alignment mark AM1 in the frame region AR2. Thus, when the glass substrate 31a is cut along the dicing region DA1, the decrease in accuracy of position alignment using the alignment mark AM1 can be prevented or suppressed. Therefore, the decrease in accuracy in shape of the divided electrode substrate ES can be prevented or suppressed, so that the manufacturing yield of the electrode substrate can be improved.

On the other hand, in the first embodiment, the concave/convex pattern UE1 is formed on a part of the glass substrate 31 between the sensing electrode TDL and the outer periphery of the glass substrate 31. Thus, as compared with the comparative example, the length of the route by which moisture in the air reaches the sensing electrode TDL through the gap between the protective film 33 and the glass substrate 31 is increased. Therefore, since it becomes difficult for moisture in the air to reach the sensing electrode TDL through the gap between the protective film 33 and the glass substrate 31, corrosion of the sensing electrode TDL due to moisture in the air or exfoliation of the sensing electrode TDL from the glass substrate 31 can be prevented or suppressed, so that performance of the electrode substrate can be improved. In addition, performance of a display device having such an electrode substrate can be improved.

Also, in the first embodiment, it is not necessary to form a lyophilic region and a repellant region on the surface of the glass substrate 31 in order to adjust spreading of the applied coating liquid. Thus, it is not necessary to perform a step of forming a lyophilic region and a repellant region and the number of steps of the manufacturing process can be reduced.

Further, in the first embodiment, since it is not necessary to apply a film to be quickly dried like a frame as a stopper and then apply a film which is slowly dried but good at leveling, the number of steps of the manufacturing process can be reduced. Also, the material of the coating liquid for obtaining a desired drying rate is not limited, and it can be widely used in practical manufacturing processes.

Note that, in the first embodiment, an electrode substrate used as the opposing substrate 3 in which the sensing electrode TDL is formed in a display device with an input device has been exemplified as the electrode substrate ES. However, the electrode substrate ES according to the first embodiment can be applied to various electrode substrates divided after forming a protective film so as to cover the electrodes formed on the multi-chip substrate by the ink jet method or the electric field jet method with the inclusion of the TFT substrate 21 in which the common electrode COML is formed (same goes for the following respective embodiments).

Second Embodiment

In the first embodiment, an example in which a display device provided with a touch panel as an input device is applied to an in-cell liquid crystal display device with a touch sensing function in which a common electrode COML of the display device serves also as a driving electrode of the input device has been described. Meanwhile, in the second embodiment, an example in which a display device provided with a touch panel as an input device is applied to an in-cell liquid crystal display device with a touch sensing function in which a common electrode COML of the display device and a driving electrode of the input device are separately formed will be described.

Note that the display device of the second embodiment can be applied to an in-cell display device in which an input device is integrally provided for various display devices such as an organic EL display device as well as a liquid crystal display device. Alternatively, the display device of the second embodiment can be applied to an on-cell display device in which an input device is separately provided for various display devices.

<Display Device with Touch-Sensing Function>

Figure 36:
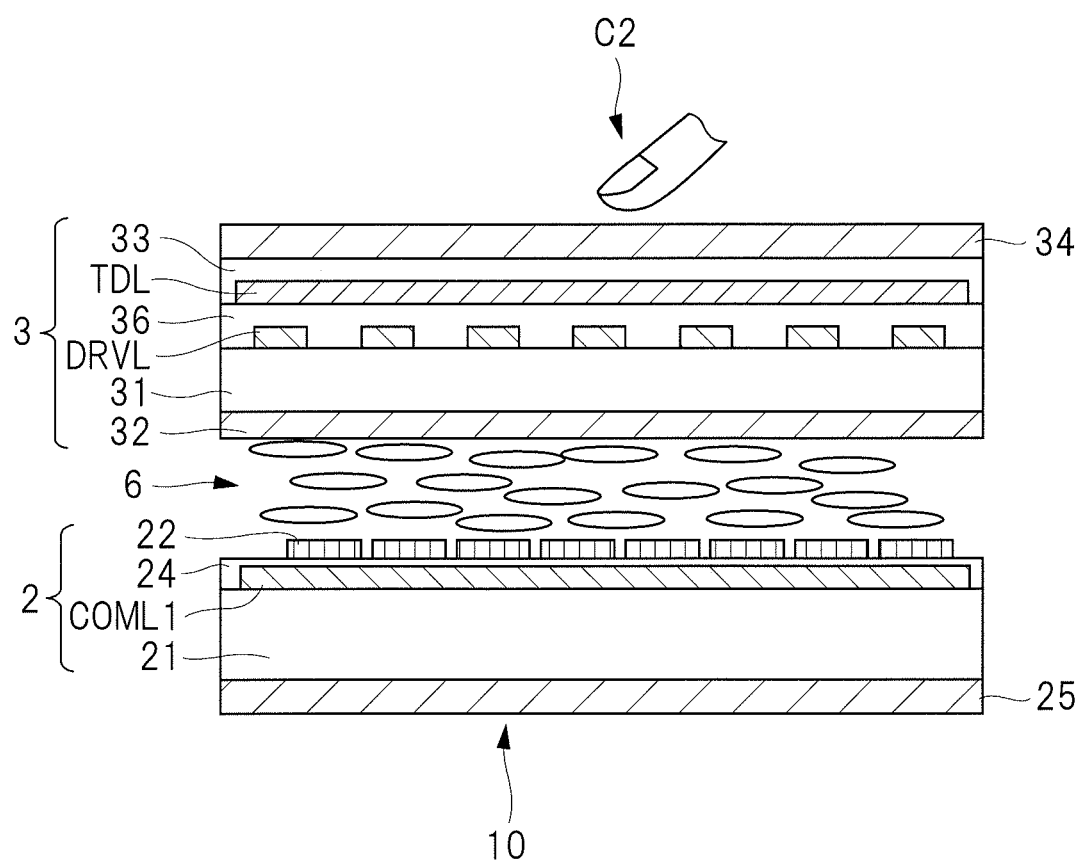
FIG. 36 is a cross-sectional view illustrating a display device with a touch sensing function in a display device according to the second embodiment.

FIG. 36 is a cross-sectional view illustrating a display device with a touch sensing function in the display device of the second embodiment.

In the display device according to the second embodiment, respective components other than the cross-sectional structure of the opposing substrate 3, for example, the shape and arrangement of the concave/convex pattern UE1 (see FIG. 12) in a plan view are similar to the respective components of the display device of the first embodiment other than the cross-sectional structure of the opposing substrate 3. Therefore, the descriptions thereof will be omitted. Accordingly, parts which differ from those described in the first embodiment with reference to FIG. 9 and FIG. 10 will be mainly described with reference to FIG. 36.

The display device 10 with a touch sensing function includes the pixel substrate 2, the opposing substrate 3 and the liquid crystal layer 6. The opposing substrate 3 is disposed so that an upper surface serving as a main surface of the pixel substrate 2 and a lower surface serving as a main surface of the opposing substrate 3 are opposed to each other. The liquid crystal layer 6 is provided between the pixel substrate 2 and the opposing substrate 3.

In the second embodiment, the pixel substrate 2 includes common electrodes COML1. The common electrodes COML1 operate as driving electrodes of the liquid crystal display device 20 (see FIG. 1), but do not operate as driving electrodes of the touch sensing device 30 (see FIG. 1). Accordingly, unlike the first embodiment, a plurality of common electrodes need not to be provided as the common electrodes COML1, and it is also possible to provide one common electrode obtained by, for example, coupling and integrating the common electrodes COML of the first embodiment.

Since parts of the pixel substrate 2 and the liquid crystal layer 6 of the display device of the second embodiment other than the common electrodes COML1 are similar to respective parts of the pixel substrate 2 and the liquid crystal layer 6 of the display device of the first embodiment, the descriptions thereof will be omitted. Also, the circuit diagram corresponding to the plurality of pixels of the display device of the second embodiment is similar to the circuit diagram corresponding to the plurality of pixels of the display device of the first embodiment illustrated in FIG. 10 except for the point that the common electrodes COML1 are provided instead of the common electrodes COML. Therefore, the descriptions of the parts of the display device of the second embodiment which are similar to the parts described with reference to FIG. 10 in the first embodiment will be omitted.

In the second embodiment, the opposing substrate 3 includes a glass substrate 31, a color filter 32, a driving electrode DRVL, an insulating film 36, a sensing electrode TDL, and a protective film 33. The glass substrate 31 has an upper surface serving as a main surface and a lower surface serving as a main surface opposed to the upper surface. The color filter 32 is formed on the lower surface of the glass substrate 31 serving as one main surface. The driving electrode DRVL is a driving electrode of a touch sensing device 30 and is formed on the upper surface of the glass substrate 31 serving as the other main surface. The insulating film 36 is formed on the upper surface of the glass substrate 31 so as to cover the driving electrode DRVL. The sensing electrode TDL is the sensing electrode of the touch sensing device 30, and is formed on the insulating film 36. More specifically, the sensing electrode TDL is formed on the upper surface of the glass substrate 31 serving as the other main surface via the driving electrode DRVL and the insulating film 36. The protective film 33 is formed on the insulating film 36 so as to cover the sensing electrodes TDL.

The sensing electrode TDL and the concave/convex pattern UE1 (see FIG. 12) in the second embodiment can be the same as those described in the first embodiment except for the point that the sensing electrode TDL and the concave/convex pattern UE1 are formed on the insulating film 36. In addition, the protective film 33 in the second embodiment can be the same as that in the first embodiment except for the point that the protective film 33 is formed on the insulating film 36.

In the second embodiment, the common electrodes COML1 operate as driving electrodes of the liquid crystal display device 20, but do not operate as driving electrodes of the touch sensing device 30. The driving electrodes DRVL operate as driving electrodes of the touch sensing device 30, but do not operate as driving electrodes of the liquid crystal display device 20. Therefore, it is possible to independently perform the display operations by the common electrodes COML1 and the touch sensing operations by the driving electrodes DRVL in parallel to each other.

Note that a concave/convex pattern may be disposed closer to the outer periphery of the glass substrate 31 than the driving electrode DRVL is. In this case, the insulating film 36 serving as a protective film formed so as to cover the driving electrode DRVL may be formed so as to cover the glass substrate 31 positioned between the driving electrode DRVL and the concave/convex pattern when seen in a plan view. By providing a concave/convex pattern in this manner, a position of an end portion of the insulating film 36 can be highly accurately adjusted when forming the insulating film 36.

<Main Features and Effects of Present Embodiment>

Also in the second embodiment, in the same manner as the first embodiment, the electrode substrate ES includes the concave/convex pattern UE1 disposed closer to the outer periphery of the glass substrate 31 than the sensing electrode TDL is when seen in a plan view. Also, the protective film 33 formed so as to cover the sensing electrode TDL is formed so as to cover the glass substrate 31 positioned between the sensing electrode TDL and the concave/convex pattern UE1 when seen in a plan view.

Consequently, the same effects as the first embodiment can be obtained. Namely, when forming the protective film 33 so as to cover the sensing electrode TDL, the position of the end portion EP1 of the protective film 33 can be highly accurately adjusted and a manufacturing yield of the electrode substrate can be improved. In addition, like the first embodiment, performance of the display device with such an electrode substrate is improved, and the manufacturing yield thereof can be improved.

Further, in the second embodiment, the common electrode COML1 of the display device and the driving electrode DRVL of the input device are separately formed. Consequently, since it is not necessary to separate the display period in which display operations are performed by the common electrodes COML1 and the touch sensing period in which touch sensing operations are performed by the driving electrodes DRVL, the detection performance of touch sensing can be improved, for example, the sensing speed of touch sensing can be apparently improved.

In the first and second embodiments, an example in which a display device provided with a touch panel as an input device is applied to an in-cell liquid crystal display device with a touch sensing function has been described. However, the display device provided with a touch panel as an input device may be applied to an on-cell liquid crystal display device with a touch sensing function. The on-cell liquid crystal display device with a touch sensing function indicates a liquid crystal display device with a touch sensing function in which neither the driving electrodes nor the sensing electrodes included in the touch panel are incorporated in the liquid crystal display device.

Third Embodiment

Next, electronic devices as application examples of the display devices described in the first embodiment and the second embodiment will be described with reference to FIG. 37 to FIG. 43. The display devices of each of the first embodiment and the second embodiment are applicable to electronic devices of all kinds of fields such as television apparatus, digital cameras, notebook PCs, portable terminal devices such as mobile phones and video cameras. In other words, the display devices of the first embodiment and the second embodiment can be applied to electronic devices of all kinds of fields which display video signals input from outside or generated inside as images or video pictures.

<Television Apparatus>

Figure 37:
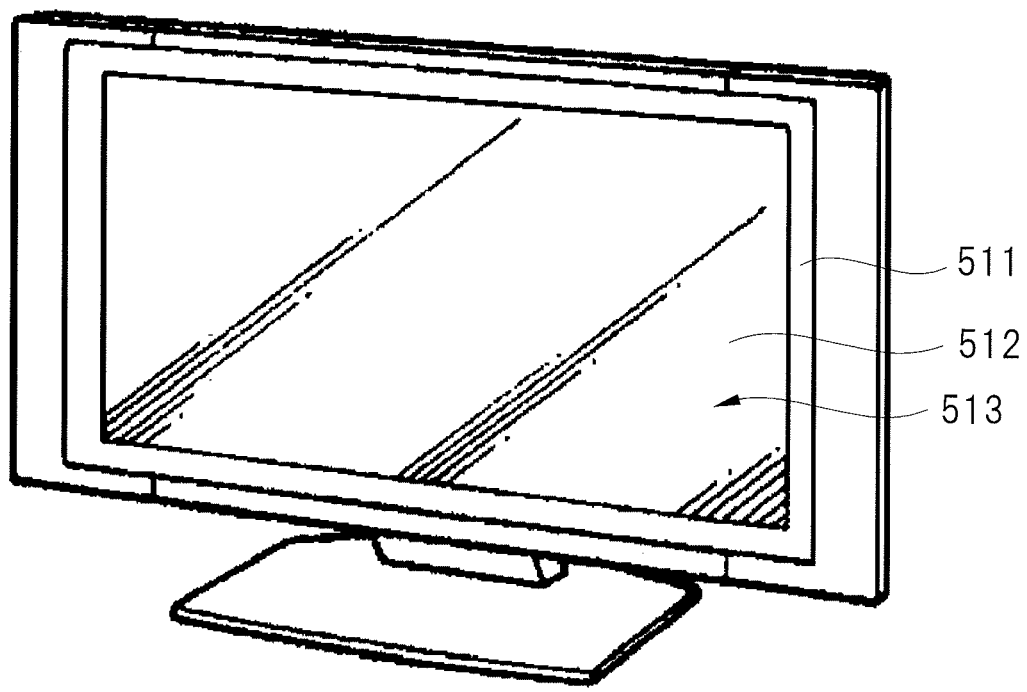
FIG. 37 is a perspective view illustrating an external appearance of a television apparatus as one example of an electronic device according to the third embodiment.

FIG. 37 is a perspective view illustrating an external appearance of a television apparatus as one example of an electronic device of the third embodiment. This television apparatus includes, for example, a video display screen unit 513 including a front panel 511 and a filter glass 512, and the video display screen unit 513 is made up of the in-cell display device with a touch sensing function or the on-cell display device with a touch sensing function described in the first embodiment and the second embodiment.

<Digital Camera>

Figure 38:
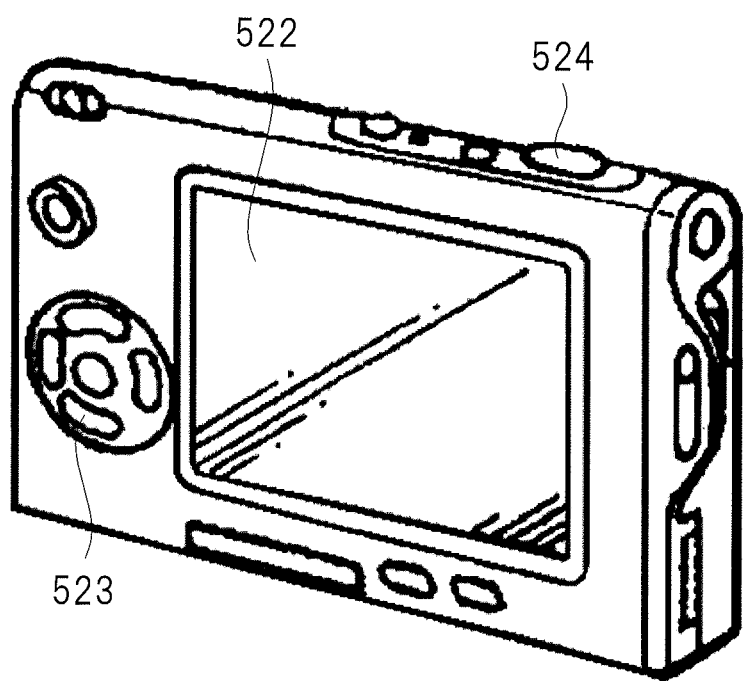
FIG. 38 is a perspective view illustrating an external appearance of a digital camera as one example of an electronic device according to the third embodiment.

FIG. 38 is a perspective view illustrating an external appearance of a digital camera as one example of an electronic device of the third embodiment. The digital camera includes, for example, a display unit 522, a menu switch 523 and a shutter button 524, and the display unit 522 is made up of the in-cell display device with a touch sensing function or the on-cell display device with a touch sensing function described in the first embodiment and the second embodiment.

<Notebook PC>

Figure 39:
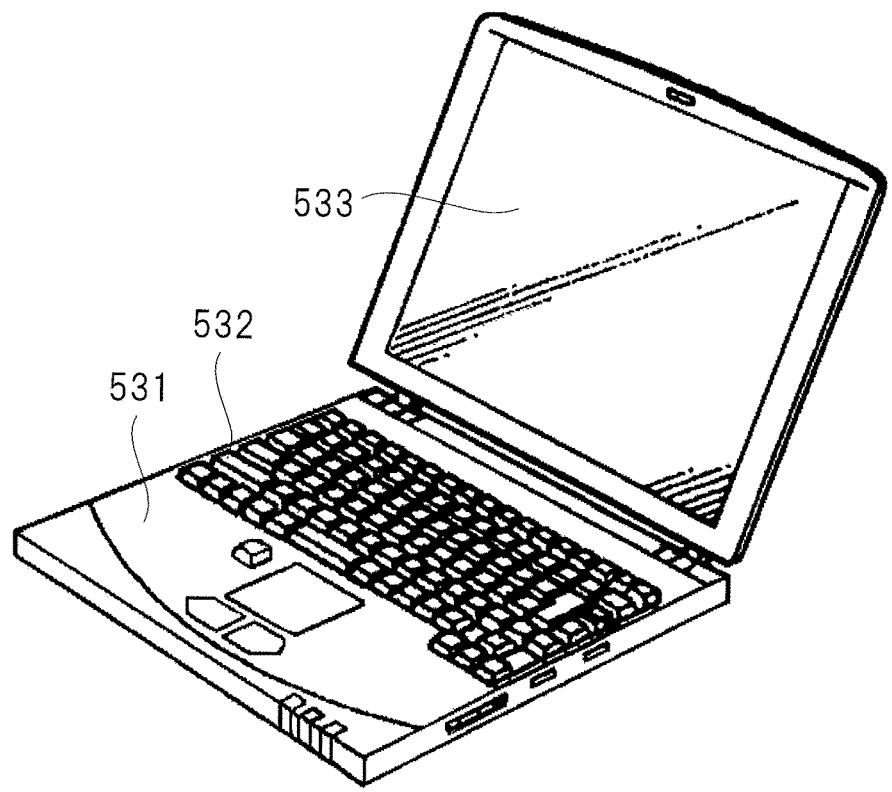
FIG. 39 is a perspective view illustrating an external appearance of a notebook PC as one example of an electronic device according to the third embodiment.

FIG. 39 is a perspective view illustrating an external appearance of a notebook PC as one example of an electronic device of the third embodiment. The notebook PC includes, for example, a main body 531, a keyboard 532 for input operations of characters or the like, and a display unit 533 for displaying images, and the display unit 533 is made up of the in-cell display device with a touch sensing function or the on-cell display device with a touch sensing function described in the first embodiment and the second embodiment.

<Video Camera>

Figure 40:
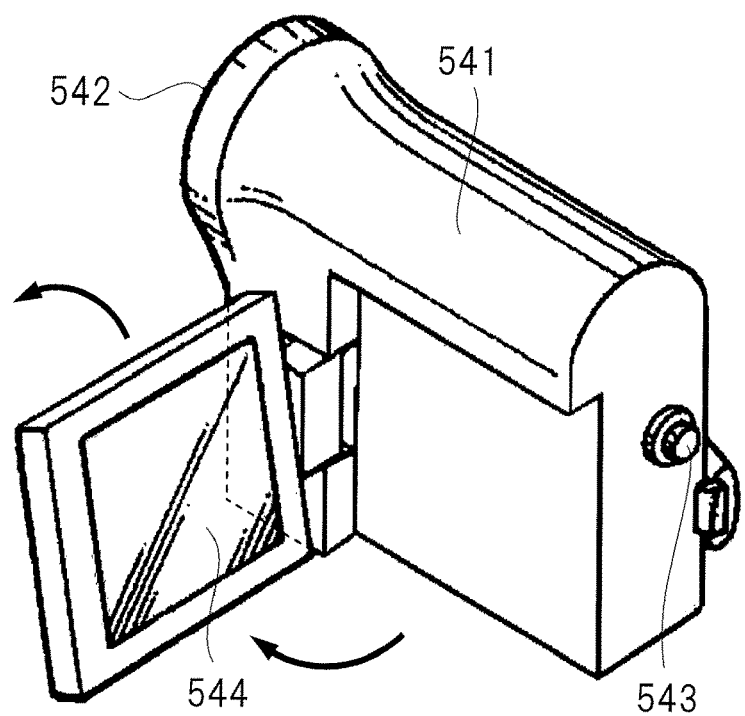
FIG. 40 is a perspective view illustrating an external appearance of a video camera as one example of an electronic device according to the third embodiment.

FIG. 40 is a perspective view illustrating an external appearance of a video camera as one example of an electronic device of the third embodiment. The video camera includes, for example, a main body portion 541, a lens 542 for shooting objects provided on a front surface of the main body portion 541, a start/stop switch 543 for shooting and a display unit 544, and the display unit 544 is made up of the in-cell display device with a touch sensing function or the on-cell display device with a touch sensing function described in the first embodiment and the second embodiment.

<Mobile Phone>

Figure 41:
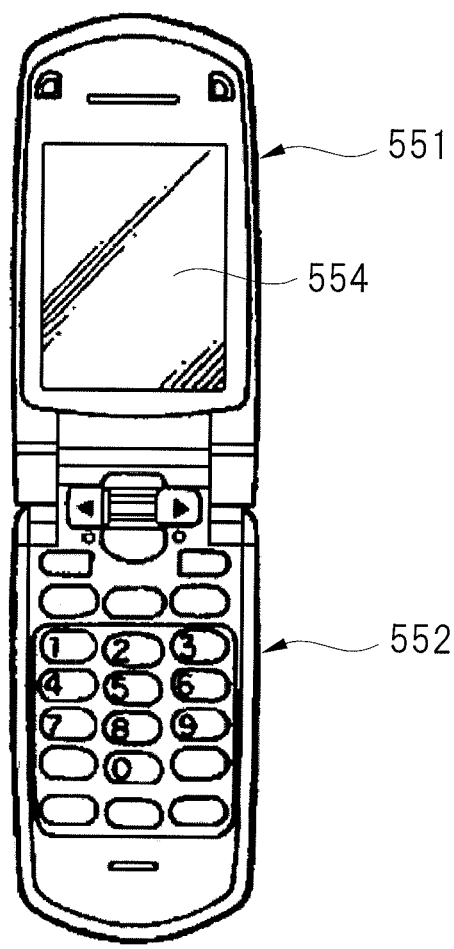
FIG. 41 is a front view illustrating an external appearance of a mobile phone as one example of an electronic device according to the third embodiment.
Figure 42:
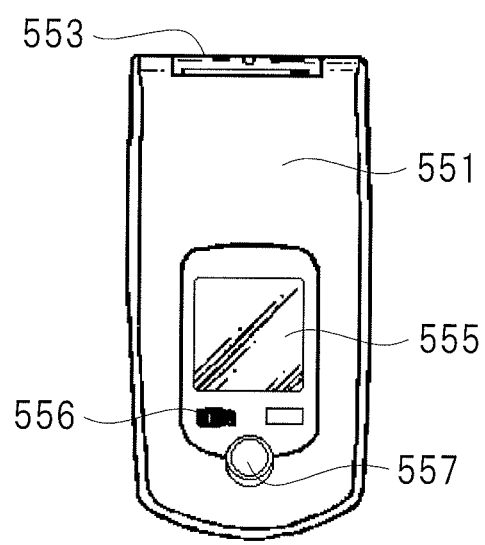
FIG. 42 is a front view illustrating an external appearance of a mobile phone as one example of an electronic device according to the third embodiment.

FIG. 41 and FIG. 42 are front views illustrating an external appearance of a mobile phone as one example of an electronic device of the third embodiment. FIG. 42 illustrates a state in which the mobile phone illustrated in FIG. 41 is folded. The mobile phone is composed of, for example, an upper housing 551 and a lower housing 552 coupled by a coupling portion (hinge portion) 553 and includes a display 554, a sub-display 555, a picture light 556 and a camera 557, and the display 554 or the sub-display 555 is made up of the display device with a touch sensing function described in the first embodiment and the second embodiment.

<Smartphone>

Figure 43:
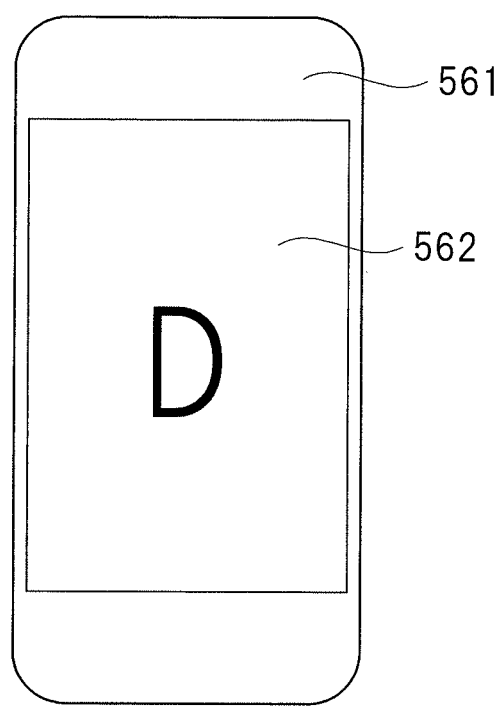
FIG. 43 is a front view illustrating an external appearance of a smartphone as one example of an electronic device according to the third embodiment.

FIG. 43 is a front view illustrating an external appearance of a smartphone as one example of an electronic device of the third embodiment. The mobile phone includes, for example, a housing 561 and a touch screen 562. The touch screen 562 is composed of, for example, a touch panel serving as an input device and a liquid crystal panel serving as a display unit, and is made up of the in-cell display device with a touch sensing function or the on-cell display device with a touch sensing function described in the first embodiment and the second embodiment.

The touch panel of the touch screen 562 is, for example, the touch sensing device 30 provided in the display device 10 with a touch sensing function of the display device 1 described with reference to FIG. 1. When a user makes gesture operations such as a touch operation or a drag operation on the touch panel with a finger or a touch pen, the touch panel of the touch screen 562 senses coordinates of the positions corresponding to the gesture operations and outputs them to a control unit (not shown).

The liquid crystal panel of the touch screen 562 is, for example, the liquid crystal display device 20 provided in the display device 10 with a touch sensing function of the display device 1 described with reference to FIG. 1. Further, the liquid crystal panel of the touch screen 562 made up of the display device 1 includes, for example, the driving electrode driver 14 of the display device 1 described with reference to FIG. 1. The driving electrode driver 14 applies voltage as image signals to the pixel electrodes 22 (see FIG. 9) provided in each of the plurality of sub-pixels SPix (see FIG. 10) arrayed in a matrix form at respectively constant timings, thereby displaying images.

<Main Features and Effects of Present Embodiment>

In the third embodiment, the display devices of each of the first embodiment and the second embodiment can be used as the display devices provided in the above-described various electronic devices. Consequently, in the display devices provided in the above-described various electronic devices, the same effects as those of the first embodiment and the second embodiment can be obtained. Namely, when forming the protective film 33 so as to cover the sensing electrode TDL, the position of the end portion EP1 of the protective film 33 can be highly accurately adjusted. Accordingly, it is possible to improve the performance of the above-described various electronic devices, or the number of steps of the manufacturing process of the above-described various electronic devices can be reduced.

In the foregoing, the invention made by the inventors of the present invention has been concretely described based on the embodiments. However, it is needless to say that the present invention is not limited to the foregoing embodiments and various modifications and alterations can be made within the scope of the present invention.

Further, in the foregoing embodiments, the cases of a liquid crystal display device have been illustrated as disclosure examples, but all kinds of flat-panel display devices such as an organic EL display device, other self-luminous type display devices and electronic paper display devices having electrophoresis elements may be listed as other application examples. Further, it goes without saying that the present invention is applicable to small, medium and large sized devices without any particular limitation.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention includes at least the following embodiments.

APPENDIX 1

An electrode-substrate assembly having a first substrate having a plurality of electrode-substrate forming regions, the first substrate being divided into each of the plurality of electrode-substrate forming regions, thereby forming a plurality of electrode substrates, the electrode-substrate assembly including:

a plurality of first electrodes formed in each of the plurality of electrode-substrate forming regions on the first substrate;

a plurality of first concave/convex patterns formed in each of the plurality of electrode-substrate forming regions on the first substrate; and a plurality of first protective films formed so as to cover the first electrodes in the plurality of electrode-substrate forming regions, wherein, in each of the electrode-substrate forming regions, the first concave/convex pattern is disposed closer to an outer periphery of the electrode-substrate forming region than the first electrode is when seen in a plan view, and in each of the electrode-substrate forming regions, the first protective film is formed so as to cover a part of the first substrate positioned between the first electrode and the first concave/convex pattern when seen in a plan view.

APPENDIX 2

The electrode-substrate assembly according to Appendix 1, wherein the first substrate has a frame region surrounding the plurality of electrode-substrate forming regions, the electrode-substrate assembly further includes:

an alignment mark formed on the first substrate in the frame region; and a second concave/convex pattern formed on the first substrate in the frame region, and the second concave/convex pattern is disposed so as to surround the alignment mark when seen in a plan view.

APPENDIX 3

An electrode-substrate assembly having a first substrate having a plurality of electrode-substrate forming regions and a frame region surrounding the plurality of electrode-substrate forming regions, the first substrate being divided into each of the plurality of electrode-substrate forming regions, thereby forming a plurality of electrode substrates, the electrode-substrate assembly including:

a plurality of first electrodes formed in each of the plurality of electrode-substrate forming regions on the first substrate;

a plurality of first protective films formed so as to cover the first electrodes in the plurality of electrode-substrate forming regions;

an alignment mark formed on the first substrate in the frame region; and a first concave/convex pattern formed on the first substrate in the frame region, wherein the first concave/convex pattern is disposed so as to surround the alignment mark when seen in a plan view.

The present invention is effectively applied to an electrode substrate, a display device, an input device, and a method of manufacturing an electrode substrate.

What is claimed is:

1. A display device comprising:

an electrode substrate; and a display unit for displaying an image in an image area, wherein the electrode substrate comprises:

a first substrate having a first main surface and a second main surface opposite to the first main surface;

a plurality of a first electrodes formed on the first main surface side of the first substrate;

a first concave/convex pattern formed on the first main surface side of the first substrate; and a first protective film formed so as to cover the plurality of first electrodes, the display unit includes;

a second substrate;

a plurality of pixels in the image area arrayed with a gap between each other in a plan view;

a second electrode in each of the pixels formed inside the image area; and a third electrode formed so as to be overlapped with the second electrode in the plan view, wherein the plurality of first electrodes are formed with a gap between each other so as to be overlapped with the third electrode in the plan view, the second electrode is formed between the second main surface of the first substrate and the second substrate, an image is displayed by applying a voltage between the second electrode and the third electrode, an input position is sensed based on a change of electrostatic capacitance between the third electrode and each of the plurality of first electrodes, the first substrate has a first edge located on the outer periphery in the plan view, the first concave/convex pattern is disposed closer to the first edge than the plurality of first electrodes in the plan view, the first protective film is formed so as to cover a part of the first substrate positioned between the plurality of first electrodes and the first concave/convex pattern in the plan view, the first protective film has a first end portion on the first concave/convex pattern, the first end portion of the first protective film is tilted at an angle that is not orthogonal to the first main surface of the first substrate, the first concave/convex pattern includes first convex portions that are arrayed along the first edge, and second convex portions that are closer to the first edge than the first convex portions and that are arranged along the first edge, the first convex portions and the second convex portions are separated from each other and the first convex portions, and the second convex portions are alternately arranged along a first direction parallel to the first edge in the plan view, the first convex portions are covered with the first protective film, and the second convex portions and a part of the first substrate positioned between the second convex portions and the first edge are exposed from the first protective film.

2. The display device according to claim 1, wherein the first and the second convex portions are formed of a first film that is formed on the first substrate.

3. The display device according to claim 2, wherein each of the plurality of first electrodes is formed of a first conductive film that is formed on the first substrate, and the first film is a second conductive film formed in the same layer as the first conductive film on the first substrate.

4. The display device according to claim 2, wherein the first substrate has a first side having the first edge, a second side intersecting the first side, a third side opposed to the first side, and a fourth side opposed to the second side in the plan view, and the first and the second convex portions are disposed closer to the first side than the plurality of first electrodes in the plan view.

5. The display device according to claim 4, wherein the first and second convex portions extends in the first direction along the first side in the plan view.

6. The display device according to claim 5, wherein each of the first convex portions includes a first side surface portion positioned on a first side in the second direction in the plan view, and in the plan view, an upper end portion of the first side surface portion is positioned closer to the first side than a lower end portion of the first side surface portion is in the second direction.

7. The display device according to claim 1, wherein the plurality of first electrodes form a first electrode group, the first protective film is formed so as to cover the first electrode group, the first concave/convex pattern is disposed so as to surround the first electrode group in the plan view, and the first protective film is formed so as to cover a part of the first substrate positioned between the first electrode group and the first concave/convex pattern in the plan view.

* * * * *